US010738615B1

(12) United States Patent
Klassen

(10) Patent No.: US 10,738,615 B1
(45) Date of Patent: Aug. 11, 2020

(54) EXPANDABLE PISTONS

(71) Applicant: Genesis Advanced Technology Inc., Langley (CA)

(72) Inventor: James Brent Klassen, Surrey (CA)

(73) Assignee: Genesis Advanced Technology Inc., Langley (CA)

( * ) Notice: Subject to any disclaimer, the term of this patent is extended or adjusted under 35 U.S.C. 154(b) by 0 days.

(21) Appl. No.: 16/507,997

(22) Filed: Jul. 10, 2019

Related U.S. Application Data

(60) Provisional application No. 62/826,968, filed on Mar. 29, 2019.

(51) Int. Cl.
| F01C 1/08 | (2006.01) |
| F01C 1/10 | (2006.01) |
| F01C 21/08 | (2006.01) |
| F02B 55/02 | (2006.01) |
| F02P 15/00 | (2006.01) |

(52) U.S. Cl.
CPC ............ *F01C 1/104* (2013.01); *F01C 1/08* (2013.01); *F01C 21/08* (2013.01); *F02B 55/02* (2013.01); *F02P 15/005* (2013.01)

(58) Field of Classification Search
CPC .. F01C 1/104; F01C 1/08; F01C 17/04; F01C 21/08; F01C 21/18; F02P 15/005; F02B 53/04; F02B 53/00; F02B 55/02
See application file for complete search history.

(56) References Cited

U.S. PATENT DOCUMENTS

| 3,700,363 | A | * | 10/1972 | Sorensen | ................. F01C 1/344 418/270 |
| 7,014,436 | B2 | | 3/2006 | Klassen | |
| 7,111,606 | B2 | | 9/2006 | Klassen | |
| 7,479,000 | B2 | | 1/2009 | Klassen | |
| 7,503,307 | B2 | | 3/2009 | Klassen et al. | |
| 8,011,345 | B2 | | 9/2011 | Klassen et al. | |
| 8,118,579 | B2 | | 2/2012 | Klassen | |
| 10,072,656 | B2 | | 9/2018 | Klassen | |
| 2003/0209221 | A1 | | 11/2003 | Klassen | |
| 2007/0295301 | A1 | | 12/2007 | Klassen et al. | |
| 2015/0167666 | A1 | * | 6/2015 | Hoehn | .................... F01C 1/336 418/173 |
| 2015/0322943 | A1 | * | 11/2015 | Kirchner | ............. F01C 21/0809 418/259 |

FOREIGN PATENT DOCUMENTS

| FR | 2920468 | A1 | * | 3/2009 | ............. F01C 1/082 |
| WO | 2007/019703 | A1 | | 2/2007 | |

OTHER PUBLICATIONS

U.S. Appl. No. 16/126,867, filed Sep. 10, 2018.

* cited by examiner

*Primary Examiner* — Audrey K Bradley

(74) *Attorney, Agent, or Firm* — Seed Intellectual Property Law Group LLP

(57) ABSTRACT

A piston is arranged to move in a cylinder to define a variable volume chamber, and can expand in two directions under the influence of pressure in the variable volume chamber to provide sealing against the cylinder. The piston can comprise a primary foot and a secondary foot arranged to move relative to each other in a first direction. The primary foot and the secondary foot can each comprise plural segments arranged to move relative to each other in a second direction. The piston may be suitable for use in an inner rotor, where it forms the end of a projection of the inner rotor and fully exits and reenters the cylinders.

30 Claims, 40 Drawing Sheets

EXPANDABLE PISTONS

TECHNICAL FIELD

Pistons, such as for inner rotors for energy transfer machines.

BACKGROUND

U.S. Pre-Grant Publication No. 2003/0209221, published Nov. 13, 2003 (the '221 publication), discloses a two-dimensional rotary displacement device comprises a housing, an outer rotor and at least one inner rotor. The axes of rotation of the outer rotor and the at least one inner rotor are parallel. The inner rotor rotates within the outer rotor as the outer rotor rotates within the housing. International PCT Publication No. WO07/019703, published Feb. 22, 2007 (the '703 publication), discloses a two-dimensional rotary displacement device comprising a stator with an internal rotor that spins on a shaft on a rotating carrier. As the carrier rotates within the stator, the inner rotor spins around the shaft and meshes with the stator. Each of these devices uses an inner rotor.

U.S. Pre-Grant Publication No. 2007/0295301, published Dec. 27, 2007 (the '301 publication), describes an inner rotor suitable for such applications. There is described below a further improvement on the inner rotor described in the '301 publication.

SUMMARY

There is provided an energy transfer machine including a carrier, inner rotor and annular housing. The carrier may be secured for rotation within the annular housing. The inner rotor may be secured for rotation about an inner rotor axis within the carrier. The annular housing may have a radially inner surface defining cylinders and the inner rotor may have outward projections, the outward projections projecting outward to mesh with the cylinders and define variable volume chambers within the cylinders as the inner rotor rotates within the carrier during operation. The outward projections of the inner rotor are circumferentially and axially expandable under pressure within the variable volume chambers. There may be fluid transfer passages on at least one of the inner rotor, annular housing and carrier to permit flow of fluid into and out of the variable volume chambers.

In various embodiments, there may be included any one or more of the following features: The carrier may fixed and the annular housing may be configured to rotate within an exterior housing during operation. The annular housing may be fixed and the carrier may be configured to rotate within the annular housing during operation. The outward projections may each comprise a primary foot and a secondary foot arranged to slide circumferentially relative to each other under the pressure within the variable volume chambers for sealing contact with the inward projections of the annular housing as respective inward projections and outward projections mesh with each other during operation. The primary foot and the secondary foot may each comprise plural segments biased axially relative to each other by the pressure within the variable volume chambers for sealing contact with axial walls of the cylinders as respective cylinders and outward projections mesh with each other during operation. The plural segments of the primary foot may define one or more primary foot slots separating the plural segments of the primary foot and the plural segments of the secondary foot may define one or more secondary foot slots separating the plural segments of the secondary foot, fluid under the pressure within the variable volume chambers entering the one or more primary foot slots and the one or more secondary foot slots to expand the one or more primary foot slots and the one or more secondary foot slots. The one or more primary foot slots and the one or more secondary foot slots may have respective inner boundaries defined by respective axially movable sealing interfaces. Each respective axially movable sealing interface may be defined by a respective substantially circumferentially extending seal. Each seal may have seal ridges and seal grooves arranged to mesh with corresponding grooves and ridges of at least one of the segments separated by the respective slot, axial movement of each respective sealing interface being accommodated by greater or lesser meshing of the seal ridges and seal grooves with the corresponding grooves and ridges. The seal ridges and seal grooves may be aligned longitudinally along the seal. Each seal may comprise at least one transverse ridge. One or more seal of the respective seals may include a substantially radial portion. An axially endmost segment of the plural segments of the primary foot or the plural segments of the secondary foot may comprise an axial end face for sealing contact with the axial walls of the cylinders. The axial end face may contact the axial walls at a radially outer edge of the axial end face. The axial end face may comprise a lip at the radially outer edge of the axial end face. The plural segments of the primary foot and the plural segments of the secondary foot may each be connected to respective corresponding segments of other outward projections of the outward projections to rotate together with the respective corresponding segments about the inner rotor axis. The primary foot and secondary foot may be arranged to slide relative to each other along a sealing interface provided with a circumferentially movable sliding seal comprising a radially extending portion in one of the primary foot and the secondary foot, and a contacting circumferential seal of the substantially circumferentially extending seals, the contacting circumferential seal being in the one of the primary foot and the secondary foot, may be arranged to contact the radially extending portion.

There is also provided an energy transfer machine including a piston arranged to move in a longitudinal direction within a cylinder to define a variable volume chamber, the term "cylinder" not implying any particular cross section shape. The piston may comprise a primary foot and a secondary foot arranged to slide relative to each other under pressure within the variable volume chamber in a first direction transverse to the longitudinal direction for sealing contact with walls of the cylinder in the first direction, and the primary foot and the secondary foot may each comprise plural segments biased relative to each other in a second direction transverse to the longitudinal direction by the pressure within the variable volume chamber for sealing contact with walls of the cylinder in the second direction.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 22:
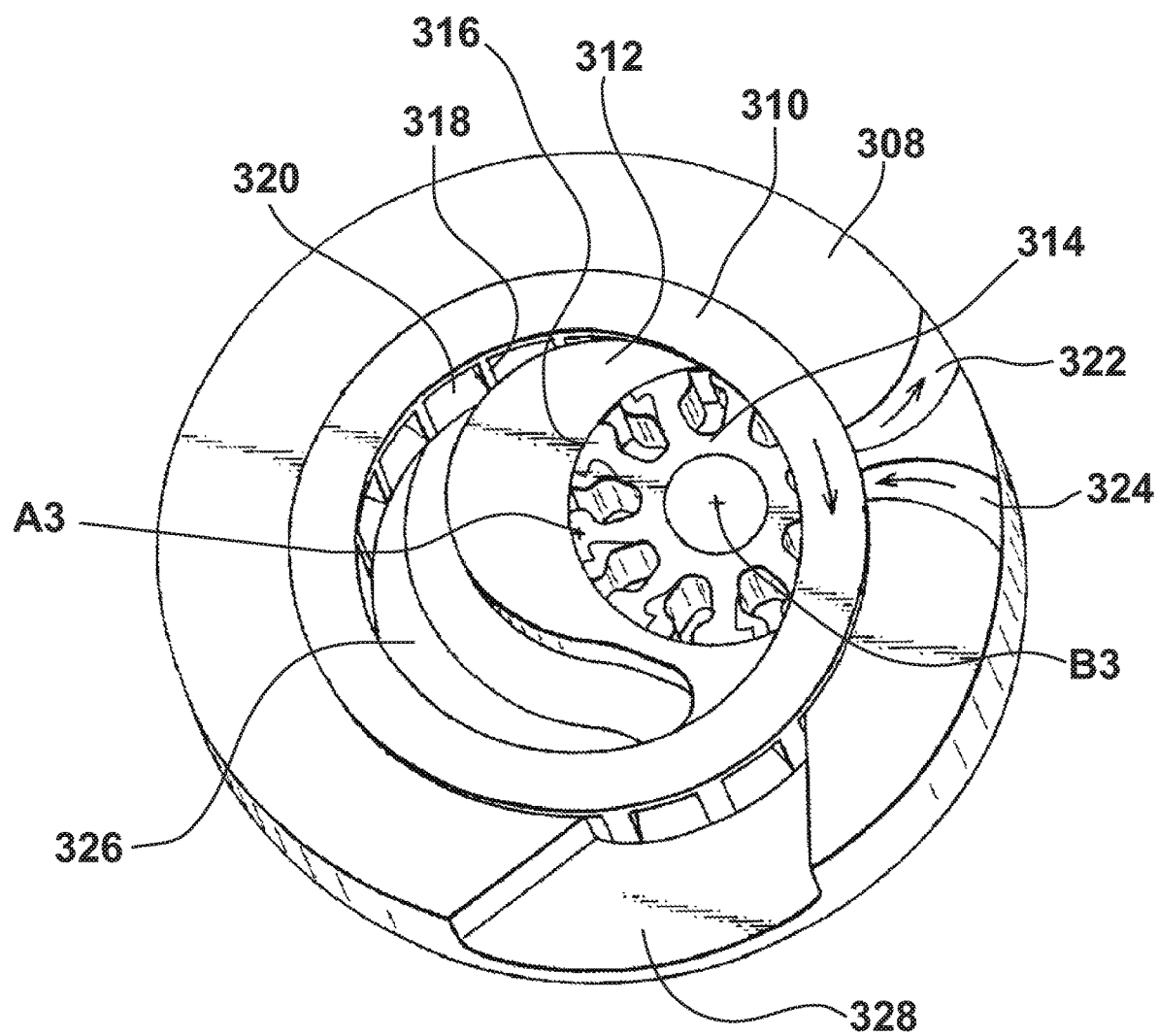
FIG. 22 shows an embodiment of an energy transfer machine with rotating outer housing.

An example of an energy transfer machine will first be described in which an inner rotor with expandable projections may be used. This example, as shown in corresponding text and figures of the '301 publication, shows a fixed outer rotor, or stator. The expandable inner rotor may also be used in a device with a rotating outer housing, as for example described in the '221 publication. FIG. 22 shows a device with a rotating outer housing. Advantages of the embodiments of FIG. 1-12 are outlined in the '703 publication.

FIGS. 13-21 show an inner rotor with circumferentially expandable outward projections, as for example described in the '301 publication.

Figure 1:
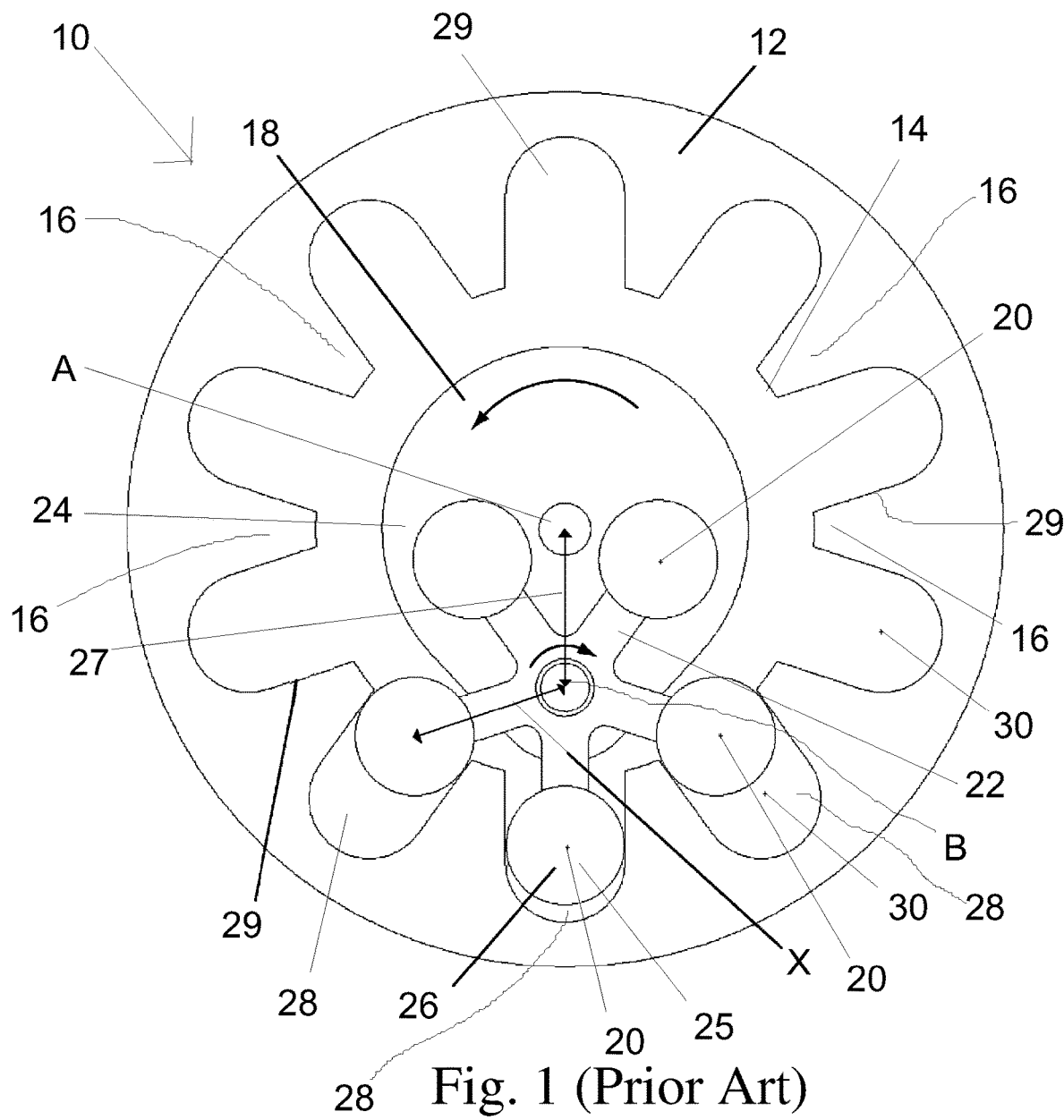
FIG. 1 is a schematic of an energy transfer machine with a rotating carrier.

Referring to FIG. 1, there is shown an energy transfer machine 10 that has an outer stator 12 having an inward facing surface 14 and inward projections 16 arranged around the inward facing surface 14. The stator 12 has the form of an annular housing. A carrier 18 is secured for rotation, about an axis A, at least partly within the outer stator 12. An inner rotor 22 is secured for rotation about an axis B within the carrier 18. The inner rotor 22 is shown schematically in FIGS. 1, 2, 5, 6, 7, 8A-8G and 12, but it will be understood that inner rotor 22 will have a construction according to the principles described in relation to FIGS. 13-21. Axis A is parallel to axis B. The inner rotor 22 has an outward facing surface 24 and outward projections 26 arranged around the outward facing surface 24. The outward projections 26 are expandable outward projections and may be, for example, designed as shown in FIGS. 13-21. The inward projections 16 project inward and the outward projections 26 project outward to mesh with each other and define variable volume chambers 28 between the inward projections 16 and the outward projections 26 as the inner rotor 22 rotates within the carrier 18. Fluid transfer passages, not shown in FIG. 1, are provided on at least one of the outer stator 12 and carrier 18 to permit flow of fluid into and out of the variable volume chambers 28. The parts shown may be made of any suitable material, including ceramic, such as silicon nitride, and titanium or titanium alloy.

In the schematic of FIG. 1, the outward projections 26 of the inner rotor 22 are shown as an array of pistons 25 with center points 20 which are located a radius X from the rotational axis B of the inner rotor 22. The pistons 25 are shown with circular cross-section, but this is representative only for the purpose of illustrating how the energy transfer machine of FIG. 1 operates. The pistons 25 represent expandable projections of the general type shown in FIGS. 13-21. The length of radius X is equal to the offset distance 27 from the inner rotor rotational axis B to the carrier rotational axis A. The inward projections 16 of the outer stator 12 form an array of cylinders 29 each with a center axis which are all on the same plane as the spherical piston center points and which coincide at the carrier rotational axis A. Thus, in this embodiment, the outer stator 12 has twice as many cylinders 29 as the inner rotor 22 has spherical pistons 25.

As the carrier 18 rotates, in this example, the spherical pistons 25 intermittently enter the cylinders 29 formed by inward projections 16 and compress the gas contained within the cylinders 29. This gas may then be expelled from the cylinders 29 by means of a one way valve (as for a compressor or vacuum pump application shown in FIGS. 7-10). Alternatively, fuel can be injected and combusted (as with a diesel engine application) or an air/fuel mixture may be drawn or charged into the intake before the pistons 25 seal with the cylinders 29 formed by inward projections 16. This mixture may be combusted at or near maximum compression in an engine embodiment is shown, for example, in FIGS. 2-6. Combustion may be initiated either by spark or some other type of ignition method, or by detonation if the temperature of the cylinder 29 and pistons 25 together with the heat of compression is high enough.

Other positive displacement geometries may be used with a rotating carrier 18 and fixed outer stator 12, or with a rotating outer housing. For example, although the number of projections Ns on the stator may be an integer multiple of the number of projections Nr on the inner rotor, this is not necessary in some embodiments. Hence, for example, in one embodiment Ns=Nr+1. Cylinder 29 shapes correspond to the shape of the pistons 25 to provide a positive displacement, sealed chamber for all or part of the compression and/or expansion. The geometry of the outward projection is also variable. For example, a piston 25 may have a square, trapezoidal or circular cross-section in a plane perpendicular to a radius of the inner rotor passing through the piston 25.

Figure 2:
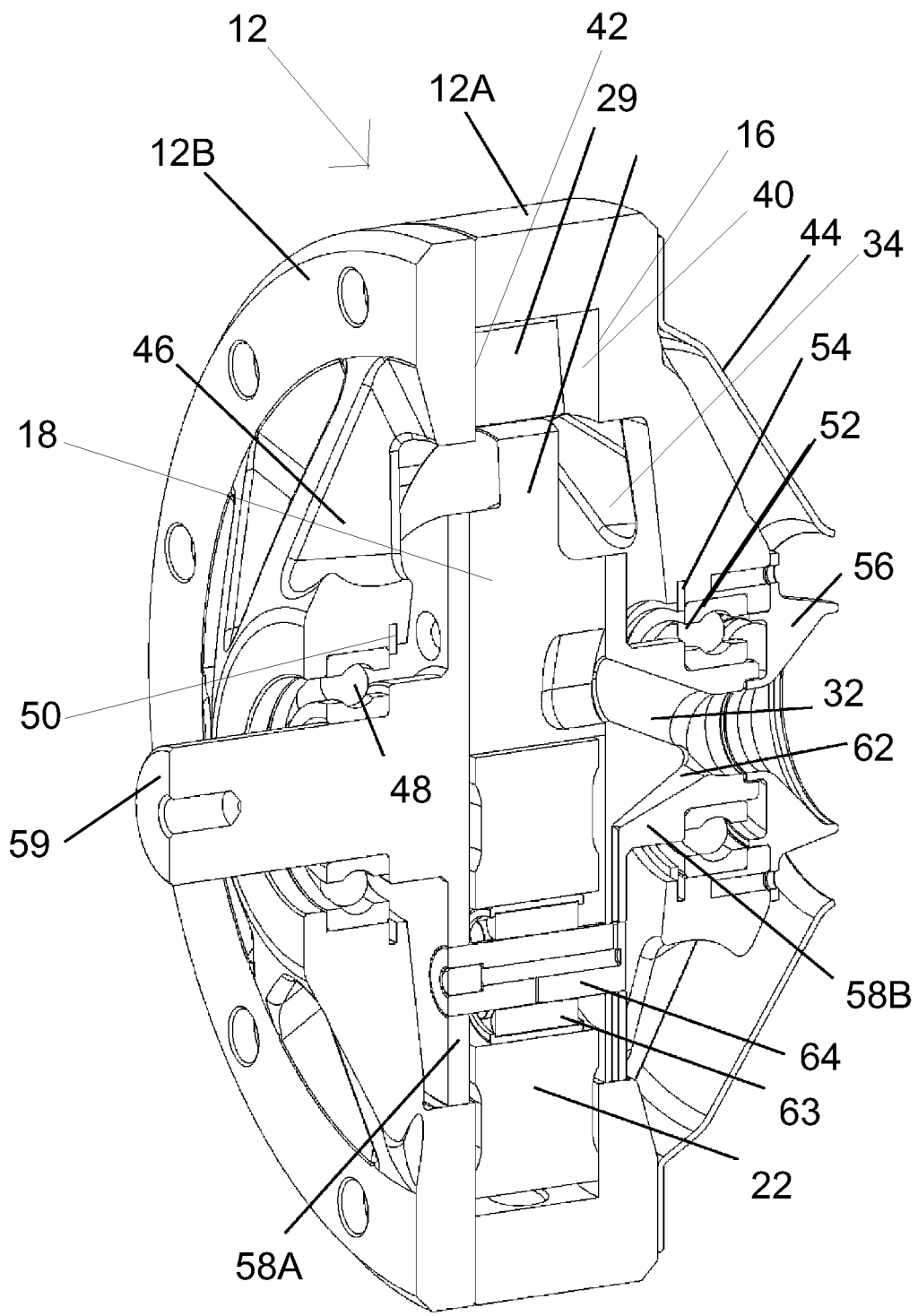
FIG. 2 is an isometric section view of the machine of FIG. 1 configured as an engine.

The outward projections 26 and inward projections 16 may be configured as shown for the pistons 25 and cylinder 29 geometry of FIG. 2 of the '221 publication, in which each outward projection 26 has a leg 26A and a foot 26B, such that foot 26B is wider than the leg 26A in the circumferential direction. This structure is shown in FIGS. 2-8E and 13-21. Each foot 26B is rounded on the leading and trailing edges to increase the surface area of the seal area, as the outward projections 26 move into and out of the cylinders 29 formed by the inward projections 16.

Center points 20 and of the projections 26 define a circle having radius X, which is the effective radius of the inner rotor 22. Points 30, which correspond to the points of maximum outward position of the points 20 as the inner rotor 22 rotates within the stator 12, define a circle having radius R, which is the effective radius of the virtual circle that the inner rotor 22 rotates within. In general, R is greater than X. In addition, R/X=Ns/Nr. When R=2X, as shown in FIG. 1, the path of a point 20 as the inner rotor 22 rotates in the stator 12 in relation to the stator 12 is a straight line as discussed in the '221 publication. In the embodiment when R=2X, the projections 26 may seal against the projections 16 during both compression and expansion. When R is not 2X, the projections 26 may seal with the projections 16 during compression or expansion but not both. For example, when R:X is 4:1 the path of a point 20 follows an astroid path. Such a path may be suitable for an embodiment, such as in a pump or compressor or expander, where the use of one way valves makes sealing in either expansion or compression unnecessary. In general, the points 20 define hypocycloids, which is the path followed by a point on a circle rolling within a larger circle. In practice, the configuration of the projections 26 may have various geometries depending on the application. Points on the outer periphery of the inner rotor 22 that are not coincident with the points 20 will have slightly different paths from a hypocycloid. The paths of these other points will, in part, determine the configuration of the inner surface 14 of the stator 12. Material may be added to the outer periphery of the inner rotor 22 for example for wear purposes, and as a consequence, an equivalent amount of material may need to be removed from the inner surface 14 of the stator 12.

As indicated above, points 20 trace a circle of radius X during rotation in relation to the axis B. In relation to the stator 12, the points 20 trace straight lines that pass through the axis A. The sides of the cylinders 29 are corresponding straight lines that lie along the paths traced by outer edges of the pistons 25. These sides are parallel to or nearly parallel to and offset from the straight line defined by the path of the center points 20.

Figure 3:
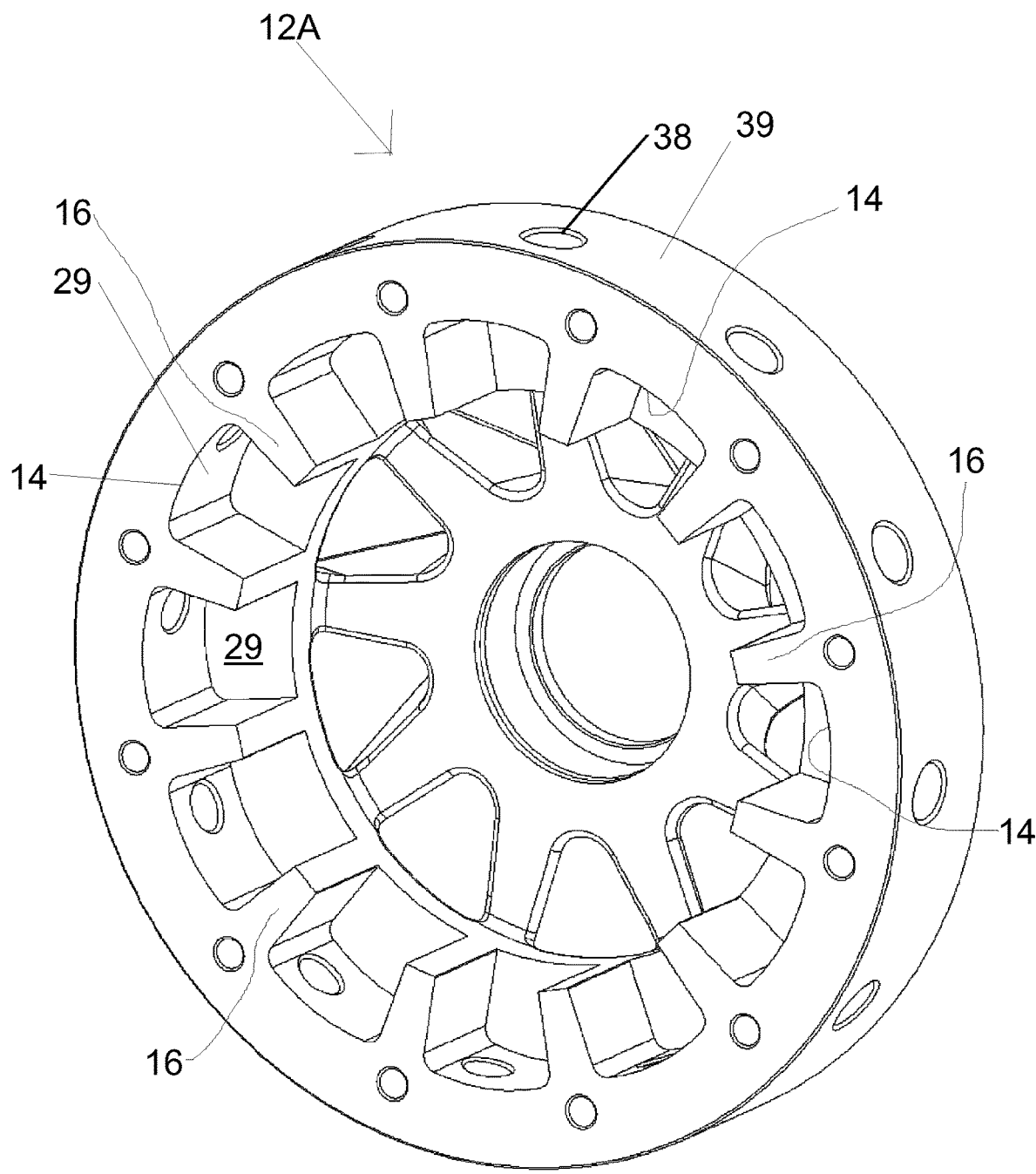
FIG. 3 is an isometric view of a stator for use with the machine of FIG. 2.

In one embodiment, an energy transfer machine 10 according to FIG. 1 configured as an engine has a single inner rotor 22 with half as many inner rotor pistons 25 as the outer stator 12 has cylinders 29. FIGS. 2-6 show an energy transfer machine 10 arranged as an internal combustion engine, with fluid transfer passages comprising a fuel intake conduit 32, an array of air intake conduits 34 and exhaust plenum 36 on the carrier 18. Holes 38, extending from the outer rim 39 of outer stator 12 to the inner facing surface 14, may be present such that ignition elements may be placed in each cylinder 29 through the holes 38 (FIG. 3). Various ignition elements may be used depending on the application, or in a diesel or detonation configuration, the ignition elements may be omitted. In one embodiment, the carrier 18 has an air intake side 41, shown for example in FIG. 6, and an exhaust side 43, shown for example in FIG. 5.

In FIG. 2, the outer stator 12 is formed of two pieces, a fixed casing 12A that includes the inward projections 16, and walls 40 of one side of the cylinders formed by the inward projections 16, and a casing cover plate 12B that forms the walls 42 on the opposite side of the cylinders to the walls 40. The fixed casing 12A is shown separately in FIG. 3. The casing cover plate 12B includes exhaust ports 46. An air intake shroud 44 is attached to the fixed casing 12A. An intake and/or exhaust shroud (not shown) may also be used.

The carrier 18 is mounted on a first set of bearings 48 secured within the fixed casing 12B by a retaining ring 50, and on a second set of bearings 52 secured within the fixed casing 12A by a retaining ring 54. Lubrication and seals for the bearings 48, 52 may also be provided. Also attached to the fixed casing 12A is a fuel intake shroud 56. There are various ways to build the carrier 18, rotor 22 and stator 12, using one or more pieces, such as using two end plates sandwiching a central ring to form the stator. The carrier 18 does not need to be axially precisely positioned. The inner rotor 22 may also float axially on its shaft. The relative thicknesses of the inner rotor 22 and stator 12 hold the inner rotor in its correct axial position.

Attached on respective opposite sides of the carrier 18 are carrier end plates 58A and 58B. Carrier end plate 58A, shown in a full side view in FIG. 4, includes an output shaft 59. Bolts (not shown) are placed in bolt holes 61 to fasten the carrier end plates 58A, 58B to the carrier 18. Carrier end plate 58B includes a centrifugal fuel conduit 60 (FIG. 6), which is a continuation of the fuel intake conduit 32 (FIG. 2). A branch 62 (FIG. 2) of the fuel conduit 60 may be directed to bearings 63 rolling on the shaft 64 forming the rotational axis B of the inner rotor 22 for cooling and lubrication. Alignment means, such as dowels, may be used to achieve precision assembly and, for example, allow alignment of the axes A and B.

Figure 5:
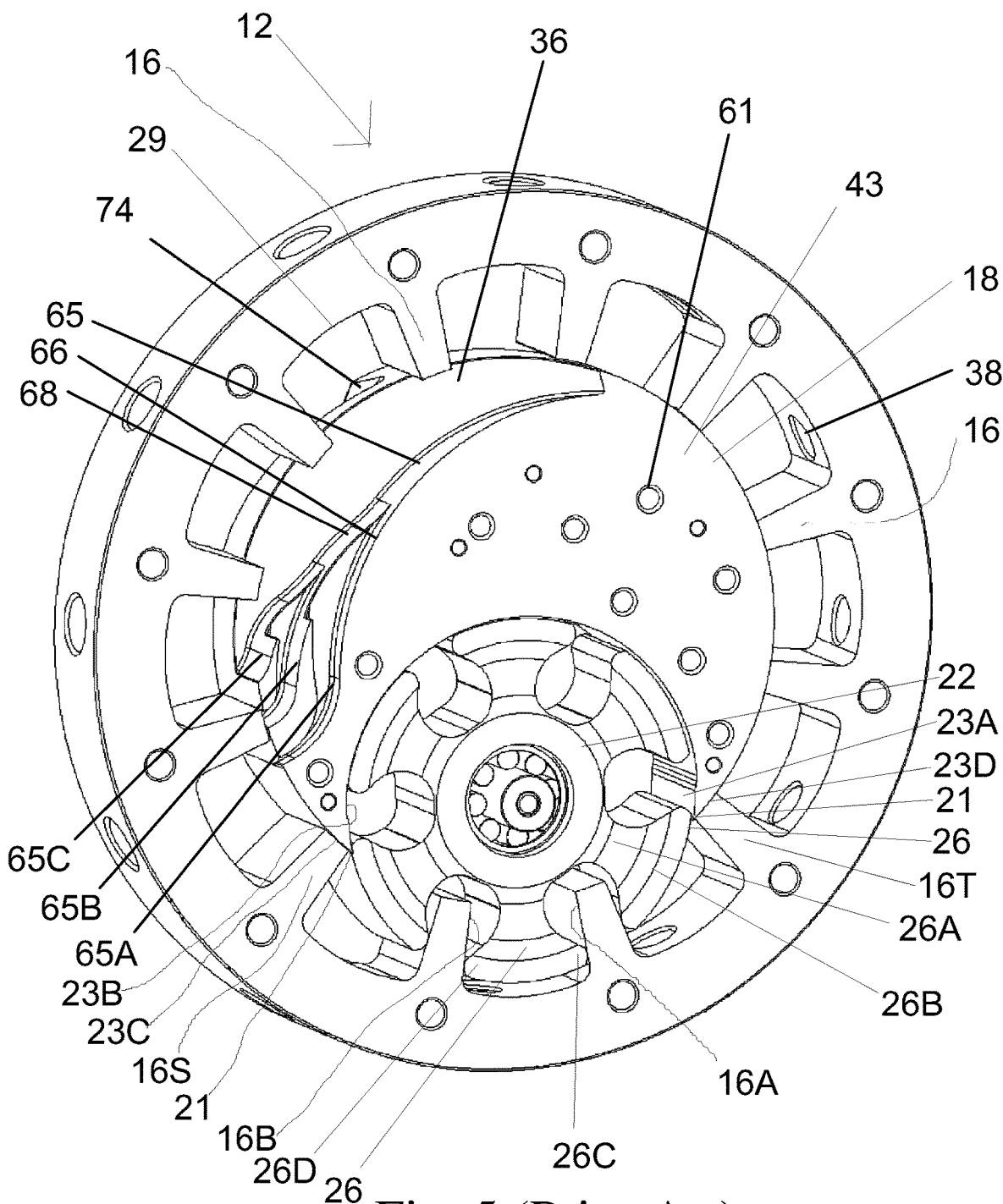
FIG. 5 is an isometric simplified view of the exhaust side of an inner assembly with carrier end plates removed in the machine of FIG. 2.

As shown in FIG. 5, the exhaust side 43 of the carrier 18 at least partially incorporates the exhaust plenum 36. In FIG. 5, the direction of rotation in normal operation of the energy machine is with the carrier 18 rotating counterclockwise as shown in the figure. A mirrored version of the device shown may be used for reverse rotation. The exhaust plenum 36 is at least partially bounded radially inward in the carrier 18 by a plenum surface 65 that, in a first portion 66 of the exhaust plenum 36, has generally increasing cross-section in the direction of exhaust flow. That is, as exhaust escapes the cylinders, the plenums have increasing cross-section in the direction of exhaust flow, which is opposite to the direction of rotation of the carrier in normal operation. Thus, the exhaust gases are vectored from radially inward to circumferential movement opposite to the direction of rotation of the carrier. A second portion 65B of the exhaust plenum 36 generally has increasing cross-section in the direction of exhaust flow. In one embodiment, the plenum surface 65 in the first portion of the exhaust plenum 36 has plural sections 65A, 65B, 65C, each section being staggered from each other section in the direction of rotation. Other numbers of cross-sections are possible, as many as may fit in the structure.

Figure 6:
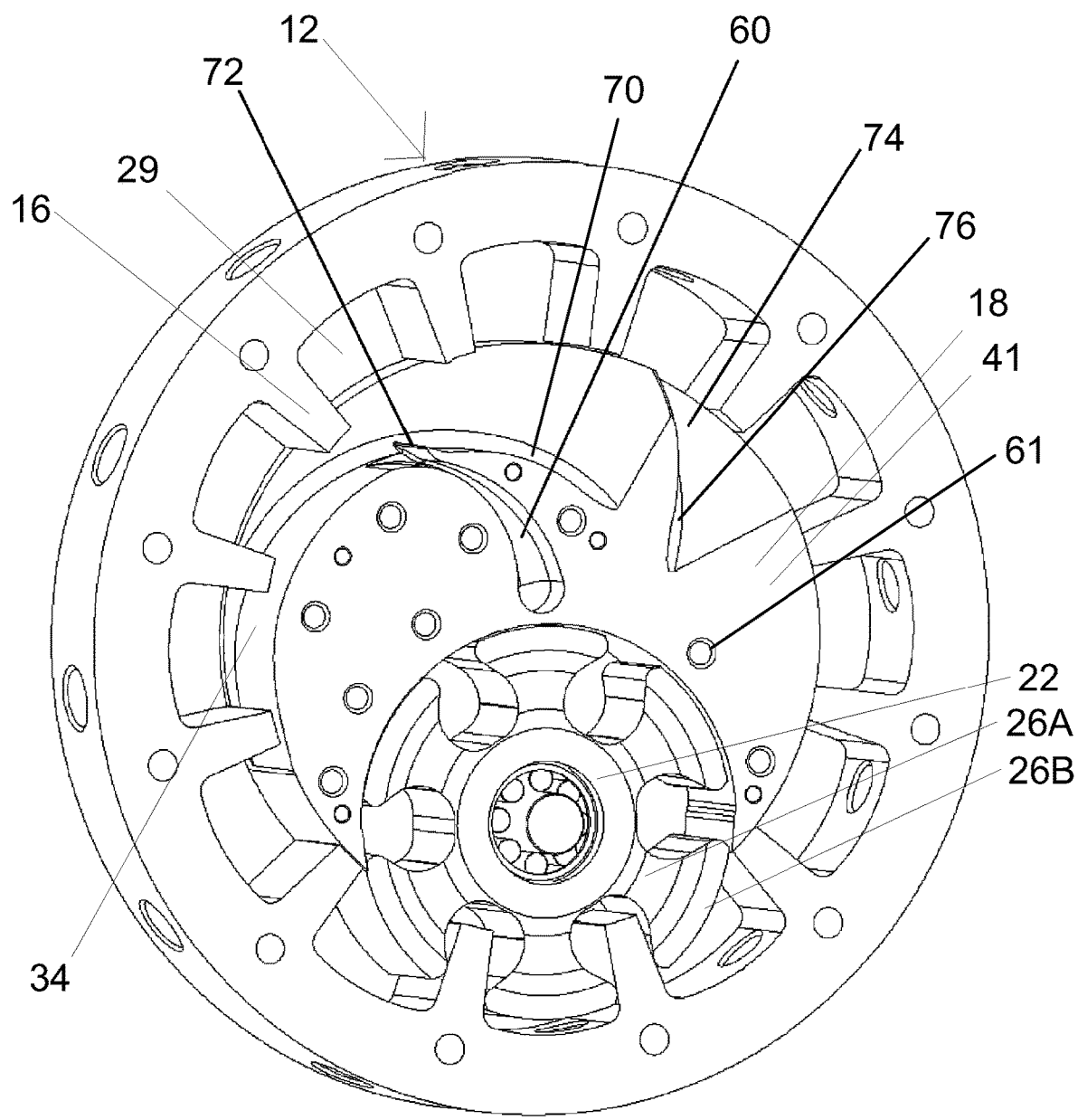
FIG. 6 is an isometric simplified view of the intake side of the assembly of FIG. 5.

On the air intake side, shown in FIG. 6, the air intake side of the carrier 18 at least partially incorporates the air intake conduit 34. In this figure, the carrier 18 has a direction of rotation in normal operation that is clockwise in the figure. The air intake conduit 34 is at least partially bounded radially inward in the carrier 18 by an air intake surface 70 that slopes within the carrier 18 so that the air intake conduit 34 has decreasing cross-section in the direction of air flow. Thus, air is vectored radially outward opposite to the direction of carrier rotation relative to the carrier. The fuel intake conduit 60 extends from an inner part of the carrier 18 into the air intake conduit 34. A flow enhancer such as lip 72 at, for example, the junction between the air intake conduit 34 and the fuel intake conduit 60 is provided on the carrier 18 to induce turbulence in fuel being fed into the variable volume chambers 28 and assist in drawing air-fuel mixture from the conduit 60 by creating a low pressure region adjacent the lip 72. The carrier 18 may also be provided with a fresh air scavenge conduit 74 located forward on the carrier 18 relative to the air intake conduit 34 in the direction of rotation of the carrier 18. The fresh air scavenge conduit 74 is at least partially bounded radially inward in the carrier 18 by a scavenge surface 76 that slopes within the carrier 18. The purpose of the fresh air scavenge is to displace or partially displace combustion gases. As shown in FIG. 6, in one embodiment, the air intake surface 70 slopes at a lower angle than the scavenge surface 76.

The engine shown is analogous to a two-stroke piston engine cycle, but without many of the drawbacks of a two-stroke piston system.

A single inner rotor 22 allows the engine to use much of the carrier rotation between the end of the expansion phase and the beginning of the compression phase to exhaust the combusted fuel/air mixture from the cylinders and to provide a fresh charge of air for scavenging air and/or providing air/fuel mixture to the cylinders. A single rotor also allows the engine to use much of the carrier rotation between the end of the expansion phase and the beginning of the combustion phase to cool the components which are heated by the combustion phase. An outer stator provides the advantage of a much lower leakage gap due to the elimination of the leakage gap between the spinning outer rotor and the casing of the device of the '221 publication. The air scavenge features may be used for example to allow decreased emissions of unburnt fuel.

Figure 4:
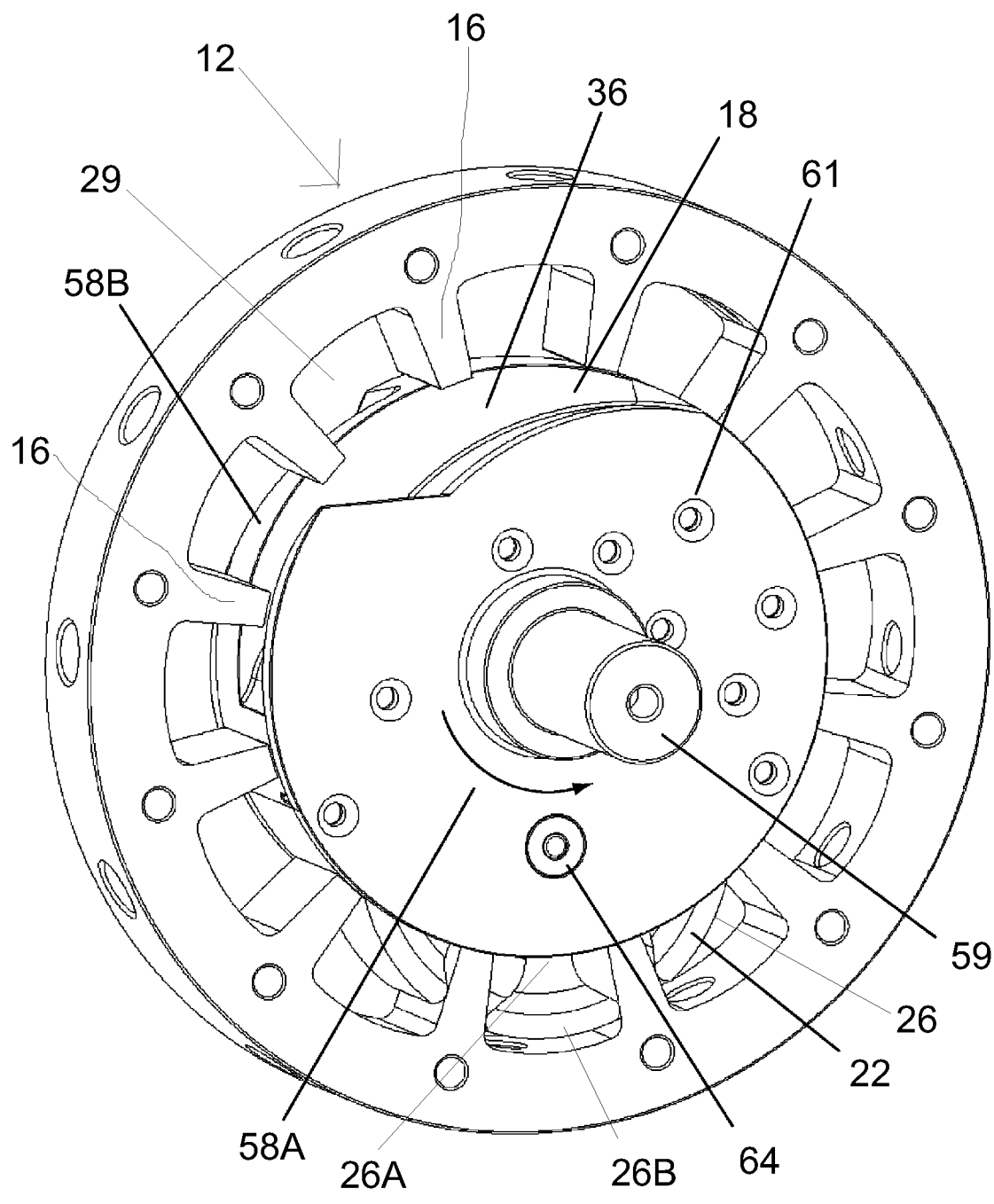
FIG. 4 is an isometric simplified view of an inner assembly for the machine of FIG. 2.

As shown in FIG. 5, for example, the projections 26 of the inner rotor 22 may each have a toe 26C and a heel 26D. The toe 26C and heel 26D in some embodiments are radiused as shown in FIG. 5. The radius provides for increased wear resistance of the toe 26C and heel 26D. Each toe 26C and heel 26D may be considered to be respective adjacent ones of the projections 26 illustrated in FIG. 1. That is, the foot 26B shown for example in FIG. 4 is made up of two cylindrical versions of the projections 26 of FIG. 1 joined together and connected with a single leg 26A to the remainder of inner rotor 22. Thus, the radius of one of the toes 26C or heels 26D functions in like manner to the radius of a projection 26 in FIG. 1. The sides 16A, 16B of the projections 16 in FIG. 4 follow the straight lines traced by the outer edges of the toe 26C and heel 26D respectively, these lines being offset and parallel or nearly parallel to the radial paths of the center points of the heel 26D and toe 26C. The sides 16A, 16B may be feathered, that is, cut-away slightly at their inner extremity to ease the transition of the pistons 26 in and out of the cylinders formed by the projections 16.

The ratio of R:X for the embodiment of FIGS. 2-6 is 2:1, which means that points on the rotor foot 26B lying a distance X from the axis of the inner rotor move in straight lines in relation to the stator 12. The sides 16A, 16B, of the projections 16 thus contact the toes 26C and heels 26D as the centers of the arcs of the toes 26C and heels 26D follow their straight paths that extend radially through the carrier axis A. The location of the sides 16A, 16b of the projections 16 that contact the toe 26C and heel 26D is established by the path traced by the outer surfaces of the toe 26C and heel 26D as the outer surfaces of the toe 26C and heel 26D maintain a close tolerance or contact seal with the sides 16A, 16B of the projections 16. In a multiple inner rotor configuration, as used for example in a pump or compressor or expander, where the ratio R:X is greater than 2, the paths traced by points on the feet of the projections 26 will follow hypocycloid or near hypocycloid paths, but will be in any event defined by well-known mathematics describing the paths of points on or inside a circle rolling inside another circle. These paths, modified to account for any material loss or addition, for example, for wear purposes, define the shape of the sides 16A, 16B of the projections 16.

A more detailed description of the operating principle/cycle of an embodiment of the engine is as follows. Air is drawn into the engine through the intake shroud 44 as a result of the reduction of air pressure caused by the air intake 34 of the spinning carrier 18. The fuel can be added to this incoming air in various ways such as by a venturi as in a conventional carburetor, or by a fuel injector in combination with an air throttle valve to control the incoming air volume and to maintain the correct fuel-to-air mixture ratio for proper ignition and combustion if a spark ignition combustion is desired. The fuel may also be drawn in through the centrifugal fuel conduit 60, which allows fresh air to be drawn in first, to scavenge the combusted air via the fresh air scavenge conduit 74. If detonation ignition is used, then the amount of fuel is controlled to produce the desired power output.

The air and/or air/fuel mixture is then centrifugally charged into the stationary cylinders 29 defined by the inward projections 16 of the stator 12. The exhaust plenum 36 preferably closes once all of the combusted gases are expelled (and possibly some of the fresh air) but before any of the unburned fuel/air mixture can be expelled. The wedging effect of the carrier air intake plenum 34 insures that the desired initial pressure of the stationary cylinders 29 is reached before compression. This may be below, at, or above atmospheric pressure, depending on the design requirements.

For a detonation engine, the compressed cylinder volume is preferably lower than the desired volume necessary for detonation combustion (that is, the compression ratio is higher than necessary to produce the heat required for ignition). The air intake 34 is then throttled slightly to achieve the desired compression ratio to achieve detonation at or near maximum compression. A computer may be used to throttle air coming into the engine to achieve optimum full compression pressure (and therefore temperature) at various operating speeds and conditions. In this way it should be possible to actively control the amount of air entering the engine (by the throttle valve), and therefore the final compression pressure so ideal detonation operating parameters can be achieved for a wide range of speeds and power output. An engine such as this would likely require a spark ignition at low speeds such as when starting and then switch over to detonation when the required speed (for sealing and aerodynamic compression) is achieved. A glow plug may also be used to initiate detonation in certain conditions.

Just before the mechanical compression by the inner rotor 22 phase begins, the carrier 18 seals the cylinder volume completely. Mechanical compression then begins when the tips of the inner rotor feet 26B enter the cylinders 29. Ignition takes place at or near maximum compression. A close tolerance seal should exist between the outer surface 24 of the inner rotor feet 26B and the inner surface of the carrier 18. Thus, rotor foot 26 should make a close tolerance seal with the surface 23A of the carrier 18 shown in FIG. 5. Surface 23A is a rectangular surface in this embodiment that extends around the inner surface of the carrier 18 just inside the tip 21 of the carrier part that holds the inner rotor 22. Improved performance is obtained with a sharp tip 21, as well as a sharp corresponding tip on the other side of the opening that receives the inner rotor 22 in the carrier 18. A close tolerance seal should also exist between the corresponding surface 23B on the other side of the opening that receives the inner rotor 22 in the carrier 18. Also, a close tolerance seal should exist between the tips of the projections 16 and the carrier outer surfaces 23C and 23D, which in FIG. 5 are shown with a close tolerance seal with projections 16S and 16T respectively. Clearance should be provided between the carrier 18 and stator 12 to reduce friction and ease assembly. On the other hand, the flat face of the side of the inner rotor 22 and the flat face of the stator 12 have a close tolerance fit, for example with less than 0.001 inches clearance combined on both sides, hence less than 0.0005 inches clearance on each side. Such flat surfaces may be achieved for example by grinding.

Air flow should be permitted around the projections 16 that extend into the pockets between rotor feet 26B or air flow should be provided between adjacent pockets on either side of a rotor foot 26B. Such features avoid compressive work or forces due to air compression in the pockets between the rotor feet 26B.

If a spark ignition is used, then a spark plug with some sort of timing means may be used. A more simple system would use a single electrode or conductor on the outer surface of each inner rotor foot 26B which comes into close proximity with two or more electrodes on the outer surface of the cylinders defined by the inward projections 16. In one embodiment, high voltage electricity is supplied to one of the stationary electrodes on the cylinder, causing it to arc to the inner rotor electrode (or conductor) and then to the other stationary electrode which is grounded. An array of stationary electrodes may be used which are wired separately and supplied with spark producing voltage with some of these separately wired electrodes coming into spark proximity sooner than others. In this way, it is possible to change the ignition timing by simply diverting voltage from one set to the next. This spark ignition may also be used to increase the pressure in the chamber enough to initiate detonation and thereby reducing or eliminating the possibility of pre-detonation. Varying voltage may also be used to vary timing by causing the spark to jump the gap between the stator and the inner rotor at various rotor positions. Other ignition means using an external energy source, rather than heat resulting from compressive energy, may be used, particularly ignition means that increase the ignition speed, as are now known or hereafter developed. To facilitate fast ignition at high engine speeds, a series of electrodes or other ignition devices could be arrayed circumferentially along the inner surface of the stator cylinders and activated at the same time or in a desired pattern, such as sequentially. The ignition devices in one embodiment initiate a spark from the stator surface through the compressed gas to the outer surface of the inner rotor for one or more of the ignition devices, thereby maximizing the flame front surface area and the speed of combustion.

When combustion takes place and expansion begins, the vector force of pressure pushing against the outward facing surface 24 of the inner rotor feet 26B, causes the carrier 18 to rotate via the force transferred to the inner rotor shaft 64 and bearings 63. This expansion force happens N times per carrier rotation, where N is the number of cylinders defined by the inward projections 16. N may be, for example, 12 as in the embodiment shown. The expansion force is constantly overlapping, and in the 12 cylinder example gives the engine a twelve stroke high torque operating principle. Greater or fewer pistons 25 and cylinders 29 may also be used.

When the expansion phase is complete, any elevated pressure gases are preferably exhausted gradually, or in stages, and vectored away from the rotation of the carrier 18 though the vectored expansion plenums 65A, 65B, 65C, to provide extra rotational energy to the carrier 18. The first stage expansion plenum 65A has a very small cross section to make maximum use of the high pressure as it is vectored away from the rotation of the carrier 18. This will also have the benefit of reducing the sound wave energy (which usually accompanies internal combustion engines where the valves or ports open much more suddenly) because this escaping pressure is gradually released instead of all at once. The second vectored expansion plenum 65B has a larger cross section for capturing energy from the lower pressure that still remains after the first stage pressure drop and to insure that the pressure is reduced significantly before the combusted gases enter last vectored plenum. The last vectored expansion plenum 65C is intended to capture remaining pressure energy if pressure still exists in the cylinder.

The depressurized gas is vectored axially by the exhaust plenum 65 toward the exhaust ports 46 and replaced with fresh air from the fresh air scavenge conduit 74 and the cycle is repeated.

Lubrication may be accomplished by the use of a common two-stroke fuel lubrication additive. For lower emissions, the use of a fuel such as a high lubricity diesel may provide enough lubrication on the compression side even though all of the fuel may be combusted on the expansion side. This is due to the fact that the compression phase pistons determine the position of the less lubricated expansion phase pistons. In addition, the cylinder walls which are radially inward from the expanding chamber, which are sealed from the combustion temperature and flame, should provide lubrication for the advancing (radially inward) pistons 25 contact.

Using detonation combustion intentionally is a problem for piston engines because the highest pressure phase, where detonation would occur, has a relatively long dwell time and so the detonated air/fuel mixture has a relatively long time where the increased pressure and temperature can cause damage to the pistons and cylinders. The disclosed engine, on the other hand, does not have this same sinusoidal compression/expansion profile and so the pistons 25 spend only a small fraction of the time at full compression where detonation could cause damage. Advantages of detonation combustion are believed to include higher power, lower emissions and higher efficiency.

Another embodiment of the energy transfer machine 10 shown in FIG. 1 is for use as a compressor or vacuum pump. The device in this embodiment may have less than half as many "pistons 25" on the inner rotor/s 22 as "cylinders 29" on the outer stator 12. An example of a compressor or pump is shown in FIGS. 7-10. The geometry of the inner rotor 22 and carrier 18 of the pump 80 of FIGS. 7-10 is the same as the corresponding parts of the pump of FIGS. 15 and 17 in the '221 publication. Unlike the device of the '221 publication, the pump 80 of FIGS. 7-10 uses a fixed outer stator 12.

A device according to FIG. 1 may be used as a vacuum pump if gas is drawn into the center casing volume and expelled through one way valves in each cylinder as the inner rotor seals and compresses this gas to a higher pressure than is on the outside of the one way valves. The pump may be used as a compressive or non-compressive pump. In a pump embodiment, the output shaft of the carrier becomes a drive input.

Figure 7:
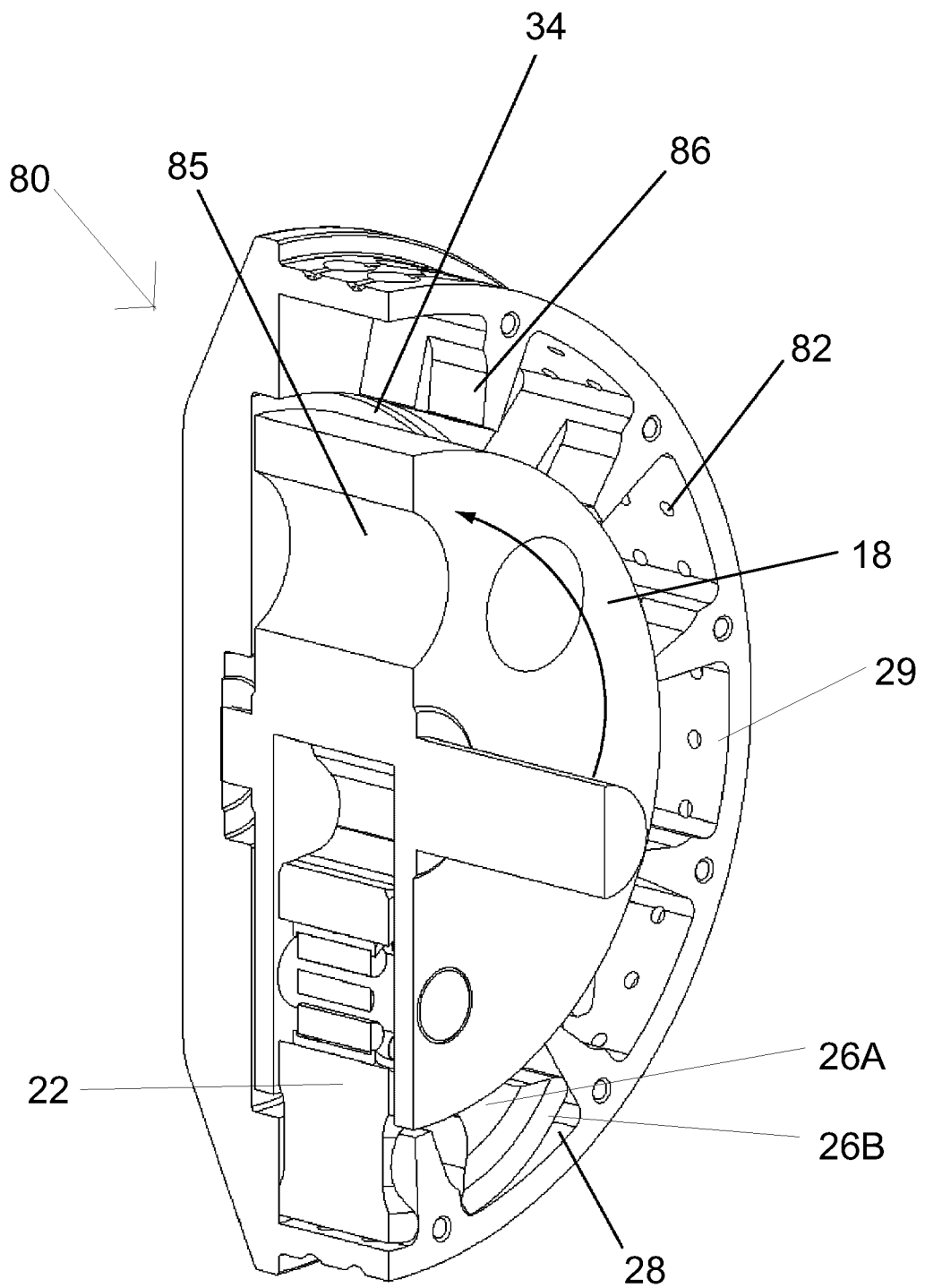
FIG. 7 is an isometric section view of the machine of FIG. 1 configured as a pump.
Figure 9:
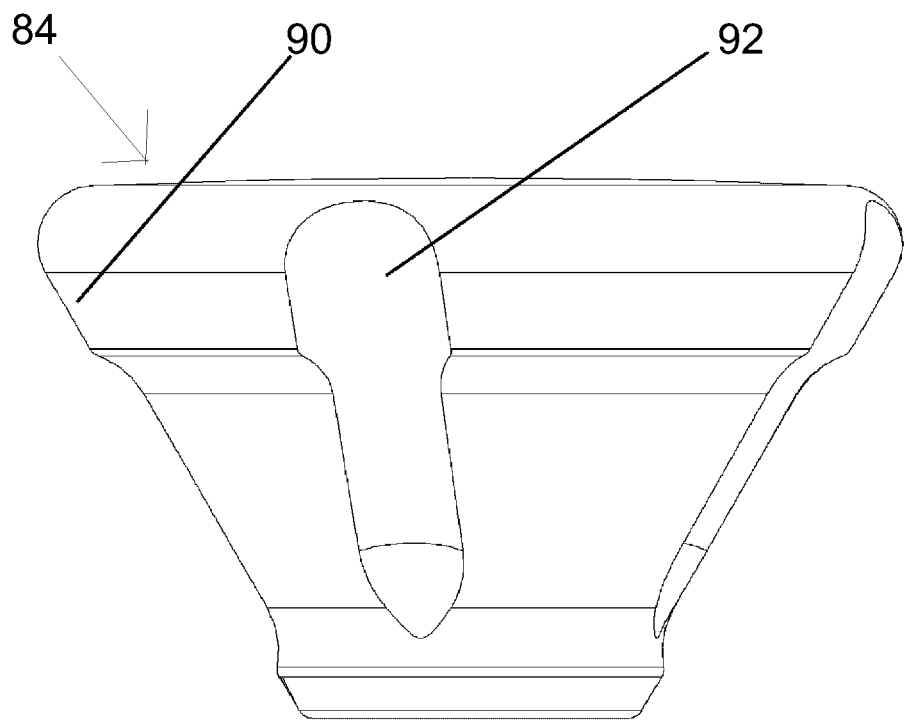
FIG. 9 is a side view of a plug for use in the machine of FIG. 7.

Shown in FIG. 7 is a simple but effective embodiment of a vacuum pump 80. As mentioned in the spherical piston 25 example of FIG. 1, each cylinder 29 defined by inward projections 16 has some type of one way valve as for example valves 82 which allows the pistons 25, defined by outward projections 26, to push gases out of the cylinders 29 but does not allow the gases to flow back in. The one way valves 82 may be tapered plugs 84 as shown in FIG. 9, or they may be reed valves or a single molded band, possibly with tapered or other-shaped protrusions or other suitable valves. Tapered plugs of some sort, whether individual plugs or multiple plugs molded as one piece to a flexible band or spring, are preferable because they allow a very low final compression volume, by filling the volume between the inner and outer surfaces of the stator and therefore providing high vacuum pressure or high compression pressure.

The embodiment of FIGS. 7-10 may also be used as a compressor if an additional elevated pressure plenum is provided around the outside of the cylinders 29 to contain the air which is pushed past the valves (not shown in the drawings).

An important feature of this vacuum pump 80 (or compressor) design is a system of relief cuts or channels 86 which allow air to fill the expanding sealed chamber between each inner rotor foot 26B and cylinder 29 after each compression phase (12/carrier revolution in these examples) is complete. Balance bores 85 may be drilled in carrier 18 to offset weight distribution and/or reduce the overall weight of the unit.

The example of FIG. 8 is shown with a single inner rotor 22, but multiple inner rotors 22 (or other piston/cylinder geometries or numbers) may also be used.

Figure 8A:
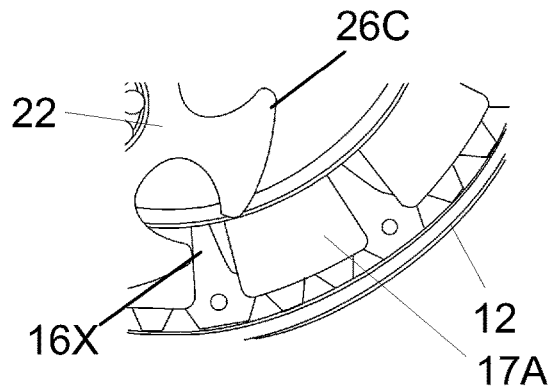
FIGS. 8A-8E are a sequence of views showing operation of the machine of FIG. 7.
Figure 8B:
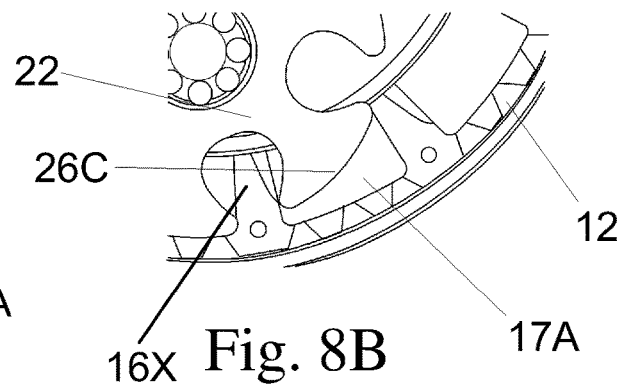
Figure 8C:
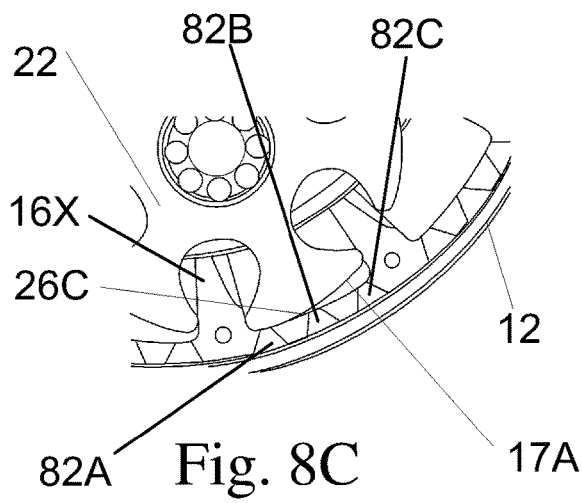
Figure 8D:
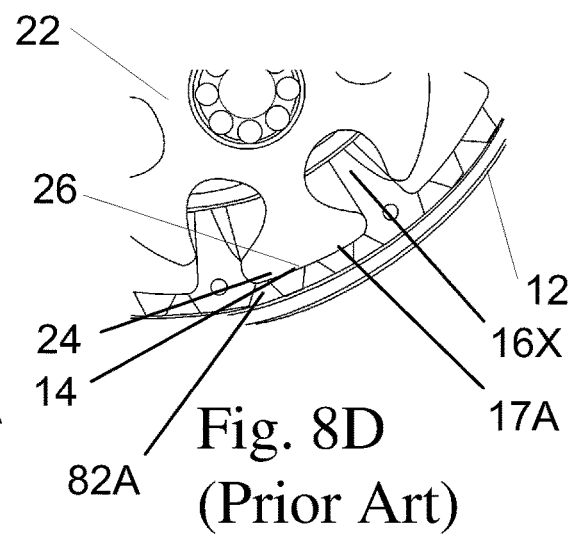
Figure 8E:
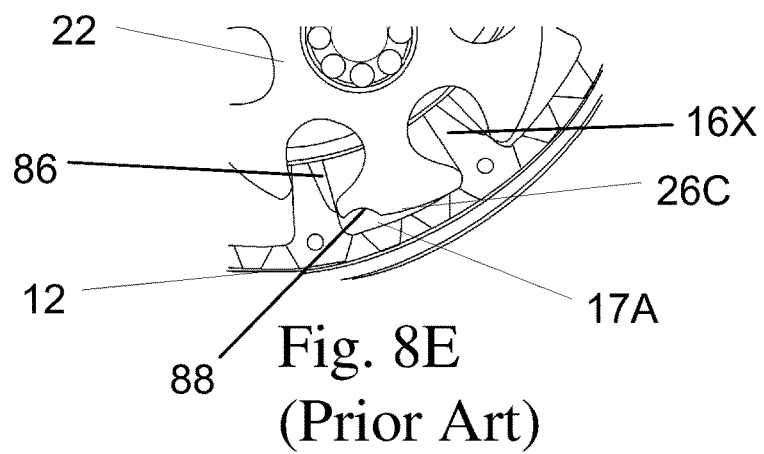

In FIG. 8A, inward projection 26C is about to enter chamber 17A defined by outward projections 16X. The projections 16X include the elements shown and the material forming the sidewalls of the chamber 17A. The carrier 18 may seal the cylinder chamber 17A before mechanical compression begins. In FIG. 8B, mechanical compression begins in chamber 17A as the leading edges and trailing edges of the projection 26C seal against the cylinder walls. In FIG. 8C, which shows the first part of the compression cycle, all three one way valves 82A, 82B, and 82C are available to expel pressurized gas. In FIG. 8D, the seal between the outward surface 24 of the inner rotor 22 and the inward surface 14 of the stator 12 moves across the chamber 17A in the direction of movement of the carrier 18. The seal in this case may, for example, be a contact or close tolerance seal or overlapping seal, such as a labyrinth seal. As the seal moves across the chamber 17A, each of the valves allows gas to escape. The final volume at this position can be extremely low. As little as 1/400th of the initial volume has been predicted by computer models which allows for very low vacuum pressure or high compression pressure. In FIG. 8E, cut-outs 86 in the cylinder wall (and/or could be in the piston 25 wall) allow gas to fill the expanding chamber 17A after compression is complete. A small pocket 88 in the foot 26C allows the trailing expansion volume to increase with a reduced vacuum spike. An embodiment with multiple rotors may eliminate or reduce air flow features such as cut-outs 86, 88 due to its inherent characteristic of unsealing during only one of the entry or exit of the foot into a cylinder. The valves 82 may also be located in the sidewalls of the chambers 17A.

Figure 8F:
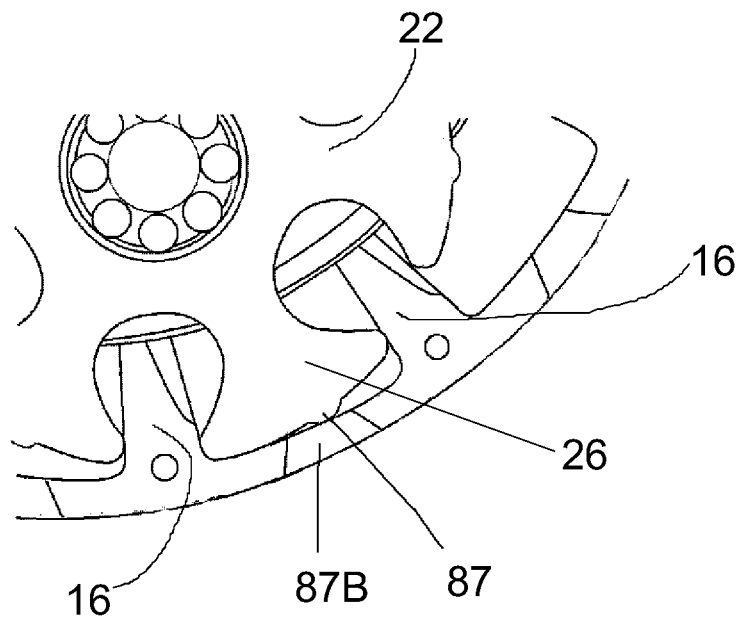
FIGS. 8F and 8G are views of energy transfer machines with features to allow use of the machines as expanders.
Figure 8G:
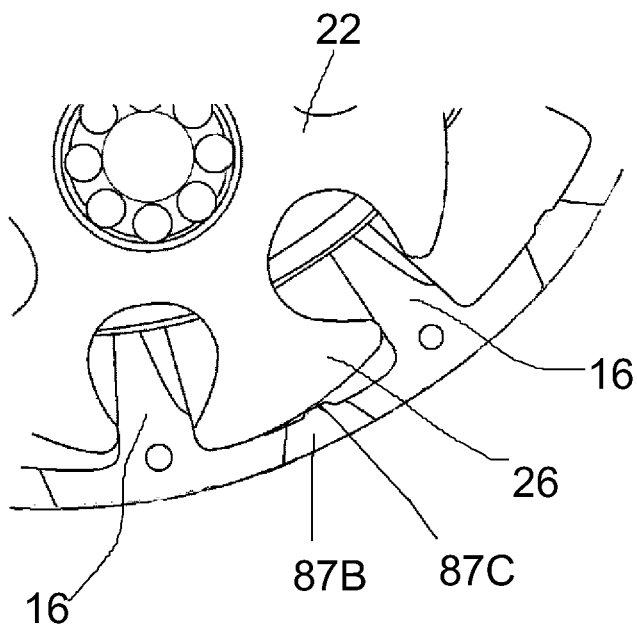

In an expander configuration, two of which are shown in FIGS. 8F and 8G, a feature is provided to cause inlet valves 87B to open. In the example of FIG. 8F, the feature is a bump 87 on the outer surface of the projection 26, while in the example of FIG. 8G, the feature is a bump 87C on the valve 87B. The valves 87B may otherwise be designed as valves 84. The features 87, 87C cause the valves 87b to open by mechanical pushing when the rotor is at or near full compression.

Figure 10:
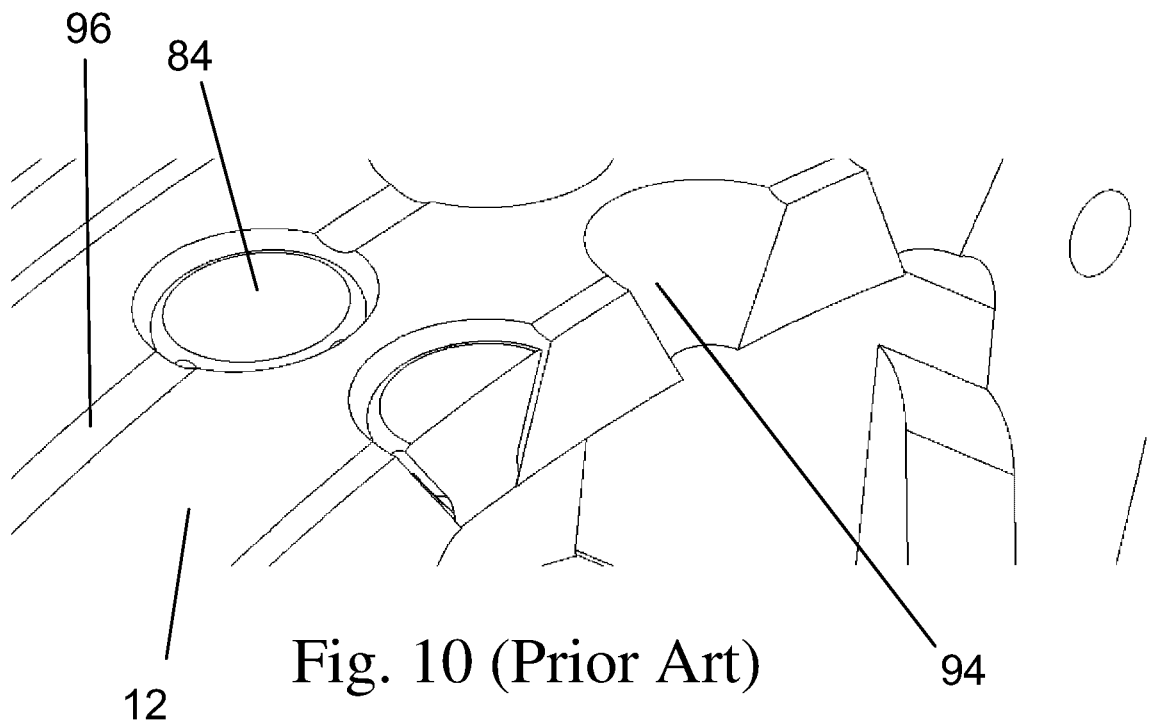
FIG. 10 is an isometric view, partly in section, showing plugs of FIG. 9 installed.

FIG. 9 shows a tapered plug 84. Tapered outer edge 90 positions the plug in a tapered bore in the outer stator 12. Relief cuts 92 allow pressure to equalize on all surfaces up to the seal face. On the narrower side of the plug 84, the taper is relieved to prevent higher pressure expelled air from creating too much sealing force as a result of increased surface area. The tapered plug 84 may be a separate part from a device used to hold the plug 84 in place, such as an elastic or spring means, and it may be molded as one part with such a device. As shown in FIG. 10, plugs 84 are shown in tapered bores 94 in the outer stator 12. A groove 96 may be provided in the tapered bore 94 for receiving an O-ring or spring or other resilient retainer device.

It is possible to completely eliminate the contact between pistons 25 and cylinders 29 (and thereby allow the use of non-lubricating fuels or gases) if the inner rotor/s 22 is/are geared to a fixed stator. The fixed stator gear is coaxial with the carrier rotational axis. In this case, the inner rotor is preferably fixed to a shaft which has a gear fixed to it inside a sealed, lubricated, chamber which rotates as an integrated part of the carrier. One or preferably two idler gears between the inner rotor/s gear transmits force to (or from) the fixed gear. In actuality, when the inner rotor geometry of FIG. 2 is used, there is very little force which must be transmitted through the gears, but higher speeds and pressures may be possible with this configuration with lower wear and reduced need for exotic materials for the pistons 25 and cylinders.

The use of different radii on the leading and trailing tips of the inner rotor feet 26B provides advantages. Different radii have the effect of changing the rotation force on the inner rotor 22 which is caused by the pressure of the compressing and or expanding gases. Different leading and trailing tip radii may be selected, tested and optimized to minimize the rotational force of the inner rotor 22 relative to the cylinders 29. A larger radius on one tip will generally result in a greater force (due to pressure) away from the larger radius tip (that is, rotationally in the direction of the smaller radius tip) as a result of a larger surface area affecting rotation of the inner rotor which the pressure is acting on.

Figure 11:
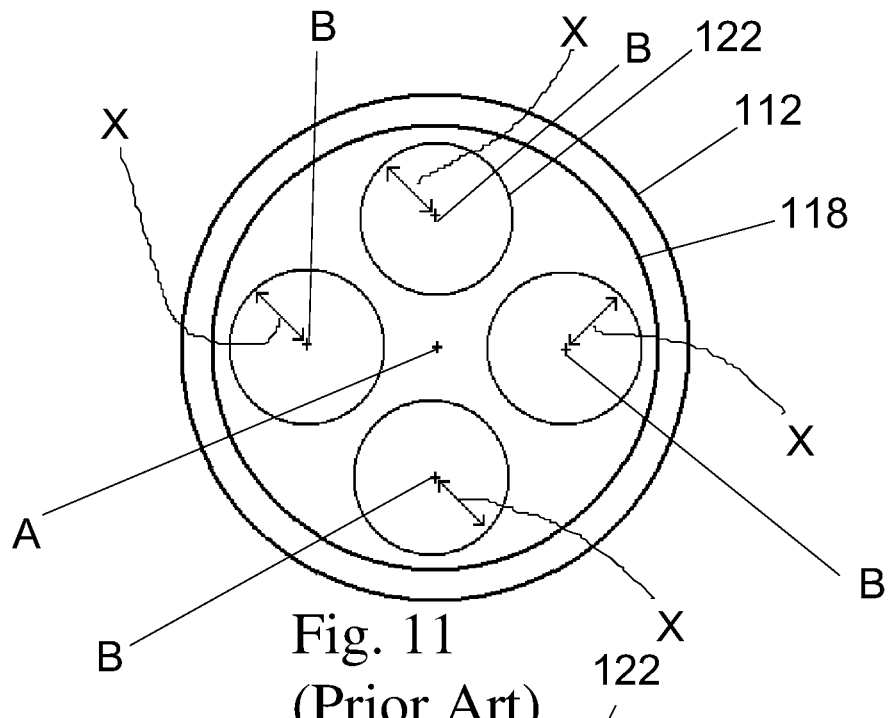
FIG. 11 illustrates a four inner rotor embodiment of an energy transfer machine.

FIG. 11 shows schematically an embodiment of an energy transfer machine with a stator 112 containing an inner carrier 118 rotating about an axis A. Four identical inner rotors 122 rotate about respective axes B that are parallel to axis A. An embodiment with 2 or more inner rotors 122 has the advantage that it can be more readily balanced with respect to inertial loads and forces exerted by the fluid pressure in the cylinders. R in this case is equal to AB, the distance from A to B, plus 2X. If the ratio of R:X is not equal to 2 then the points on the inner rotors 122 will not follow straight lines, and the pistons of the inner rotors 122 can seal with the cylinders on the stator 112 only during one of compression and expansion and not both. For example, if AB equals 2X (that is, each rotor lies a distance X from the center axis A), then R:X=3 and each inner rotor 122 will rotate three times while the carrier 118 rotates once within the stator 112.

Figure 12:
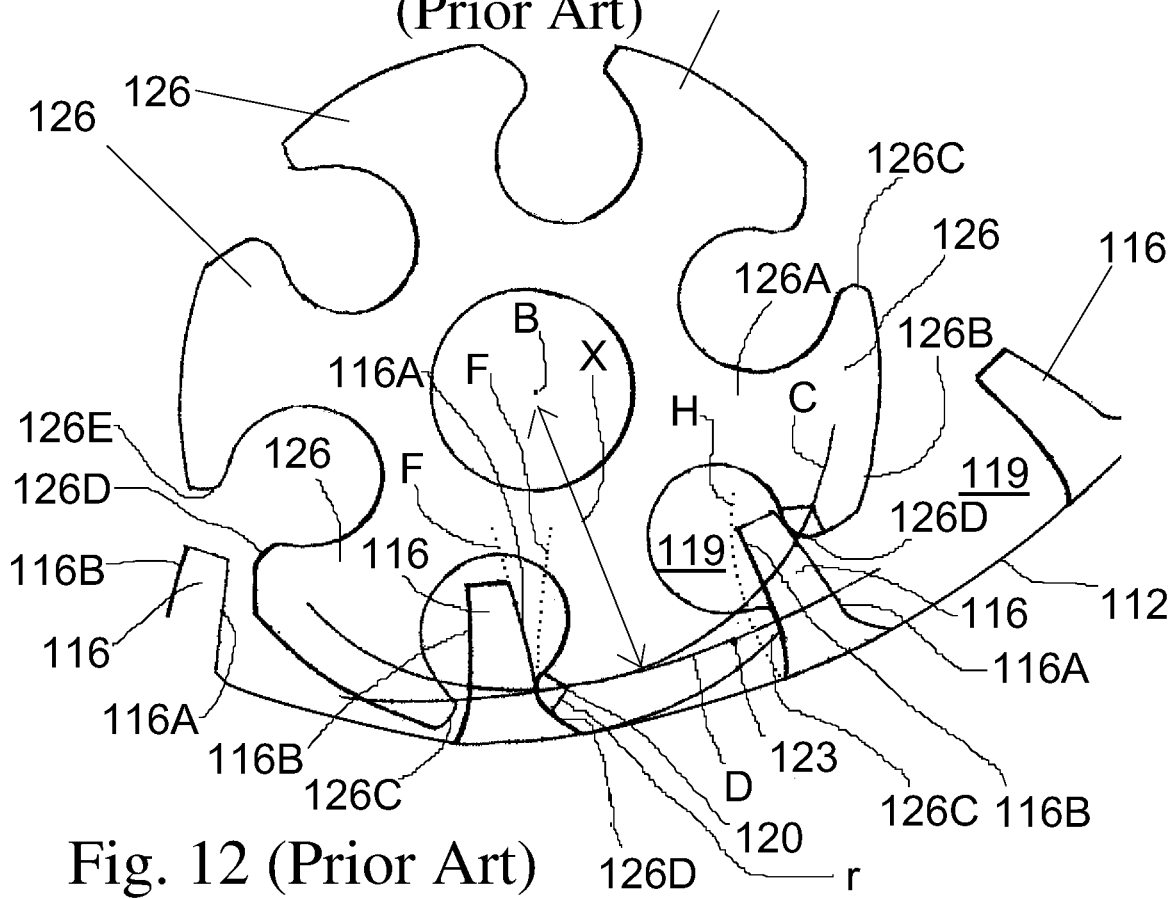
FIG. 12 shows an inner rotor and construction principles for use as the inner rotors of FIG. 11.

FIG. 12 shows an embodiment of an inner rotor 122 that may be used in the energy transfer machine of FIG. 11. The inner rotor 122 has six projections 126 rotating about axis B. Each projection 126 is formed from a foot 126B and a leg 126 A. Each foot 126B has a toe 126C and heel 126D. Each heel 126D has an outer surface that is defined by a radius r about a point 120. As the point 120 rotates about the inner rotor axis B, it traces out a path C in the inner rotor frame of reference, and a hypocycloid path in relation to the stator 112, namely the path followed by a point on a circle rotating inside a large circle. The large circle in this case is a virtual circle part of which is shown by the arc D in FIG. 12. The exact equation for the path is well known mathematics and depends on the ratio R:X. Each point on the outer surface of the heel 126D thus traces a path that is offset from the path of the point 120 by an amount equal to the radius r. The path thus traced by the outer surface of the heel 126D is the position of the surface 116A of the projection 116 adjacent the heel 126D. In this manner, the heel 126D may maintain contact or sealing proximity with the adjacent projection 116 as it enters a cylinder 119 formed between two consecutive projections 116. The path traced by points on the heel 126D that contact the surface 116A is shown as line F. Additional material may be added to the base of the foot 126B to fill in the cylinder 119 when the projection 126 is at its deepest position in the cylinder 119.

For the toe 126C, slightly different considerations apply. A point 123 in the toe 126C lies outside the circle C. This point 123 follows a slightly modified hypocycloid path. This path is defined by the path of a point outside of a circle that rotates in a larger circle. The path has the shape shown for the surface 116B of each projection 116 and again is defined by known mathematics. The location of the surface 116B is offset perpendicularly from the path actually traced by the point 123 by an amount equal to the radius of the toe 126C, which radius is centered on the point 123. In one embodiment, the radius of the heel 126D is not equal to the radius of the toe 126C. The path of a point 126E at the extremity of the toe 126C is shown by the surface 116B and path H. Path H shows the path of the point 126C as it exits the cylinder 119. The maximum height of the projection 116 is thus determined by the need for the toe 126C to clear the projection 116. In this manner, the toe 126C may maintain contact or sealing proximity with the cylinder wall 116B during a compression stroke as the foot 126B enters the cylinder 119, but loses contact or sealing proximity with the cylinder wall 116B as the foot 126B exits the cylinder 119.

Thus, in the inner rotor 122, with R not equal to 2X, the foot 126B maintains contact or sealing proximity with the cylinder walls 116A and 116B as it enters the cylinder 119, and loses contact with the cylinder walls 116A and 116B as it exits the cylinder 119. For this reason, cut-outs 86, 88 as shown in FIG. 8E are not required if R is not equal to 2X. The embodiment of FIGS. 11 and 12 is useful for a pump, vacuum pump or compressor used with one-way valves illustrated in relation to FIGS. 7-10.

Figure 13:
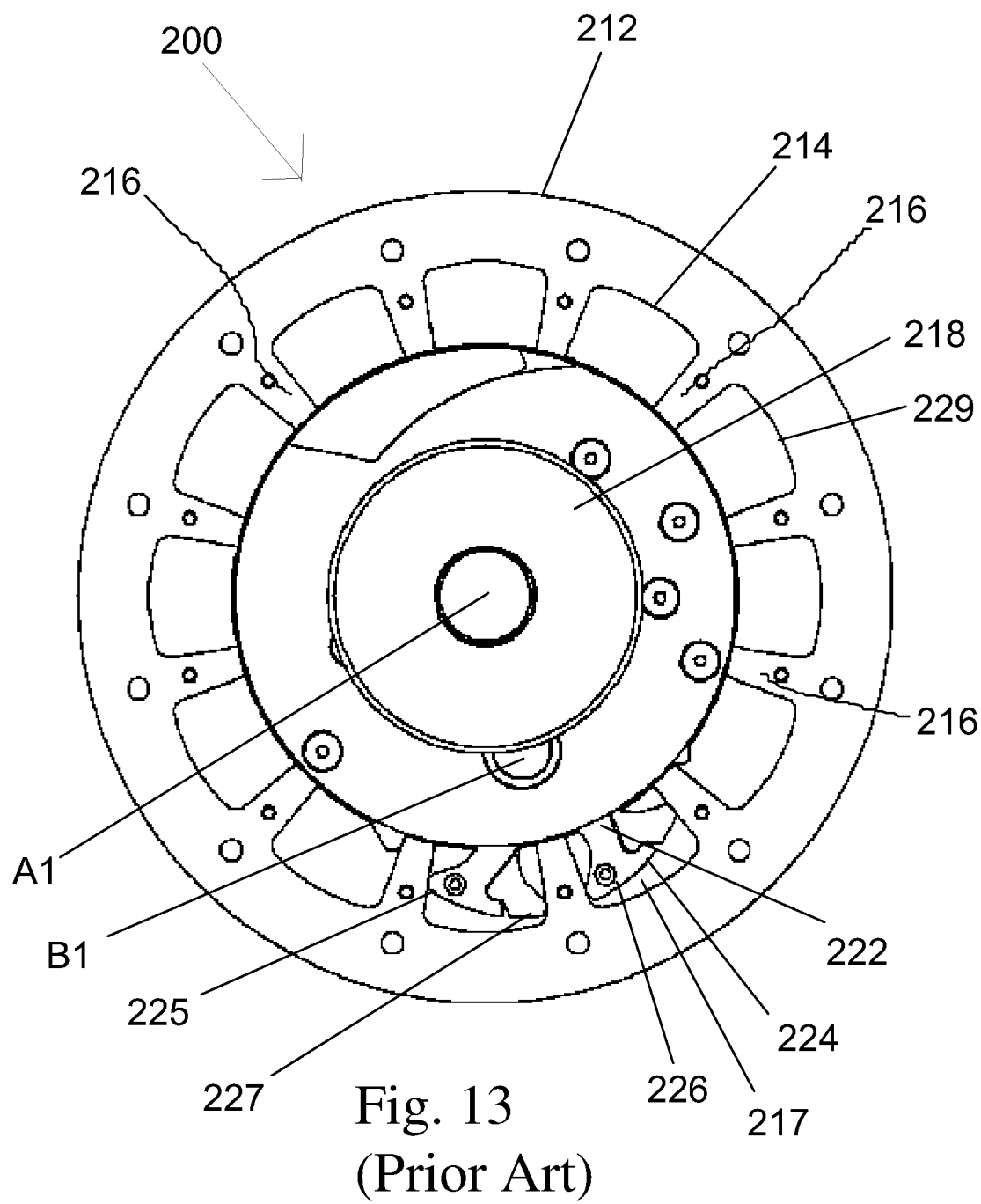
FIG. 13 is a front view of a device with an inner rotor having circumferentially expandable outward projections.

Referring to FIG. 13, there is shown an energy transfer machine 200, with an outer housing 212 having an inward facing surface 214 and inward projections 216 arranged around the inward facing surface 214. The inward projections 216 define cylinders 229. A carrier 218 is secured for rotation at least partly within the outer housing 212 about an axis A1. An inner rotor 222 is secured for rotation about an axis B1 within the carrier 218. The inner rotor 222 has an outward facing surface 224 and outward projections 226 arranged around the outward facing surface 224. The inward projections 216 project inward and the outward projections 226 project outward to mesh with each other and define variable volume chambers 217 between the inward projections 216 and the outward projections 226, as the inner rotor 222 rotates within the carrier 218. The outward projections 226 each have a leading edge 225 and trailing edge 227. The outward projections 226 are circumferentially expandable under inward radial fluid pressure to bias the leading edges 225 and trailing edges 227 of the outward projections 226 into continuous sealing contact with the inward projections 216 of the outer housing 212 as the inward projections 216 and outward projections 226 mesh with each other. Fluid transfer passages, such as described above in relation to the engine and pump embodiments shown in FIGS. 2 and 7 respectively, are provided on at least one of the outer housing 212 and carrier 218 to permit flow of fluid into and out of the variable volume chambers 217. All leading edges 225 rotate as one piece and all trailing edges 227 act as one piece. This feature of the expanding inner rotor makes it work in this intermittent contact scenario with the outer cylinders. In other words, the leading and trailing edges 225, 227 which are in sealing contact position the edges which are not in contact so they mesh correctly when they mesh with the cylinder walls.

The device of FIG. 13 may operate as a rotor or gear for various devices such as a rotary compressor, expander, engine or pump device. The projections 226 of the device of FIG. 13, which function as pistons, expand in the circumferential direction between the sealing engagement surfaces of the leading edge 225 and trailing edge 227 of each projection 226.

Figure 14:
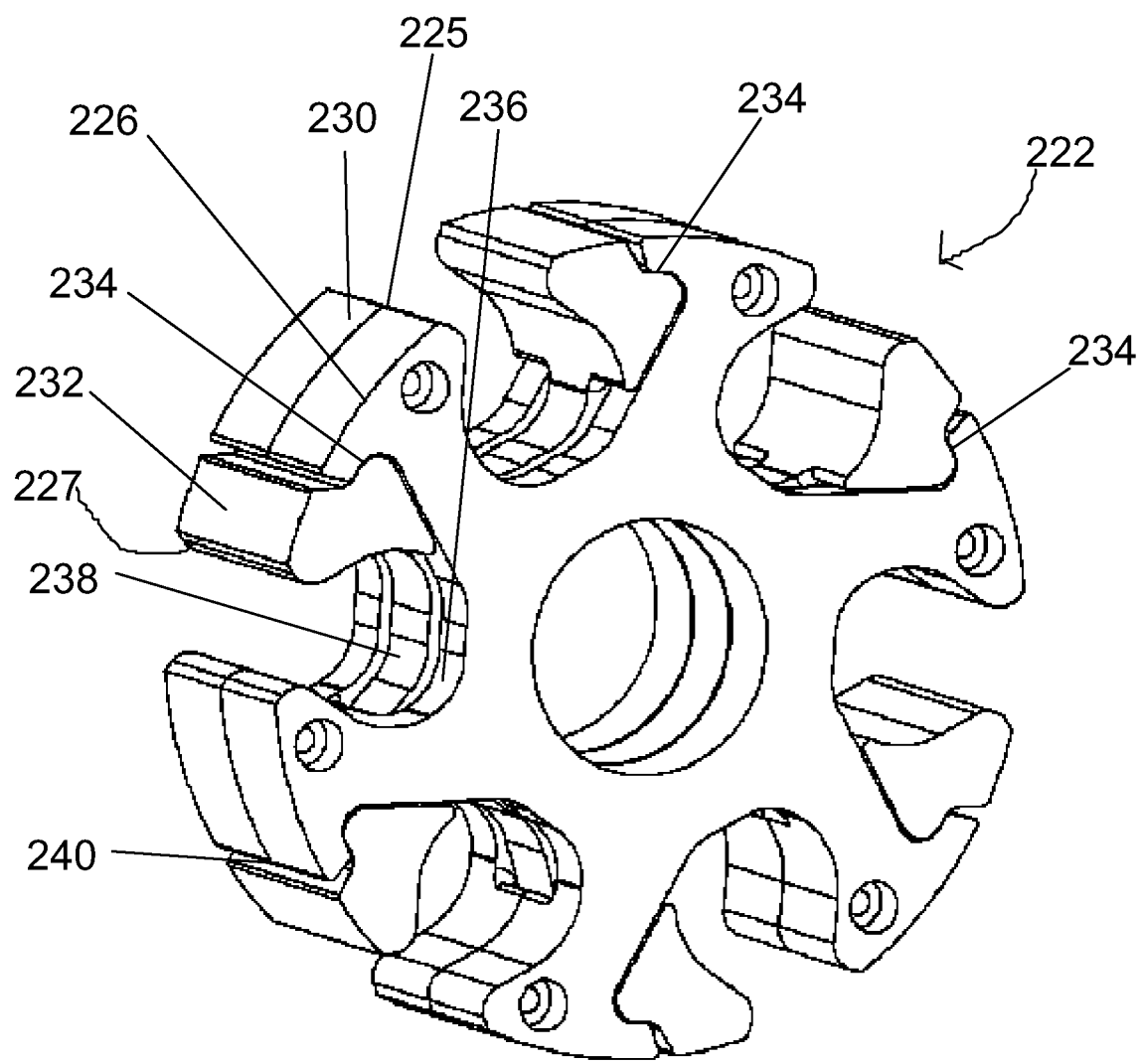
FIG. 14 is an isometric view of the rotor of FIG. 13.

As shown in FIG. 14, each outward projection 226 may be formed from a primary foot 230 and secondary foot 232 supported for circumferential movement relative to each other, with each primary foot 230 abutting the corresponding secondary foot 232 along a circumferentially extending sealing surface 234. Also as shown in FIG. 14, the primary feet 230 of the inner rotor 222 may be mounted on at least a first plate 236 that extends radially from the axis of the inner rotor 222, and the secondary feet 232 of the inner rotor 222 may be mounted on at least a second plate 238 that extends radially from the axis of the inner rotor 222. In this manner, the first plate 236 and the second plate 238 rotate independently to each other about the axis of the inner rotor 222. The independent rotation is permitted over an angle sufficient to provide continuous sealing contact of the leading edges 225 and trailing edges 227 of the outward projections 226 with the inward projections 216 of the outer housing 212, as well as sealing contact along the seal 234.

Thus, as in the embodiment shown in FIG. 14, the leading edges 225 of all projections 226 rotate around the rotor rotational axis as a one piece member, and the trailing edges 227 of all projections are able to rotate with to the plate 238 around the rotor rotational axis as a one piece member. The sealing engagement surfaces of the leading edge 225 of all projections 226 may be of one piece construction (or as an assembly which moves as one piece) and the sealing engagement surfaces of the trailing edge 227 of all projections 226 may be of one piece construction (or as an assembly which moves as one piece).

An advantage of this rotor construction of FIGS. 13 and 14 (for an application such as, but not limited to, an inner rotor of a compression device) is that the projections 226 can expand in the circumferential direction to account for wear and/or manufacturing inaccuracy without allowing individual projections 226 to expand while they are not in contacting engagement with the other stationary or rotary sealing member (such as, but not limited to, the outer rotor of a compression device or an outer fixed member of a compression device).

The embodiment of FIG. 13 is shown in simplified form (with front cover and other components removed) with an inner rotor 222 of an assembly where the mating sealing member of the outer stator 212 is stationary and the inner rotor 222 is rotating on a shaft which is attached to the rotating inner rotor carrier 218. The inner rotor design of FIGS. 13 and 14 may also be used in a configuration with multiple inner rotors.

A spring or springs may be used to provide the initial angular movement/force of the leading contact surfaces of the first plate 236 relative to the trailing contact surfaces of the second plate 238. The surface area 240, which is a gap extending from the outer surface of the projection 226 to the sealing surface 234 (and thus lies between the two expanding members 230, 232 of each projection 226) is preferably large enough to use the pressure of the compressed gasses and/or liquid to provide additional contact force to seal the leading and trailing contact surfaces 225, 227 of the projections 226, respectively, against the mating contact surfaces of the mating sealing member of the outer stator 212. Pressure on the surface area 240, plus any other forces tending to force the two members 230, 232 apart, must exceed the sum of opposing forces tending force the two members together, such as pressure on the contact surfaces 225 and 227. Many other applications also exist for internal and external gear pumps and compressors and other types of positive displacement devices.

Figure 15:
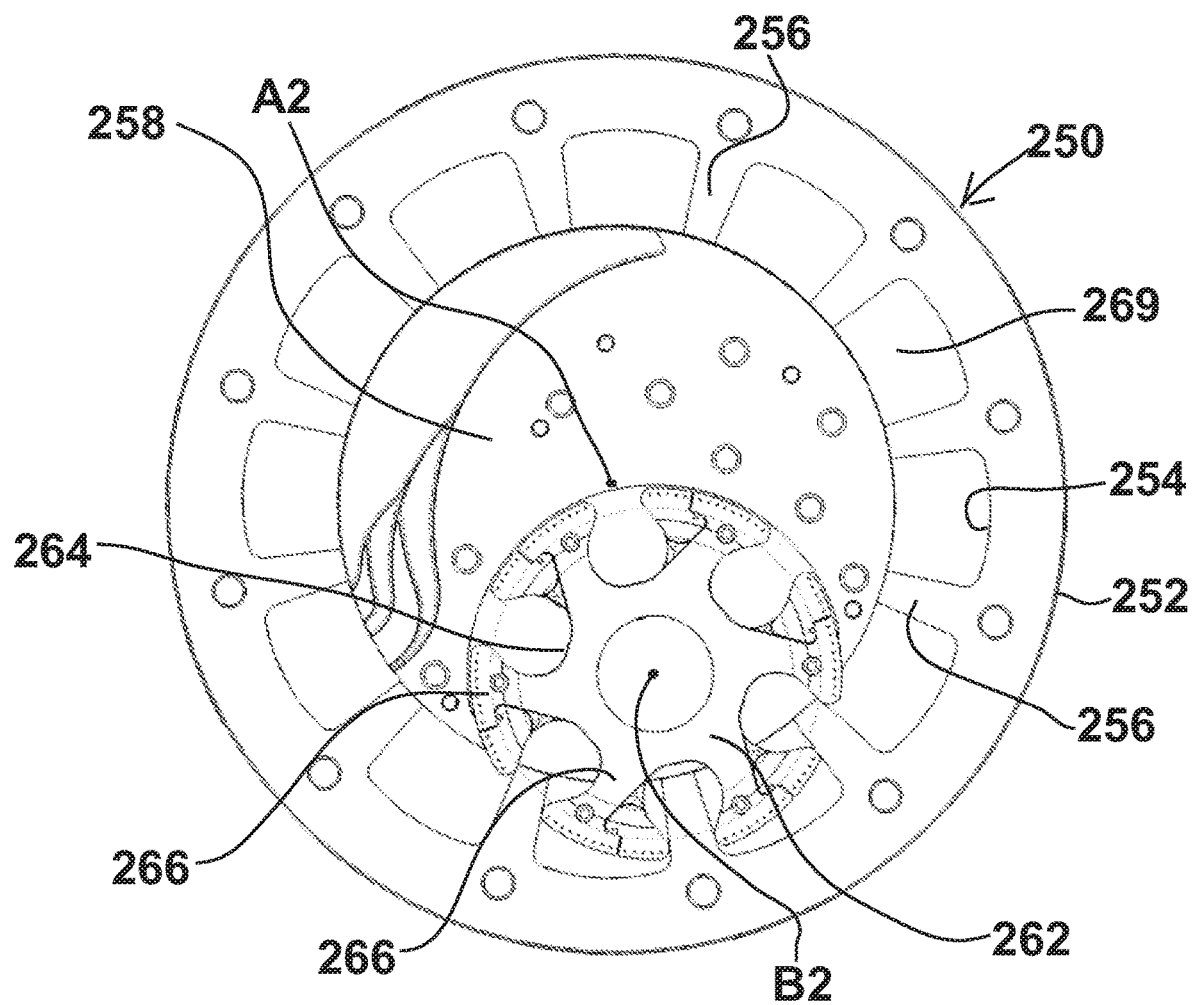
FIG. 15 is a side view of another inner rotor with circumferentially expandable outward projections.

A further embodiment of an inner rotor with expandable outward projections is shown in FIGS. 15-21. Referring to FIG. 15, there is shown an energy transfer machine 250, with an outer housing 252 having an inward facing surface 254 and inward projections 256 arranged around the inward facing surface 254. A carrier 258 is secured for rotation at least partly within the outer housing 252 about an axis A2. An inner rotor 262 is secured for rotation about an axis B2 within the carrier 258. The inner rotor 262 has an outward facing surface 264 and outward projections 266 arranged around the outward facing surface 264. The inward projections 256 project inward and the outward projections 266 project outward to mesh with each other and define variable volume chambers 269 between the inward projections 256 and the outward projections 266, as the inner rotor 262 rotates within the carrier 258.

Figure 16:
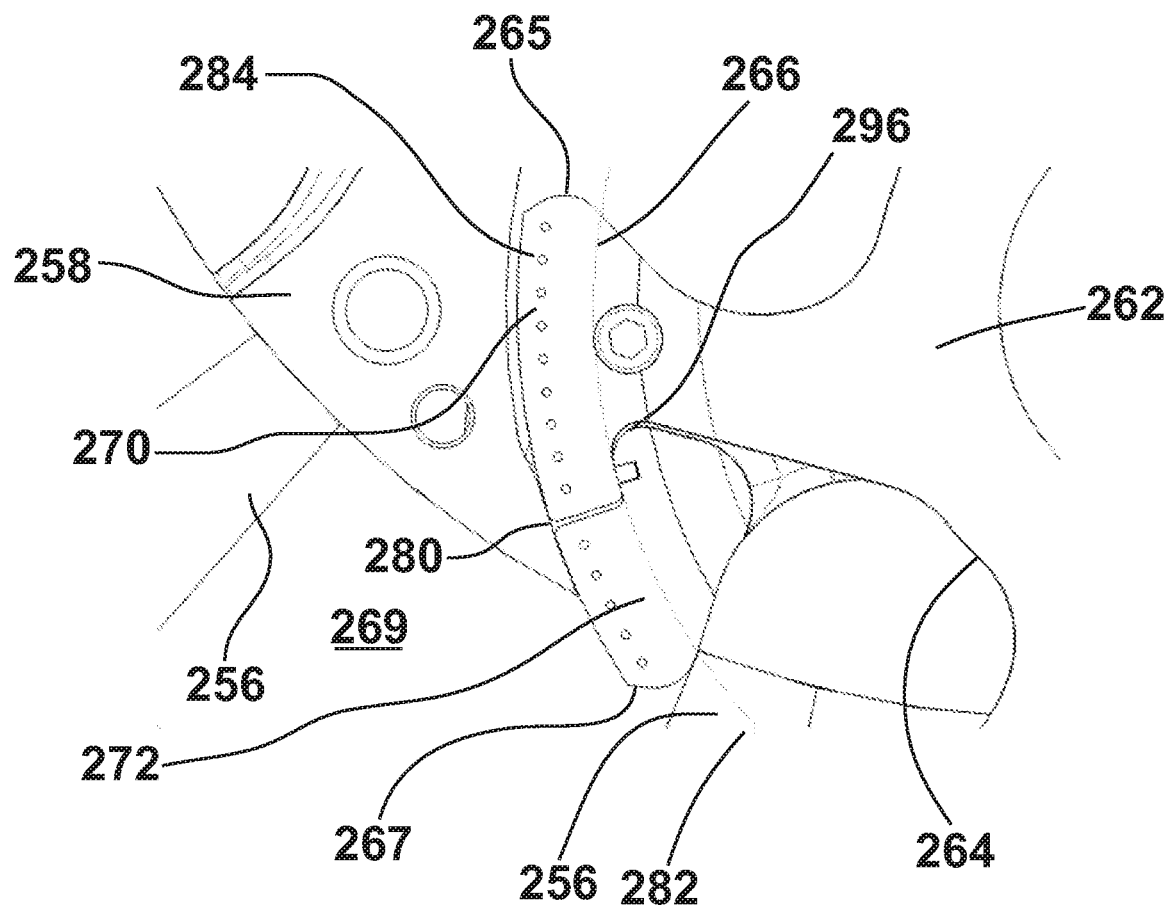
FIG. 16 is an isolated side view of a projection used in the embodiment of FIG. 15.
Figure 17:
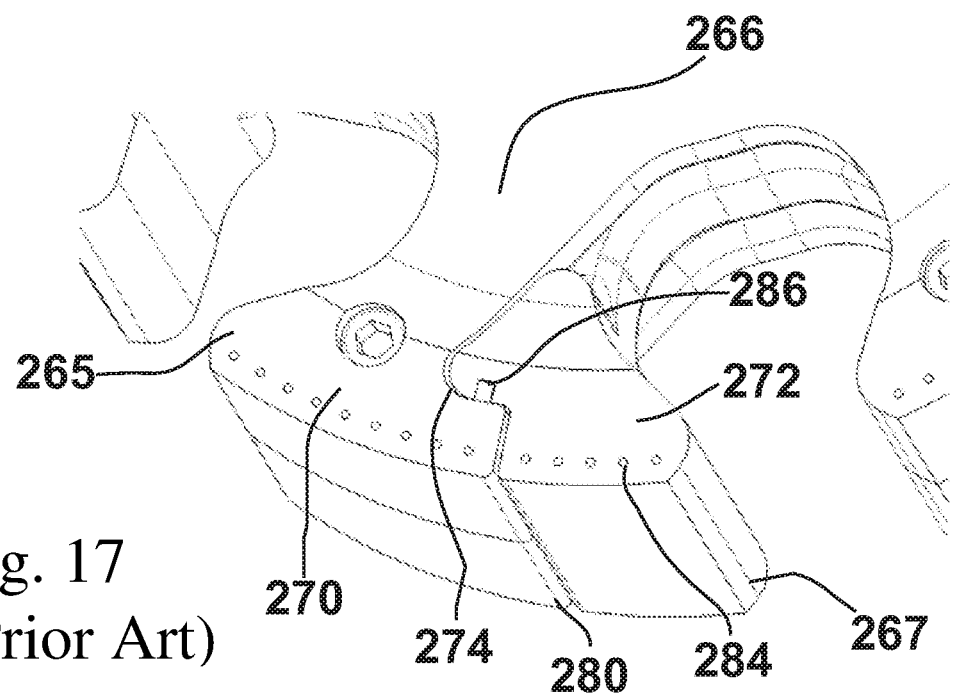
FIG. 17 is a perspective view of the projection of FIG. 16.
Figure 18:
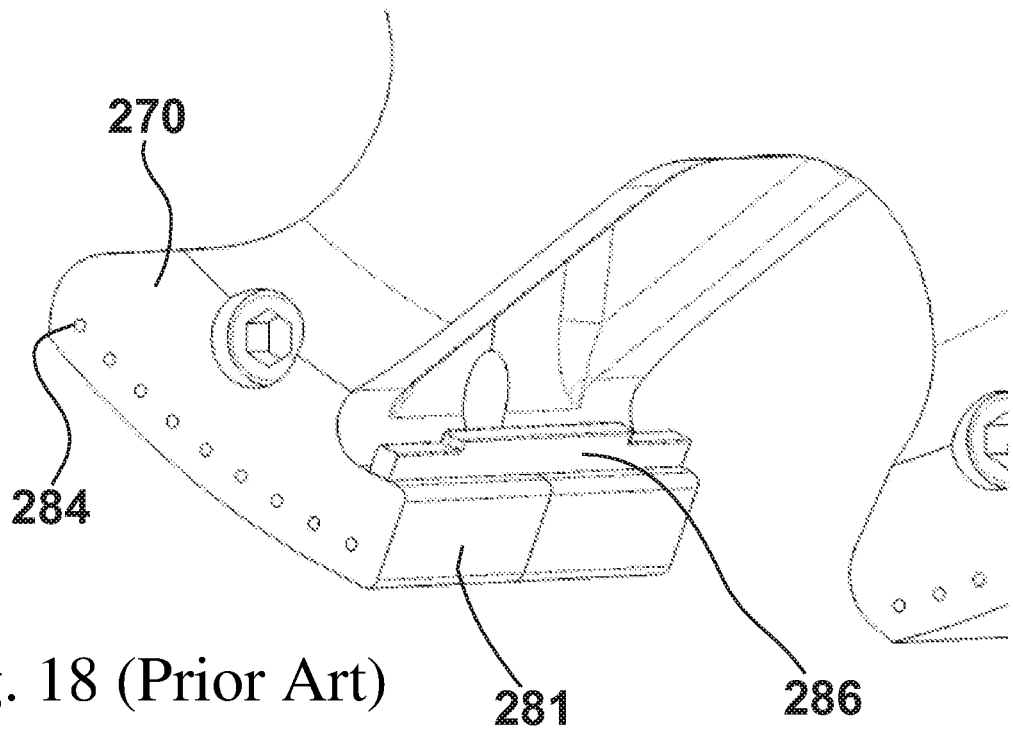
FIG. 18 is a perspective view of one portion of the projection of FIG. 16.

An outward projection 266 is more particularly shown in FIGS. 16 and 17. Each outward projection 266 has a leading edge 265 and trailing edge 267. The outward projections 266 are circumferentially expandable under inward radial fluid pressure to bias the leading edges 265 and trailing edges 267 of the outward projections 266 into continuous sealing contact with the inward projections 256 of the outer housing 252 as the inward projections 256 and outward projections 266 mesh with each other. Fluid transfer passages, such as described above in relation to the engine and pump embodiments shown in FIGS. 2 and 7 respectively, are provided on at least one of the outer housing 252 and carrier 258 to permit flow of fluid into and out of the variable volume chambers 269. All leading edges 265 rotate as one piece and all trailing edges 267 act as one piece. This feature of the expanding inner rotor makes it work in this intermittent contact scenario with the outer cylinders. In other words, the leading and trailing edges 265, 267 which are in sealing contact position the edges which are not in contact so they mesh correctly when they mesh with the cylinder walls.

Figure 19:
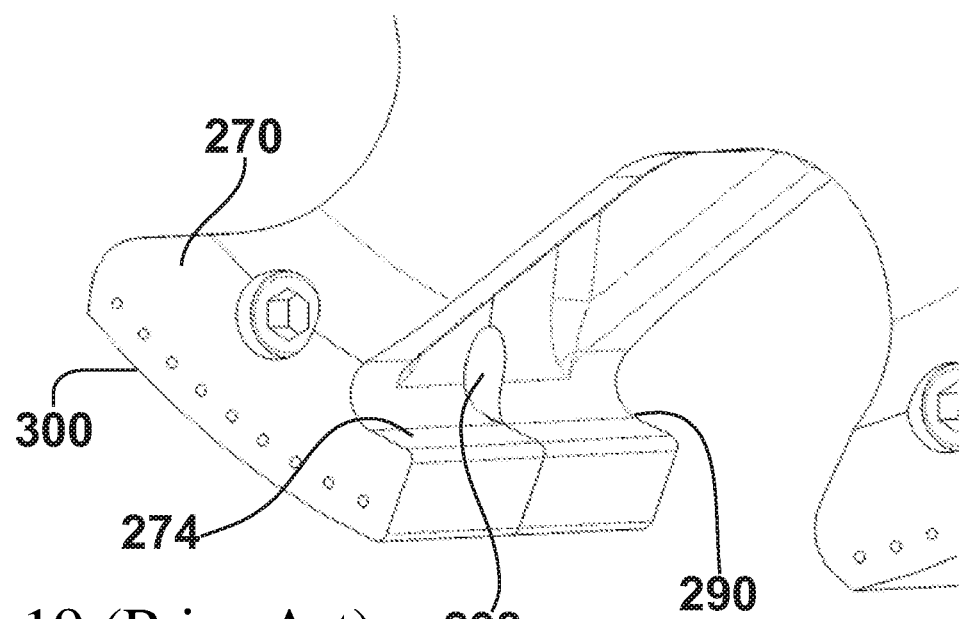
FIG. 19 is a perspective view of part of another embodiment of a circumferentially expandable projection.
Figure 20:
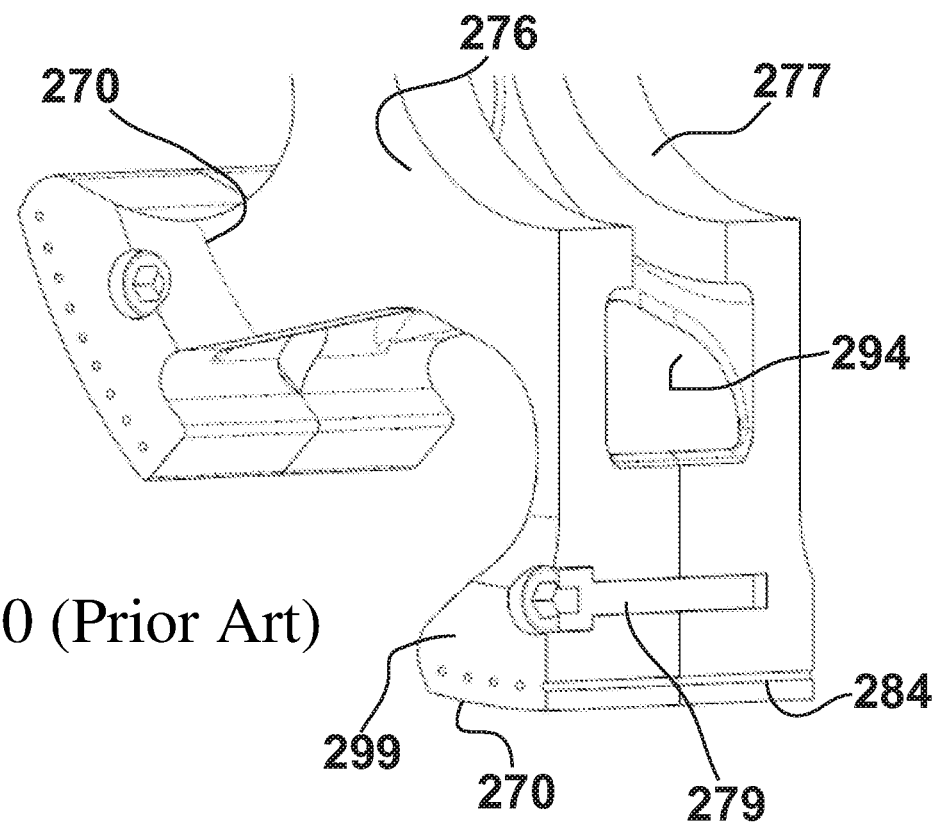
FIG. 20 is a perspective view, partly in section, showing inner structure of one part of the projection of FIG. 16.
Figure 21:
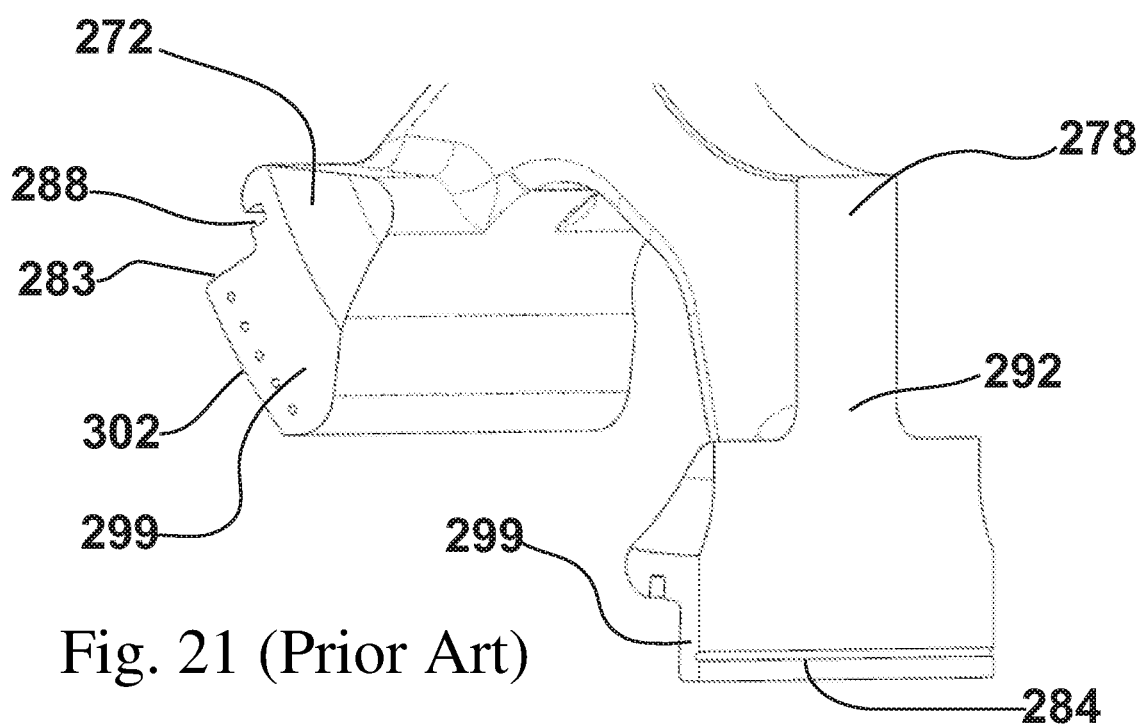
FIG. 21 is a perspective view, partly in section, showing inner structure of another part of the projection of FIG. 16.

The device of FIG. 15 operates in like manner to the devices of FIGS. 1-14. As shown in FIGS. 16 and 19, each outward projection 266 may be formed from a primary foot 270 and secondary foot 272 supported for circumferential movement relative to each other, with each primary foot 270 abutting the corresponding secondary foot 272 along a circumferentially extending sealing surface 274. Also as shown in FIGS. 20-21, the primary feet 270 of the inner rotor 262 may be mounted on a pair of cooperating plates 276 and 277, that extend radially from the axis of the inner rotor 262 and that are secured as for example by couplers 279. The secondary feet 272 of the inner rotor 262 may be mounted on at least a second plate 278 that extends radially from the axis of the inner rotor 262. In this manner, the first plate 276 and the second plate 278 rotate independently to each other about the axis of the inner rotor 262. A neck 292 of the secondary foot 272 is received within throat 294 of primary foot 270. The independent rotation is permitted over an angle sufficient to provide sealing contact of the leading edges 265 and trailing edges 267 of the outward projections 266 with the inward projections 256 of the outer housing 252, as well as sealing contact along the seal 274.

As compared with the embodiment of FIGS. 13, 14, the slot 280 between the primary foot 270 and secondary foot 272 is radially deeper to provide adequate separating force under pressure. The slot 280 may be defined by walls 281, 283 parallel to a radius from axis B2. The sealing surface 274 lies along a radius shown as line 282 in FIG. 16. The radius 282 is preferably within a radius from axis B2 that is defined by the contact points of trailing edges 267 on the projections 266. Either or both of the primary foot 270 and secondary foot 272 is provided with openings 284 on the periphery of the foot 270, 272 that extend through the respective foot from one side to the other side to equalize pressure on both sides of the rotor 262. Pressure equalization assists in centering of the rotor 262 within the housing 252. The sealing surface 274 may be provided in an embodiment with a sliding seal formed for example of a tongue 286 on the foot 270 and groove 288 on the foot 272. The tongue 286 moves radially in relation to the axis B2 within groove 288 and bears against an inward sealing surface 290 of foot 270. A spring 296 may be received in a spring bore 298 in the primary foot 270 or in, or partly in, a bore (not shown) in the secondary foot 272.

The contact geometry between projection 266 and projection 256 may be designed to compensate for deformation of one or more components caused by speed and/or pressure. Protruding faces 299 near the periphery reduce surface area and friction. The outer surface or surfaces 300, 302 in some embodiments may be convex, as shown, flat or concave. The sidewalls of the projections 256, 266 may be textured to interfere during the initial wear process.

In FIG. 22, an energy transfer machine is shown with a rotor 310 or annular housing that rotates within a fixed outer (exterior) housing 308 around axis A3. Carrier 312 is fixed. Rotor 314 rotates around axis B3 in carrier 312. The rotor 314 is designed according to the principles outlined in relation to FIGS. 13-21 with outward projections 316 that are expandable. Rotor 310 has inward projections 318 that the projections 316 mesh with to form variable volume chambers. This general design is described in the '221 publication and operates in like manner, except for the expandable feet of the outward projections 316. Fluid egress and ingress passages 322 and 324 are provided in the outer housing 308 for supplying fluid, for example fuel, into and out of the chambers 320. The plenums 326 may be used to draw air into the chambers 320, and the discharge port 328 may be used for discharge of gases from the chambers 320. The outer housing 308 has side plates (not shown) that secure the various parts together, fixing the carrier 312, but allowing the rotor 310 and rotor 314 to rotate. The design of FIG. 22 may be operated as a pump, expander, compressor or engine depending on the operation of the ports and fluids used as described in the '221 publication.

Figure 23:
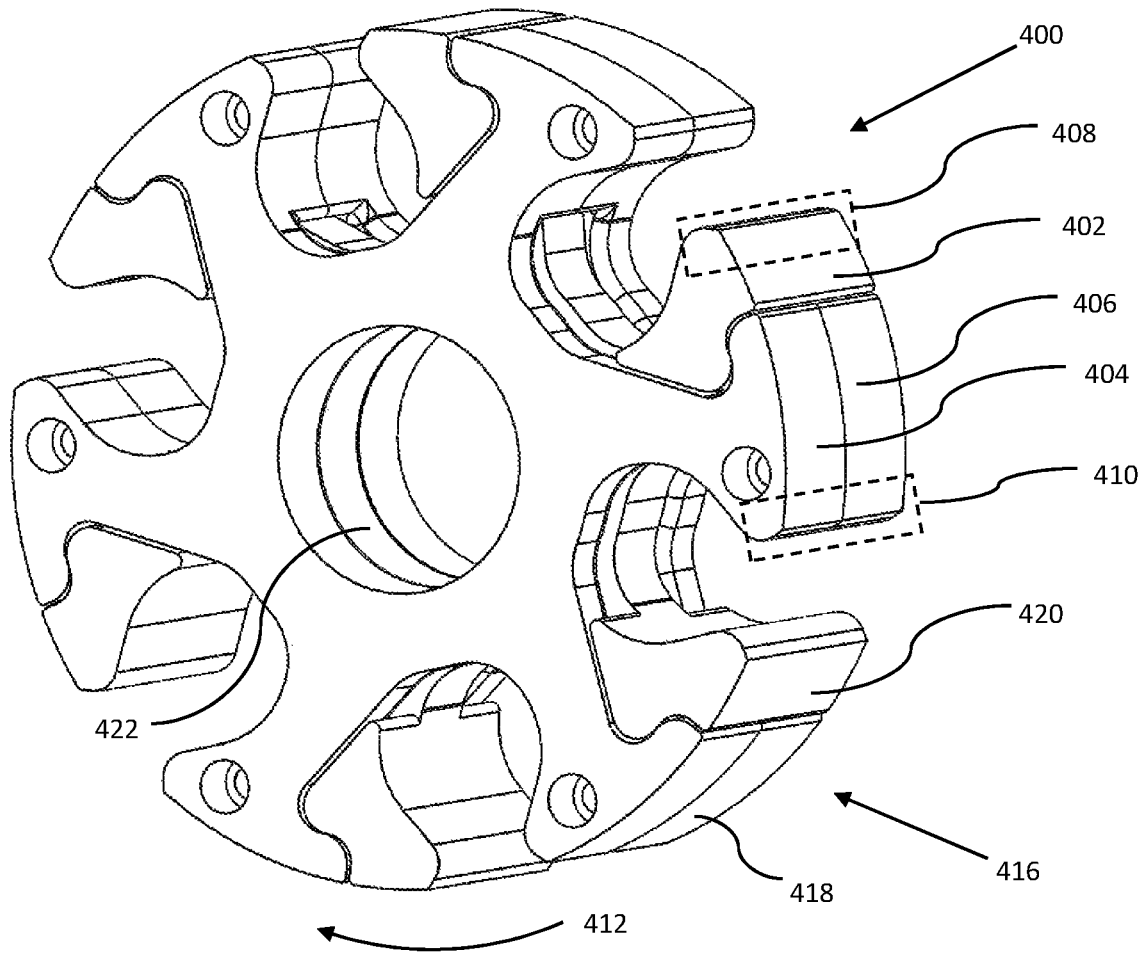
FIG. 23 is an isometric view showing a simplified version of a rotor with expandable feet.

FIG. 23 shows a simplified version of a rotor with expandable feet as in FIGS. 13-21. This basic configuration, as in FIGS. 13-21, allows circumferential expansion geometry only.

Note that in this and other figures and descriptions, a direction of rotation and designations of leading and trailing edges are used for reference purposes. Rotation in the opposite direction and a reversed configuration are also possible. As shown in FIG. 23, a rotor 400 has an axially inner component 402 rotatably connected to two axially outer components 404 and 406. The inner component 402 in this embodiment has a "toe" 408 that may form a trailing edge, and the outer components 404 and 406 together have a "heel" 410 that may form a leading edge. A typical direction of rotation is indicated by curved arrow 412.

The outward projections of the rotor 400 comprise feet 416 that are split into a primary foot 418 and secondary foot 420 that are circumferentially movable with respect to each other. The feet 416 are at least portions of the projections and mesh with cylinders of the housing to define variable volume chambers. Here and in the rest of the description and claims, the term "cylinders" is used to describe spaces defined by a radially inner surface of an annular housing, with which the outward projections of the inner rotor mesh. The outward projections act as pistons within the cylinders to define the variable volume chambers. The term "cylinder" is not used to imply any particular cross sectional shape; e.g. it need not be circular in cross section, and can, for example, be rectangular. The term "cylinders" can be used to refer to any cavity which a piston enters to define a variable volume chamber, such as in non-rotor embodiments.

Figure 24:
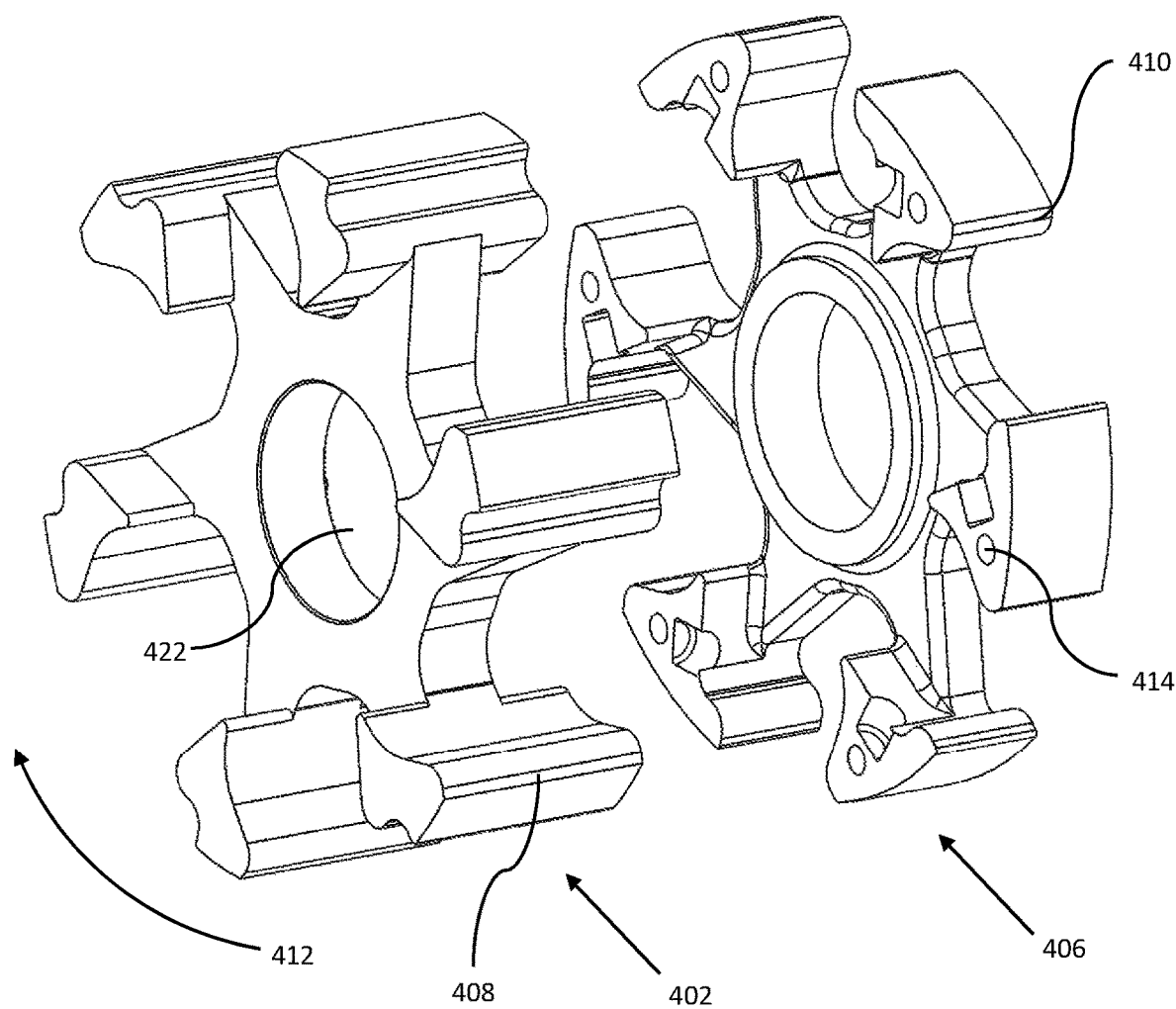
FIG. 24 is an exploded view of a partially disassembled version of the rotor of FIG. 23.

In FIGS. 23-24, the primary foot 418 comprises portions of outer components 404 and 406 that correspond to an outward projection of the inner rotor 400, and the secondary foot 420 comprises a portion of inner component 402 that corresponds to the outward projection of the inner rotor 400. The terms "primary foot" and "secondary foot" may be used where each foot of the rotor is split into components movable with respect to each other (and these components may further be split into subcomponents, as described below). The terms "primary foot" and "secondary foot" do not necessarily imply any difference between the primary foot and secondary foot and may be assigned arbitrarily to the respective components that they describe. In the embodiments shown in this document, one of these components has a larger outer circumferential length than the other, although in other embodiments they may be equal. For the sake of convenience, in the embodiments shown the term "primary foot" is assigned to the component with the larger outer circumferential length. The portion of the primary or secondary foot forming a leading edge is referred to here as the "heel" and the portion of the primary or secondary foot forming a trailing edge is here referred to as the "toe". In the embodiment of FIGS. 23-24, the heel 410 is on the primary foot 418, and in the embodiments of FIGS. 26-42 the "toe" is on the "primary foot".

The rotor 400 shown in FIGS. 23-24 allows all of the primary feet 418 rotate in unison as one part, and all of the secondary feet 420 to rotate in unison as one part. FIG. 24 shows an exploded view of a partially disassembled rotor 400 which makes it clear that in this embodiment all the secondary feet 420 are portions of axially inner component 402 which is formed as a single piece, and all the primary feet 418 are portions of two axially connected axially outer components 404 and 406, each formed of a single piece. Axially outer component 404 is not shown in FIG. 24, only in FIG. 23. The two axially outer components 404 and 406 may be connected mechanically, such as via a dowel pin or via an appropriate fastener extending axially through rotor alignment hole 414. In this embodiment the connection is via rotor alignment hole 414 at the feet 416. There is also in this embodiment an axial center hole 422 in the inner piece 402, and the two outer pieces 404 and 406 could be connected together through the axial center hole 422 of the single piece 408, although no such connection is shown in the embodiment of FIGS. 23-24. The direction of rotation may be reversed, changing which part is leading and which is trailing. Which part is formed of two pieces and which is formed of one piece may be reversed. The embodiment of FIGS. 23-24 is not designed to allow axial expansion but may be modified to allow such expansion as shown in FIGS. 25-42.

By providing a seal between the toe sections and the heel sections and allowing the toe and heel to rotate relative to each other, it has been shown that the rotor foot can expand in the circumferential direction to create a contact seal between the toe and the leading cylinder wall, as well as the heel and the trailing cylinder wall, which is proportional to the pressure of the fluid being sealed in the chamber. This has proven to work extremely well but does not provide a movable seal for the sides of the rotor.

Many Rotary devices, such as but not limited to the rotary engine embodiments included in FIGS. 1-24, require an inner rotor which must seal against the leading and trailing walls of the rotating cylinder as well as the axial faces between the inner rotor and the inward facing axial faces of the cylinder. In other non-limiting embodiments or use cases, the cylinder may instead be fixed with one or more rotors which rotate about their central axis or axes, the rotor or rotors simultaneously revolving about the central axis of said cylinder.

It is possible, in some applications, to achieve the required seal with a close tolerance fit. For very high pressures and low viscosity fluids such as air, achieving this fit can be very challenging. For applications where, for example, manufacturing tolerance or wear compensation is desired, higher pressures are required, or thermal expansion makes a close tolerance fit difficult or impossible for a given pressure, a more sophisticated sealing arrangement is required. Especially challenging is the scenario where friction between the cylinder wall and the side of the inner rotor causes the rotor to increase in temperature disproportionately to the outer rotor. This can create a thermal runaway situation where the inner rotor expands axially, increasing friction and generating more heat. The result, which has been observed, is an axial expansion of the inner rotor which closes the gap between the inner rotor and the outer rotor sidewalls to the point of causing an interference fit with high friction, high wear, and even more heat production.

A solution is required that allows a contacting or very close to contacting fit of the inner rotor and outer rotor (or stator) cylinder walls and accounts for manufacturing tolerances, wear, and thermal expansion of the inner and outer rotor in the axial direction.

Presented below are several different configurations that allow the inner rotor to expand in the axial direction. Embodiments include rotor geometry which allows expansion in the axial direction as well as circumferentially. This solution is intended to allow looser manufacturing tolerances for lower cost and to compensate for changing geometry due to thermal expansion or wear. Furthermore, the axial force between the outward facing inner rotor sidewalls and the interfacing sidewalls of the outer rotor is in embodiments proportional to the pressure produced in the cylinder so that this sealing force is only adequate to seal and does not create undue friction or wear.

Figure 25:
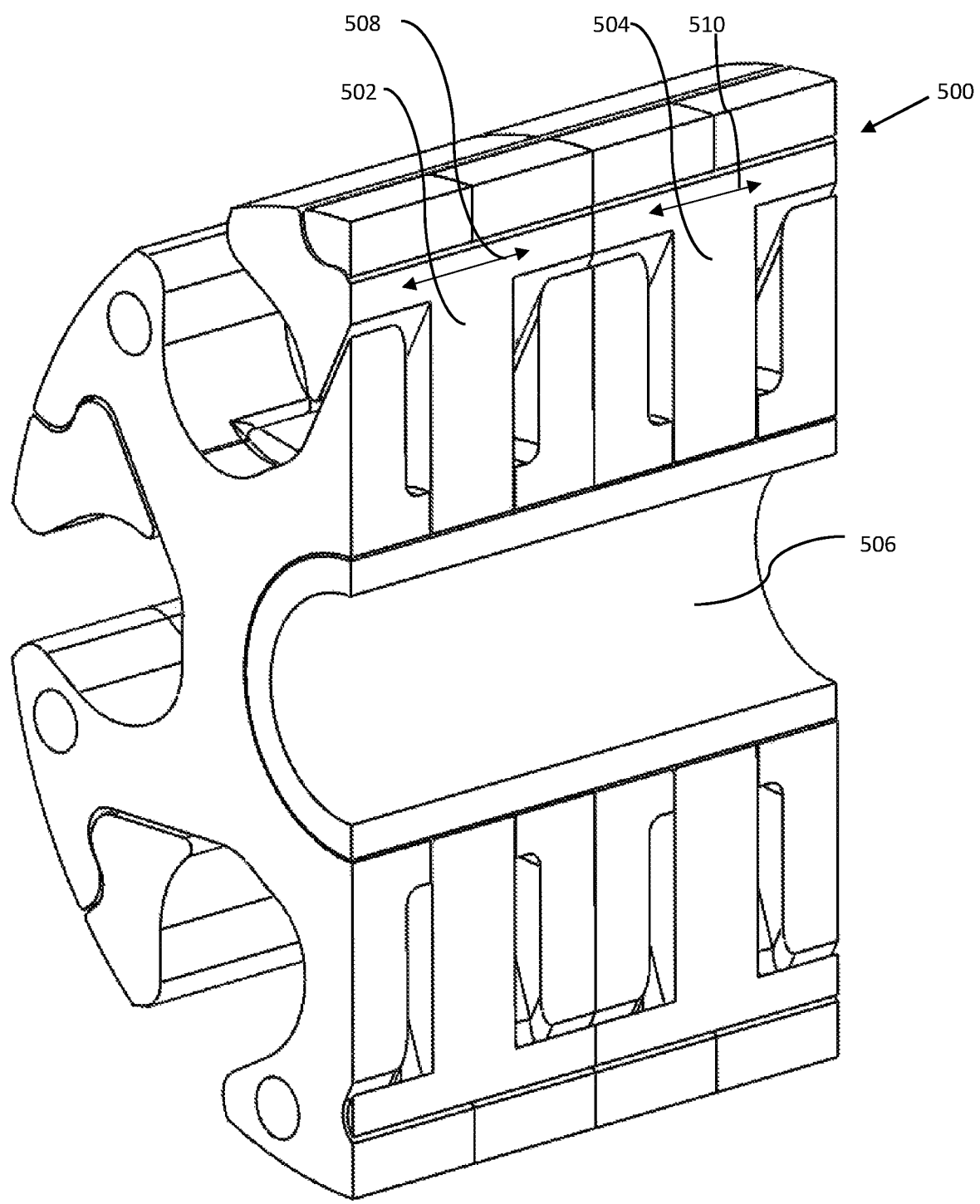
FIG. 25 is an isometric view of an inner rotor comprising components positioned axially with respect to each other according to the present disclosure.

Embodiments of the rotor are thus able to expand axially, in addition to expanding circumferentially. This can be done a number of ways including simply putting two rotors side-by-side as shown in FIG. 25. FIG. 25 shows a first inner rotor 502 adjacent to a second inner rotor 504. The inner diameters (ID) of both of these rotors 502 and 504 are able to move axially on a cylinder such as inner rotor shaft cylinder 506 or bushing such as a bearing which is not axially constrained. Axial movement of Inner Rotor 502 is indicated in FIG. 25 by a double-headed arrow labeled 508 and axial movement of Inner Rotor 504 is indicated by a double-headed arrow labeled 510.

Figure 26:
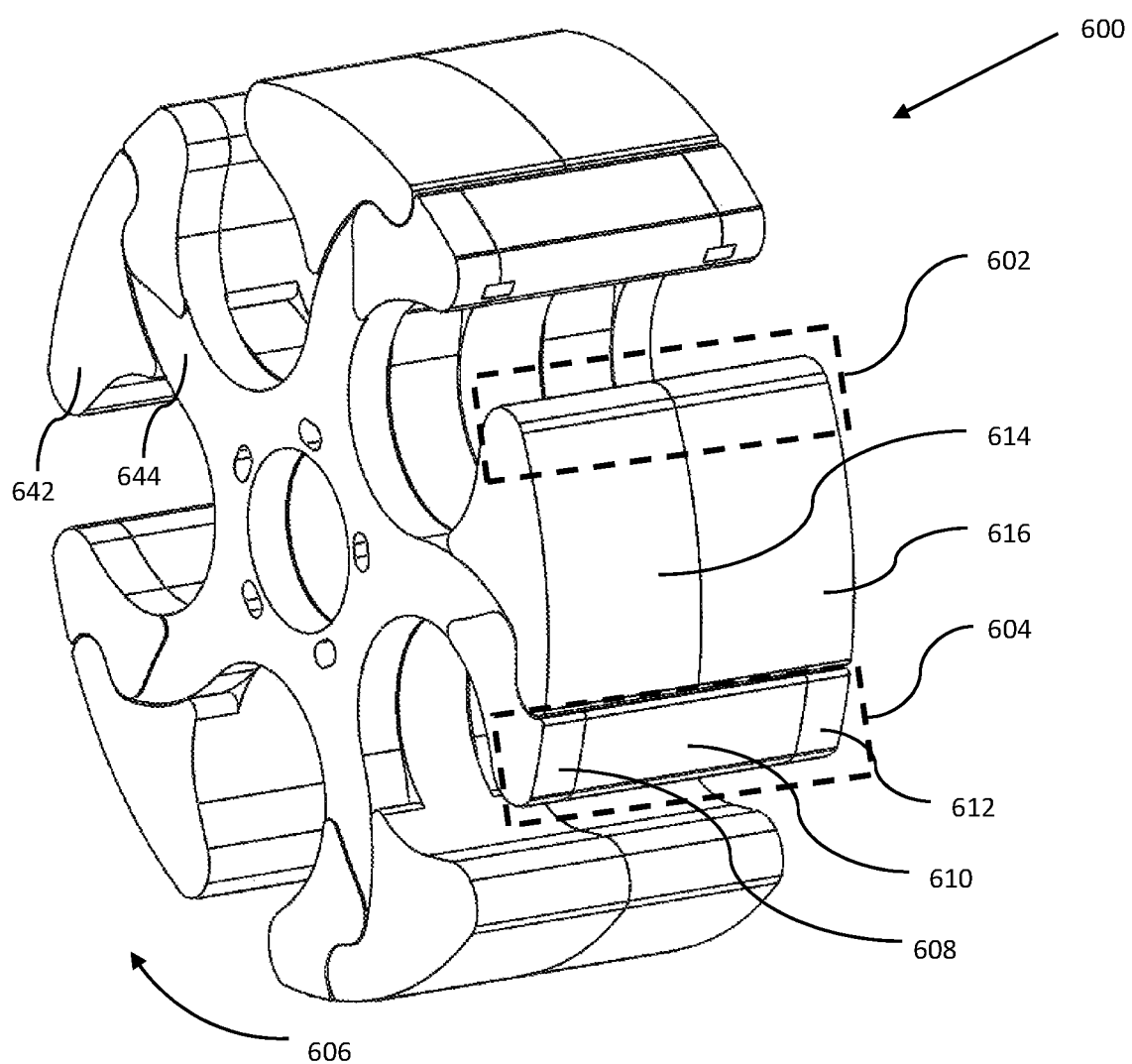
FIG. 26 is an isometric view of an inner rotor with three heel components positioned axially with respect to each other and two toe components positioned axially with respect to each other.

In the embodiment shown in FIG. 26, the secondary feet 644 each form a heel 604 and are formed of a component split into three axial components, near side heel component 608, center heel component 610, and far side heel component 612. These three components can move axially independently of each other. The "heel" is used here to refer to the leading edge of the feet when the rotor 600 is spinning clockwise relative to the view shown, as indicated by curved arrow 606 in FIG. 26. Near side and far side are relative to the view shown.

The rotation of these components can be constrained to each other or the rotational position can be constrained by the cylinder wall they are contacting. The primary feet 642 each form a toe 602 of the rotor and are formed of a component split into two axially movable halves 614 and 616 which can move axially independently of each other. The rotation of these components can likewise be constrained to each other or the rotational position can be constrained by the cylinder wall they are contacting.

Figure 27:
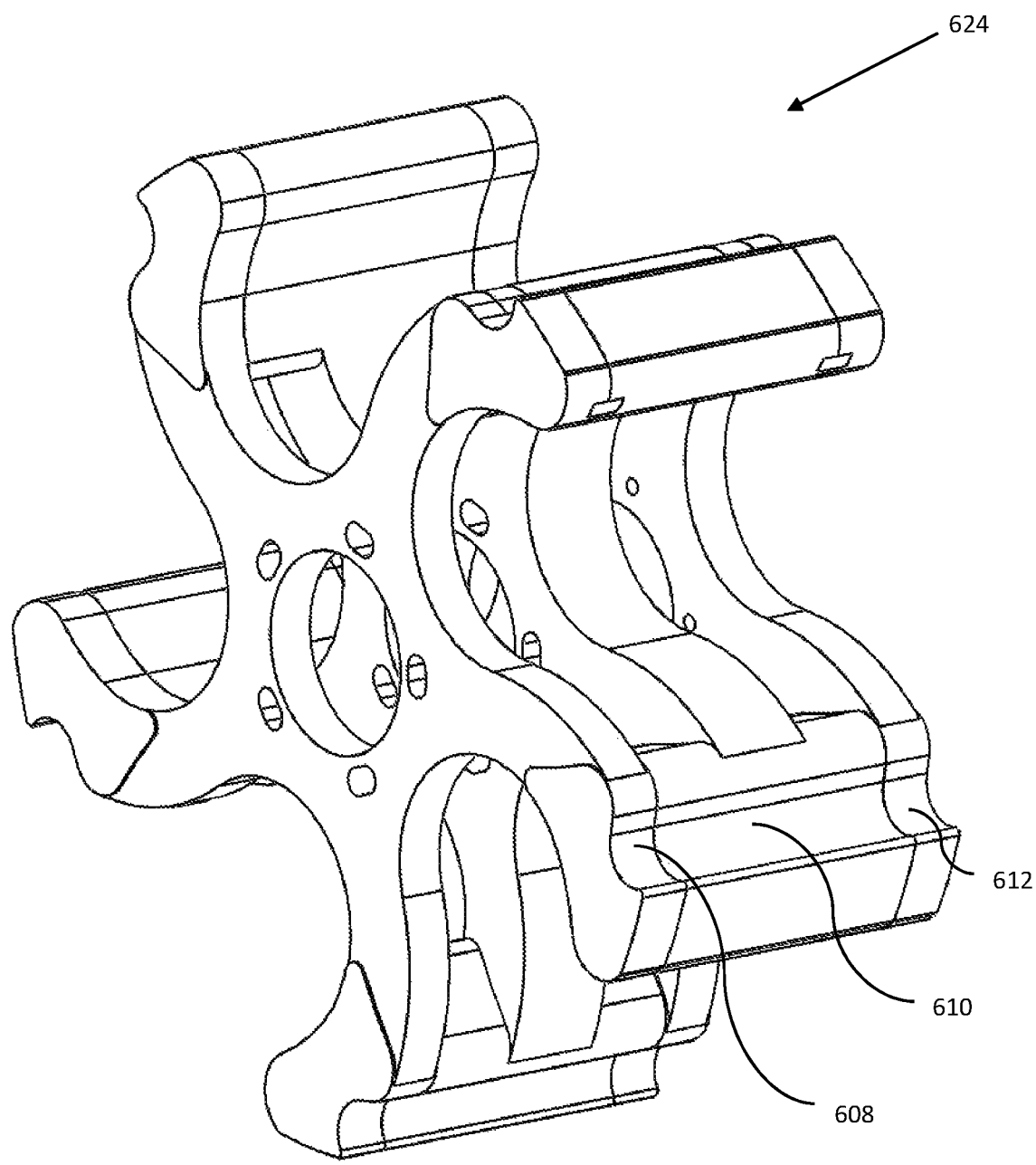
FIG. 27 is an isometric view of the heel components of the inner rotor of FIG. 26.

FIG. 27 shows just the heel components 608, 610, 612, together forming combined heel component 624 which rotates together circumferentially. Toe components are not shown in this figure.

Figure 28:
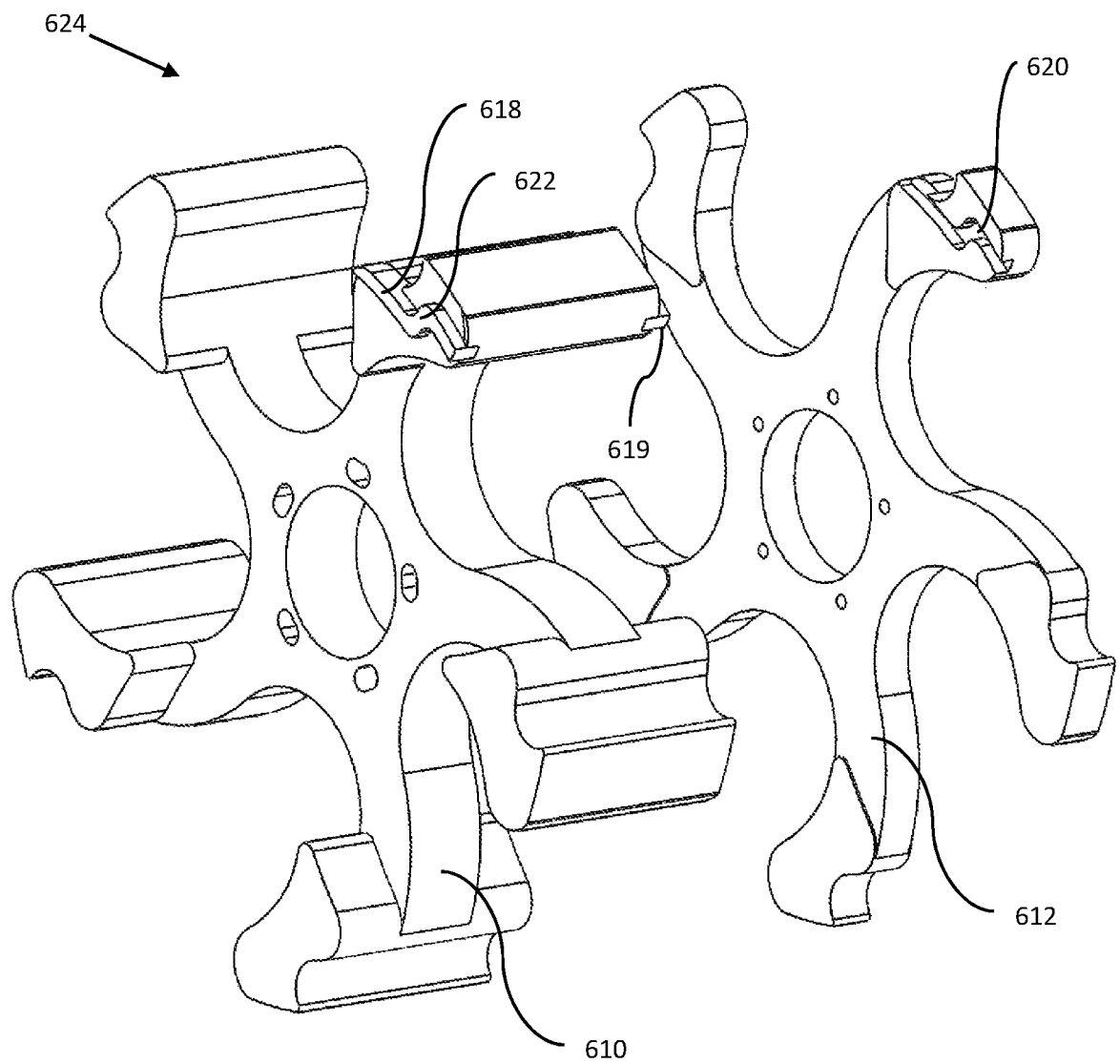
FIG. 28 is an exploded isometric view of two of the heel components of FIG. 27, showing seals for sealing between different heel components.

FIG. 28 shows an exploded view of the center heel component 610, and far side heel component 612, with near side heel component 608 not shown for simplicity. Between the heal components 608 and 610 there is a heel floating seal 618, and another heel floating seal 619 is between the heel components 610 and 612. In this embodiment, each heel floating seal 618 or 619 is positioned in grooves on each of the two components which it seals between, such as groove 620 in far side heel component 612. The heel floating seals 618 and 619 reduce leakage radially inward from the outer diameter (OD) of the rotor past the foot through the gap between the three components. Note that the heel floating seals 618 and 619 are only shown on one of the feet for simplicity of explanation, but it is intended that there would be similar seals on each of the feet. The heel seals 618 and 619 are shown in grooves of two components, but could also be in grooves of, or fixed to, either component and contact the other component. The seals may also be allowed to float radially and axially. The seal may have a surface which is radial or somewhat radial to prevent circumferential movement of the seal in the groove as shown by heel seal radial portion 622 on heel floating seal 618 in FIG. 28.

Figure 29:
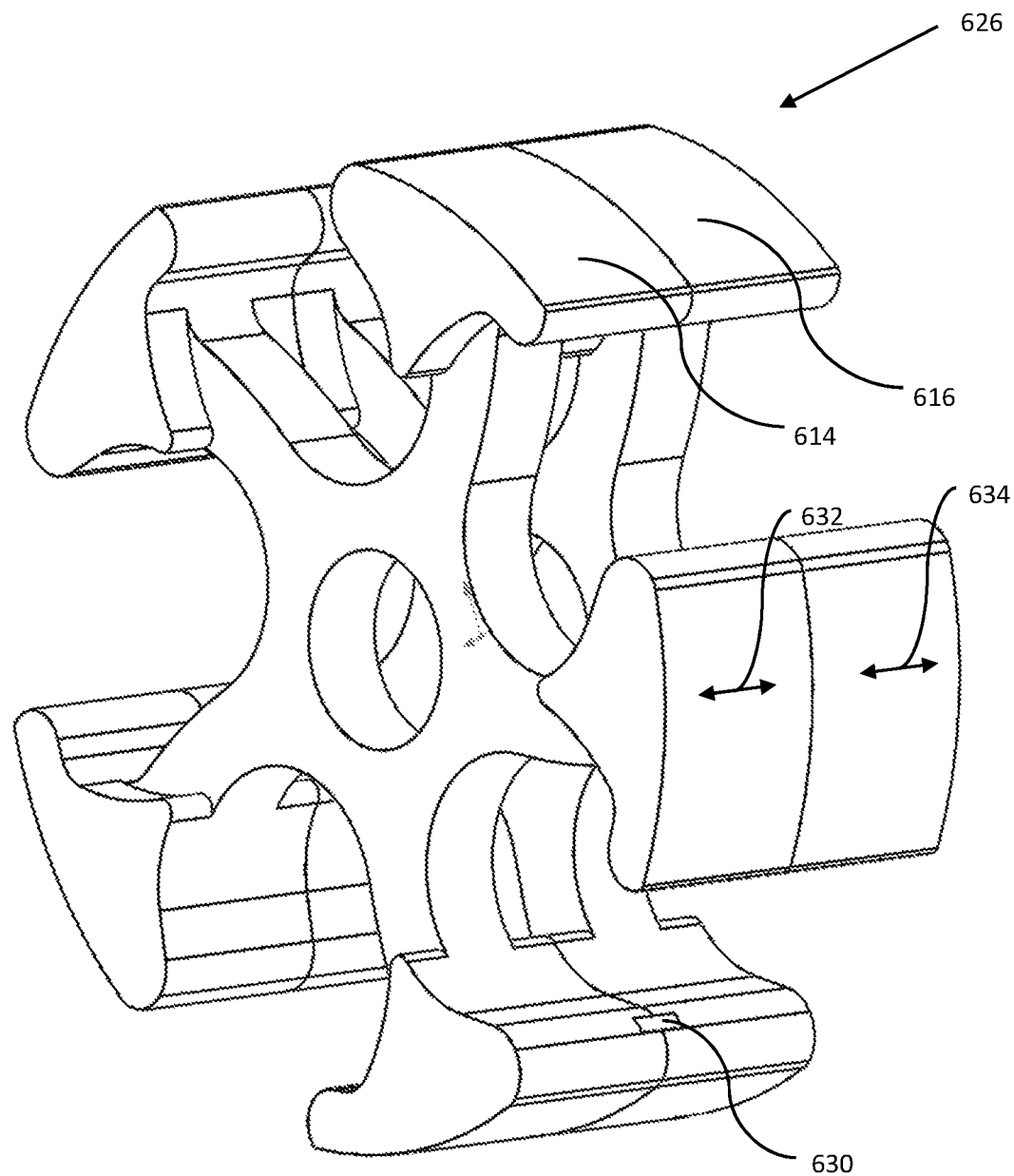
FIG. 29 is an isometric view of the toe components of the inner rotor of FIG. 26.

FIG. 29 shows only the toe components of FIG. 26 which, in this embodiment, are comprised of two mirrored components, first toe component 614 and second toe component 616, which are able to move axially relative to each other, and together forming combined toes only component 626. Axial movement of toe component 614 is shown using arrows 632, and axial movement of toe component 616 is shown using arrows 634. A rotor toes seal 630 is shown between toe components 614 and 616.

Figure 30:
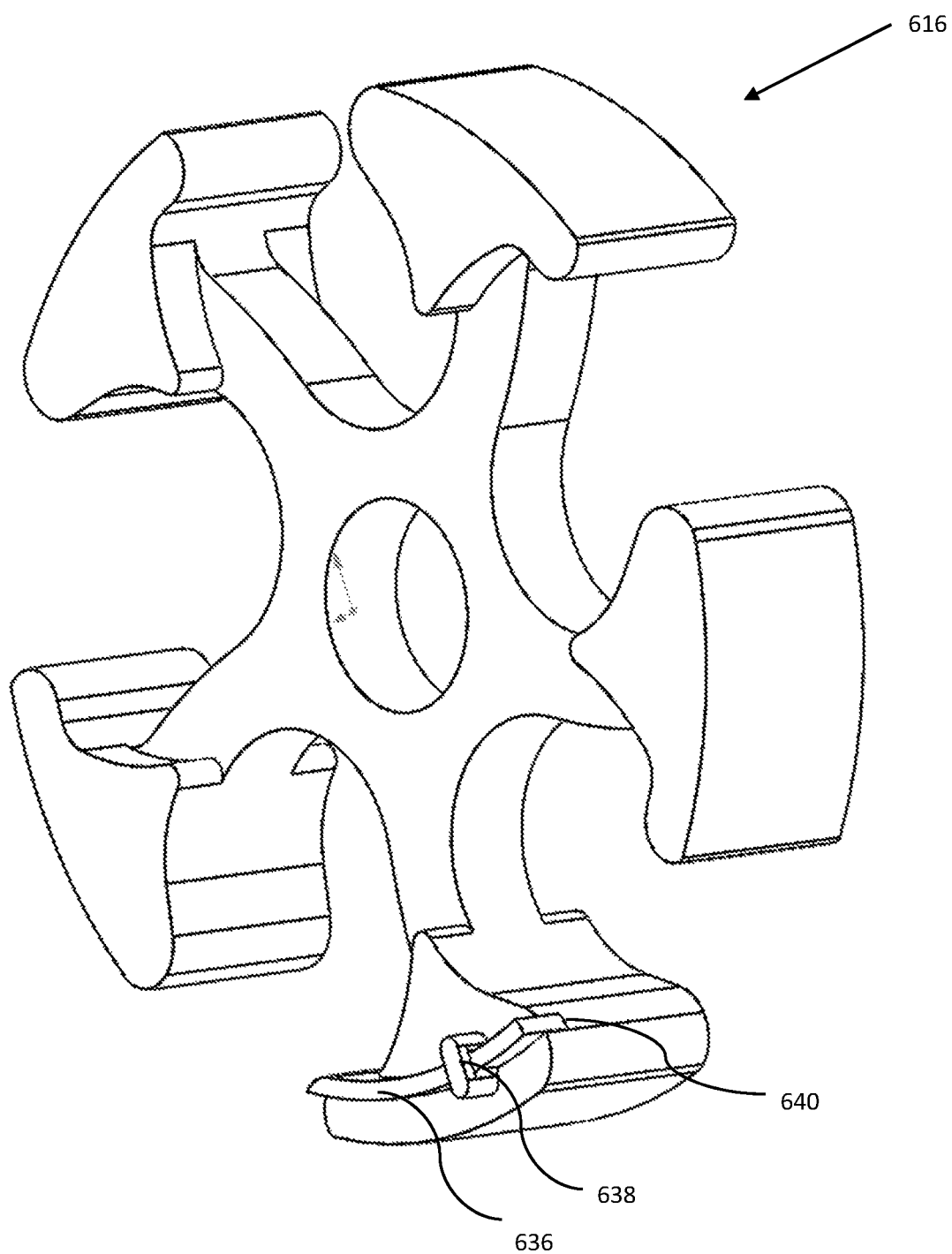
FIG. 30 is an isometric view of one of the toe components of FIG. 29, showing a seal for sealing between the toe components.

FIG. 30 shows just the far side toe component of the inner rotor of FIG. 26, and shows a far side toe component portion of an exemplary foot which comprises a circumferential toe seal groove 640 and floating toe seal 636 in the groove. Again, the groove 640 and toe seal 636 may have a radial or somewhat radial portion, in this embodiment Toe Seal Radial Portion 638, which prevents circumferential movement of the seal. These groove and seal elements are omitted from other feet for simplicity An important consideration in these designs is that a floating seal is considered to be effective between two or more axially movable components. A floating seal is not, however, considered to be practical on the outer axial faces of the inner rotor because, unlike a piston where the rings are always in the cylinder, the feet of this rotor enter and exit the compression chamber and therefore could catch when they reenter the chamber. For this reason, the axially outer faces of the inner rotor act as the movable seal in the axial direction. In a preferred embodiment, the toe and heel are also able to float relative to each other. The pressure from compression, compressed air intake, combustion, or other sources is allowed to enter the space between the rotor components from the OD of the rotor to the seal in order to force them axially apart. In a similar way, pressure from compression, compressed air intake, combustion, or other sources is exposed to a radial surface on the toe and on the heel between the OD of the rotor and the seal between the components where they slide circumferentially on each other. This pressure pushes the toe and the heel into the cylinder walls, creating a seal against fluid leakage. The expansion of the rotor components axially against the side of the chamber provides a seal to prevent leakage on the axial faces. As a result the rotor is able to expand in all directions with a force that is proportional to the pressure in the chamber.

Many different configurations for the rotor components and the seal are possible and conceived by the inventor. Characteristics that help to achieve the sealing performance shown here include:

a) axial surfaces on two or more rotor components with a circumferential seal between them whereby the pressure radially outward from the seal is greater than the pressure between the surfaces radially inward from the seal. This pressure is a result of the effectiveness of the seal, it is also used to create an axial force which pushes the two or more components away from each other so that a seal is formed between the outer most axial faces of inner rotor components next to the inward facing cylinder walls of the outer rotor.

b) The seal will preferably have features with somewhat radially aligned surfaces which prevent circumferential movement of the seals relative to the grooves in the inner rotor which they occupy. This aligns the circumferential end of the seals with the contact surface of the toe or heel.

c) Minor modifications to the above will still provide a portion of the benefit.

These modifications could include a shorter seal than the length of the groove or a shorter groove than the full circumferential length of the foot from toe to heel.

Figure 31:
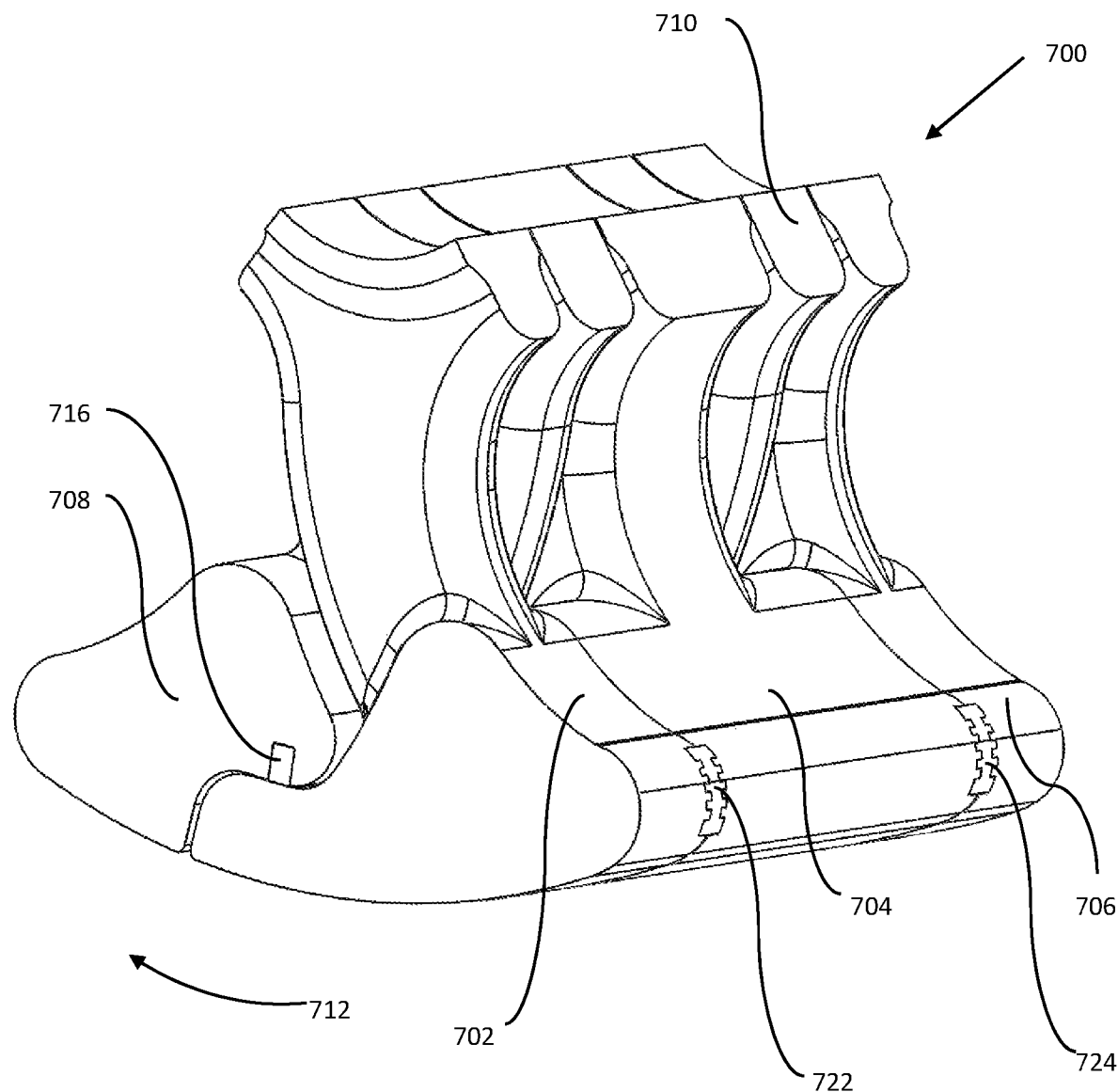
FIG. 31 is an isometric partial section view of an inner rotor.

Shown in FIG. 31 is a partial section of an inner rotor 700 with an axially expanding configuration and sealing arrangement which prevents or reduces fluid leakage radially inward from the compression chamber past the foot of the inner rotor, and which also allows and causes circumferential expansion of the toe and heel sections of the rotor as well as axial expansion of the rotor components to create a seal of the outward faces of the inner rotor feet against the axially inward facing surfaces of the outer rotor chambers. In this non-limiting embodiment the circumferentially larger of the two independent rotor sets comprises three toe components 702, 704, 706 and the smaller comprises two heel components 708 and 710. This contrasts with FIGS. 26-30 where the circumferentially larger set is comprised of three rotors and the circumferentially smaller set is comprised of two. Either configuration is acceptable.

Figure 32:
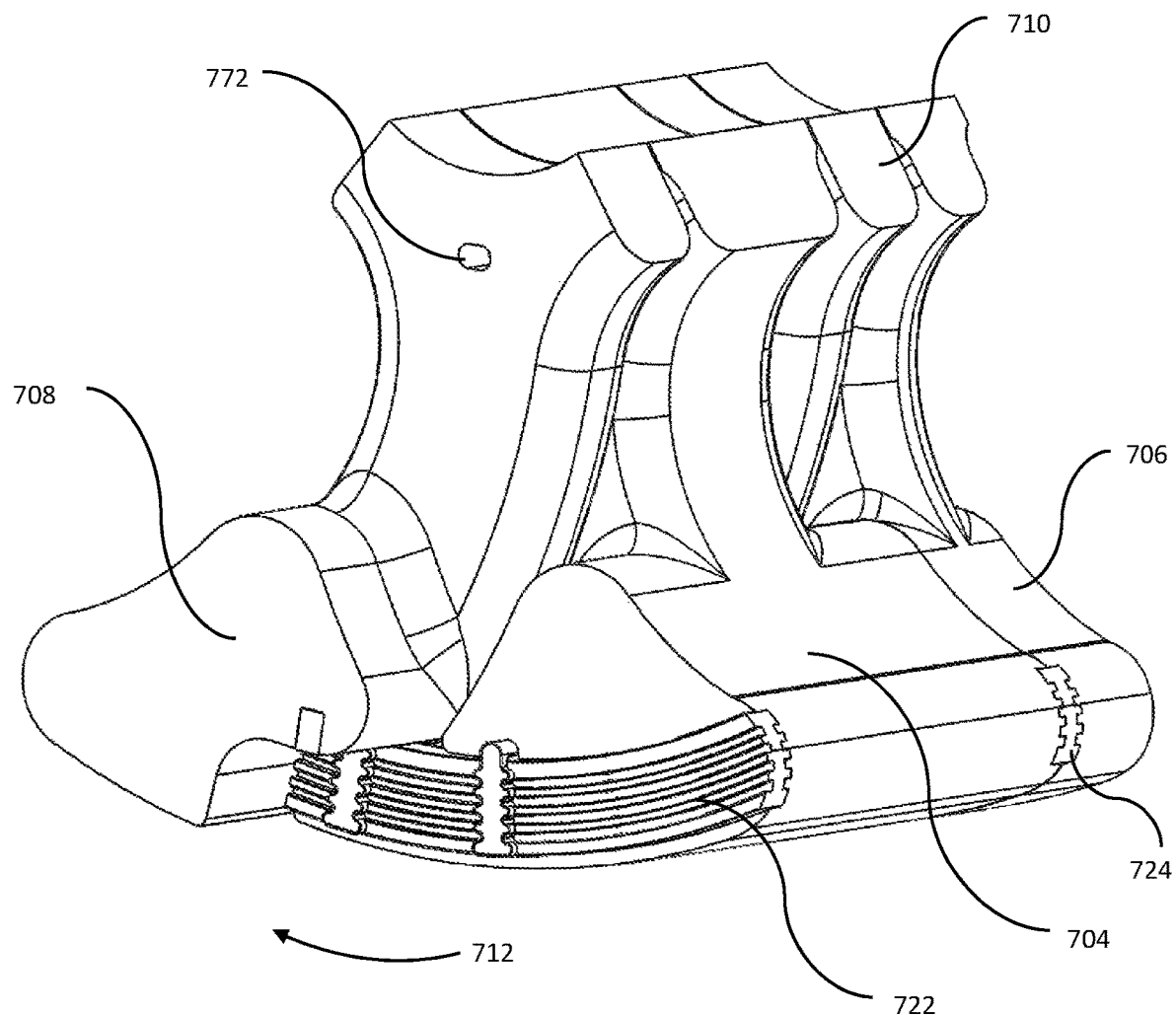
FIG. 32 shows the view of FIG. 31 also omitting an outermost toe component in order to better show seals between components and a through hole to accommodate a pin.
Figure 33:
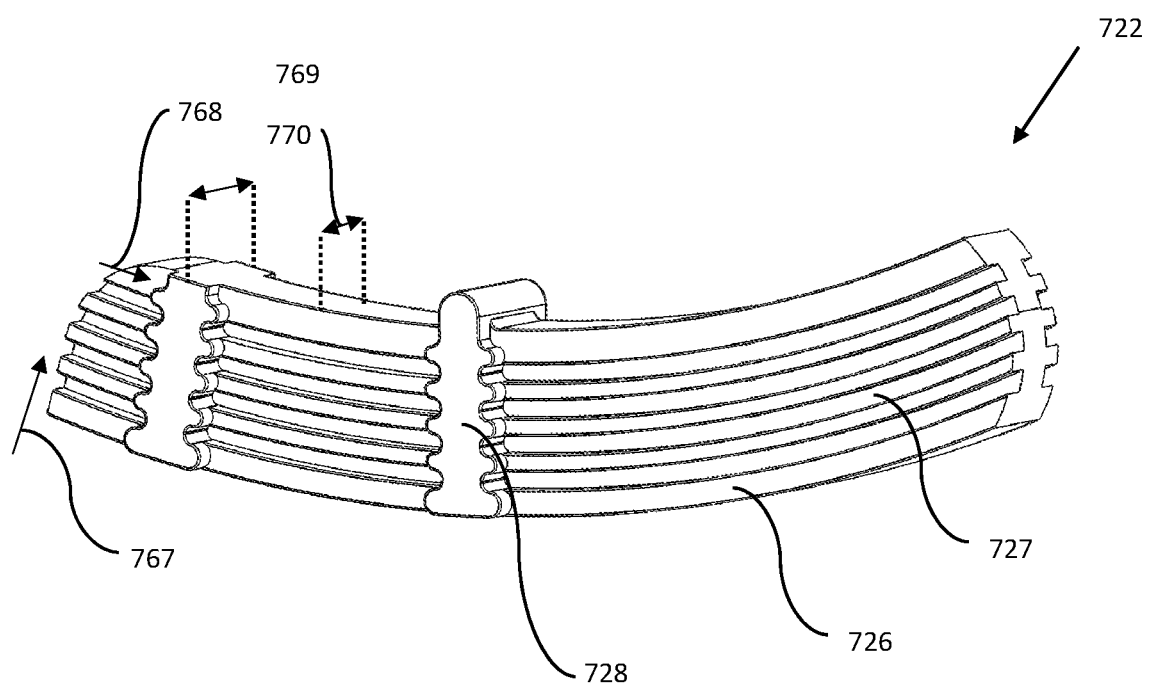
FIG. 33 is an isometric view of a circumferential seal between two toe components as shown in FIG. 32, here shown isolated from other components.
Figure 34:
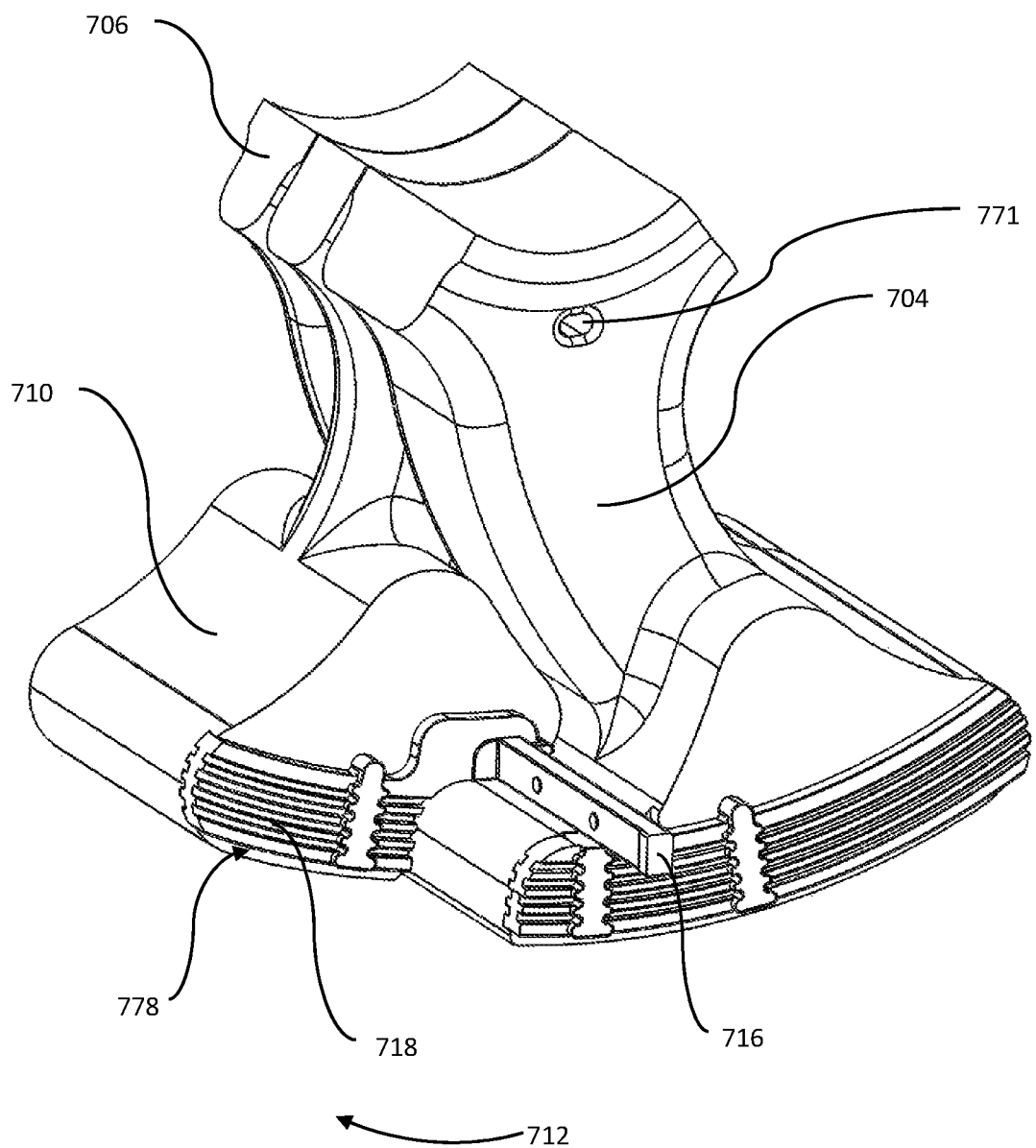
FIG. 34 is an isometric view of the portion of an inner rotor of FIG. 32 also omitting one of the two heel components to better show a floating circumferential seal between the two heel components.
Figure 36:
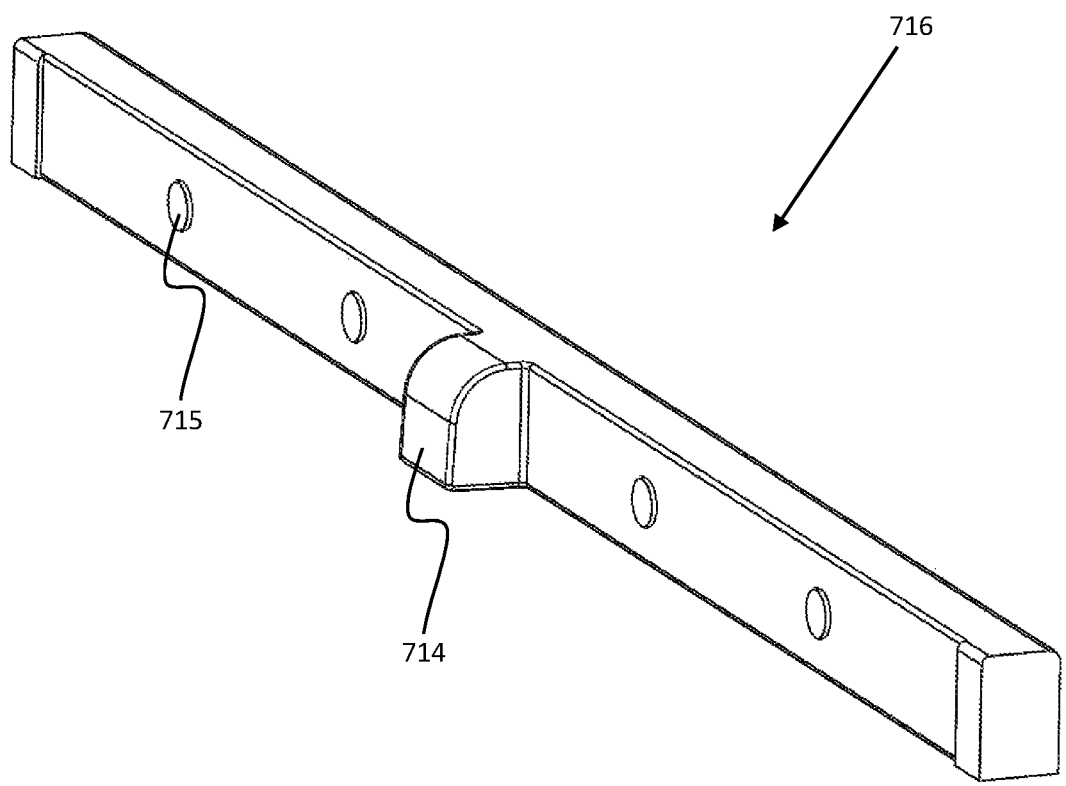
FIG. 36 is an isometric view showing an axial seal between primary and secondary feet of the inner rotor of FIG. 31, here shown isolated from other components.

Also shown in FIG. 31 are Heel Axial Seal 716, shown in more detail in FIGS. 34 and 36, and toe circumferential seals 722, 724, shown in more detail in FIGS. 32, 33. Curved arrow 712 shows an exemplary direction of rotation.

In FIG. 32, the outermost toe component 702 is not shown in order provide a better view of the circumferential seal 722 between the outer toe component 702 and middle toe component 704. A through hole 772 located in First Heel Component 708, to accommodate a flexible pin 742, is visible. Other heel or toe components may also feature through holes to accommodate a flexible pin or other deformable element for providing preload. Flexible pin 742 is shown in greater detail in FIG. 40.

In FIG. 33, the toe circumferential seal 722 between two of the toe components shown in FIGS. 31 and 32, is shown isolated. In this non-limiting embodiment, First Toe Circumferential Seal 722 has multiple ridges 726 and grooves 727, here longitudinally aligned as concentric raised features, which serve to provide a multiple seal effect when the ridges 726 interface with corresponding grooves on toe component 704, and the grooves 727 interface with corresponding ridges on toe component 704. Any number of ridges and/or grooves could be used. In an embodiment, a single ridge 726 or groove 727 could mesh with a single corresponding groove or ridge of toe component 704, and likewise multiple ridges and grooves can mesh as shown. Transverse ridges 728, here radially aligned features on toe circumferential seal 722, prevent the seal from moving circumferentially. The radial direction is shown by arrow 767 and the circumferential direction is shown by arrow 768. These radially aligned features have a greater width in the axial direction than the width of the seal and also prevent leakage circumferentially along the grooves from the radial space 734 shown in FIG. 38. The radial aligned feature axial width shown by arrow 769 and the seal width is shown by arrow 770. This radial space 734 between the toe and heel components is not sealed and provides the circumferential force to push the toe and heel apart.

In FIG. 34, one of the two heel components is also hidden to reveal the floating circumferential seal 718 between the two heel components. This seal is similar to the circumferential seal between the toe components described above. The shape of the seal also provides for an axially aligned seal 716 which prevents leakage between the circumferentially expanding toe components 702 (hidden in FIG. 34), 704, 706 and heel components 708 (hidden in FIG. 34), 710. The embodiment in FIG. 34 features a through hole 771 for flexible pin 742. Flexible pin 742 is shown in greater detail in FIG. 40. Floating Circumferential Seal 718 is at an inner axially-facing surface 778 of Second Heel Component 710.

Figure 35:
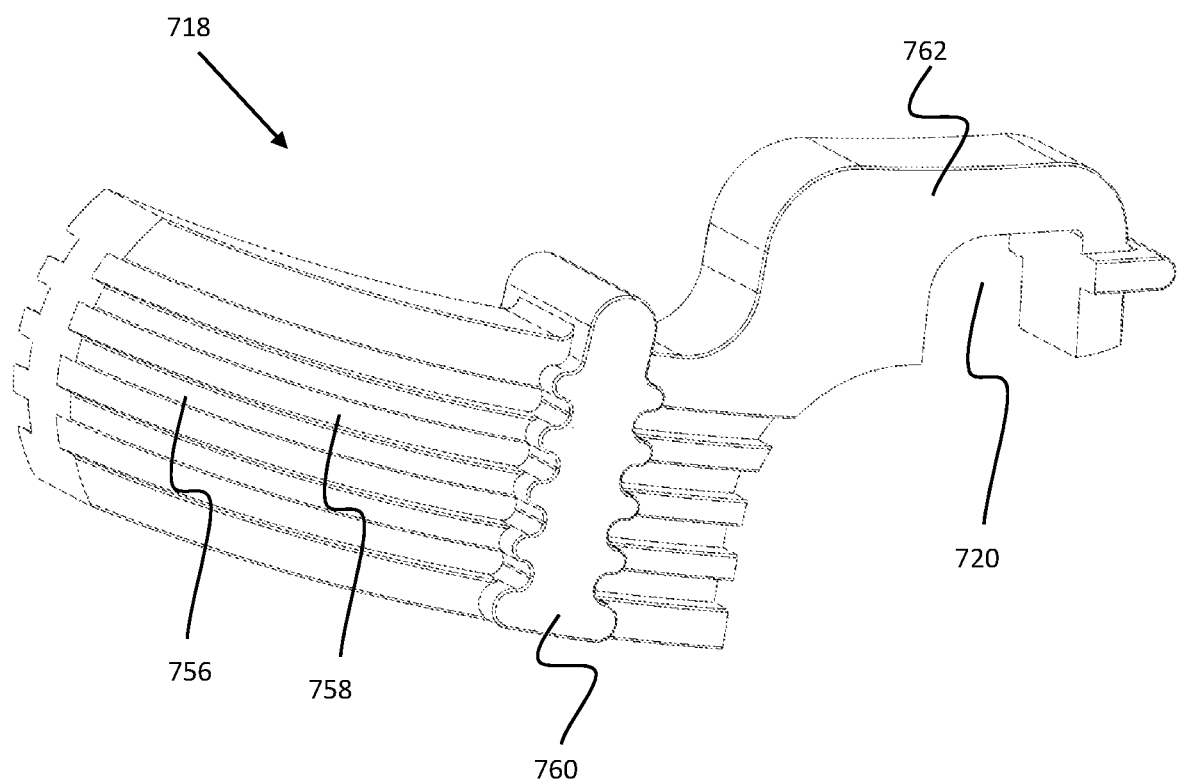
FIG. 35 is an isometric view of the floating circumferential seal between two heel components as shown in FIG. 34, here shown isolated from other components.

The circumferential seal 718 between the heel components is shown in FIG. 35 on its own. This circumferential seal includes a portion defining an axially aligned groove 720 for the axially aligned surface seal. As with the seal between toe components, it has multiple concentric ridges 756 defining grooves 758 between the ridges as well as transverse a transverse ridge 760 which is here a radially aligned feature. There could also be multiple transverse ridges 760. As with the seal between toe components, a single longitudinal ridge 756 or single longitudinal groove 758 could be used, meshing with a corresponding groove or ridge in a heel component. In the embodiment shown, a portion 762 of the seal extends over the axial seal 716 (shown in FIG. 36) to define a notch 720 for receiving the axial seal 716. In another embodiment, the portion 762 could be formed as one piece with the protrusion 714 on the axial seal 716. In another embodiment, circumferential seal 718 and Heel Axial Seal 716 may be formed as one piece as opposed to two separate pieces.

FIG. 36 shows the axial seal 716 on its own. Reliefs 715 on the left facing surface in this image are provided to allow fluid to act primarily on the left facing surface to push the seal towards the right in the groove. The protrusion 714 to the left along the center plane is provided to prevent the seal from moving axially in the groove.

Figure 37:
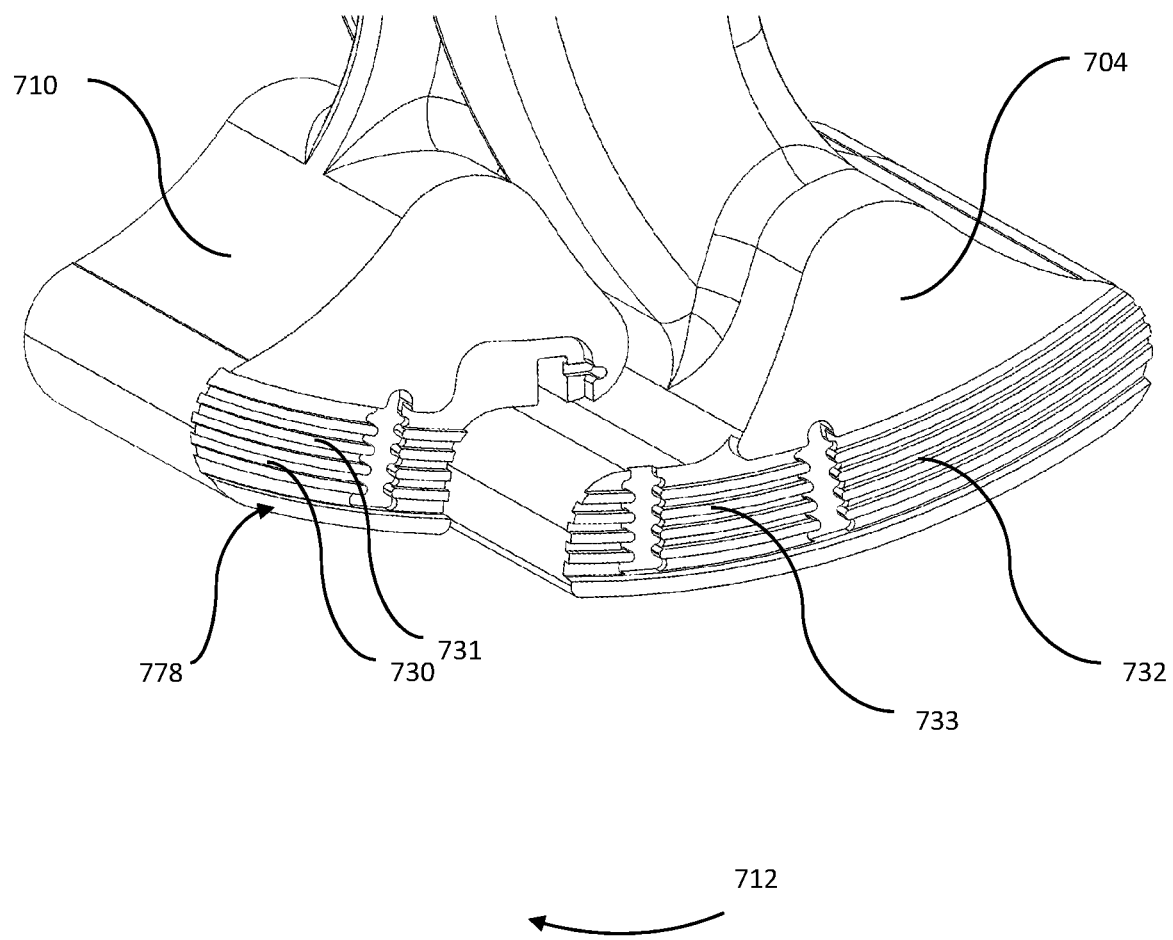
FIG. 37 is an isometric view showing the view of FIG. 34 with the seals removed to show grooves which are formed into the rotor components to accept the seals.

FIG. 37 shows the partially disassembled rotor foot section with the seals removed to show the grooves 730 and ridges 731 corresponding to heel seal ridges 756 and grooves 758, and grooves 732 and ridges 733 corresponding to toe seal ridges 726 and grooves 727, the grooves and ridges 730, 731, 732, 733 being formed into the rotor components to accept the seals.

Figure 38:
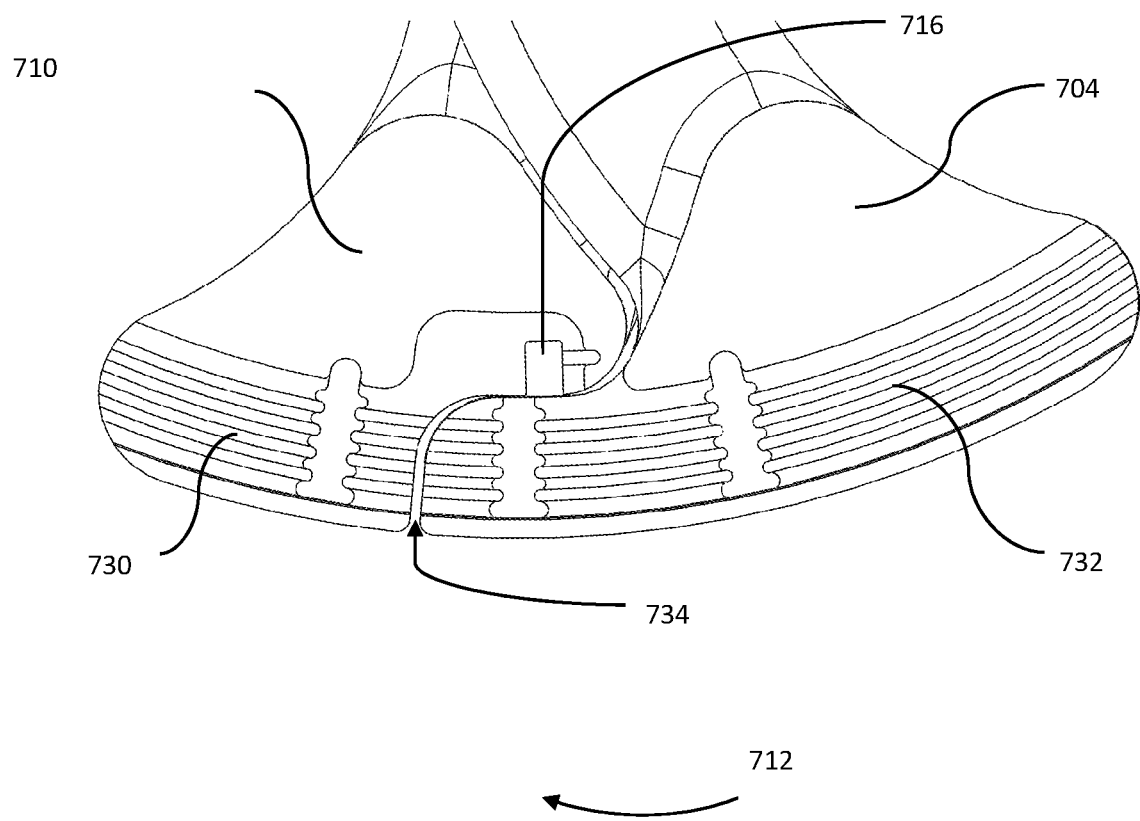
FIG. 38 is a side view corresponding to the isometric view of FIG. 37.

FIG. 38 shows a side view of the partially disassembled rotor of FIG. 37, also with seals removed. It is clear from this figure where fluid pressure from the compression chamber is intended to access and where it is prevented from flowing by the seals. The slot 734 between the toe on the left and the heel on the right is pressurized and causes the toe and heel to be forced apart circumferentially so the toe and heel contact their respective trailing and outer rotor cylinder walls with enough force to provide effective seals. In this embodiment, the slot 734 is partially radially aligned.

Please note that arrows in FIGS. 39-42 indicate surfaces shown by the arrow, looking along the direction of the arrow, as per 37 C.F.R. section 1.84(r).

Figure 39:
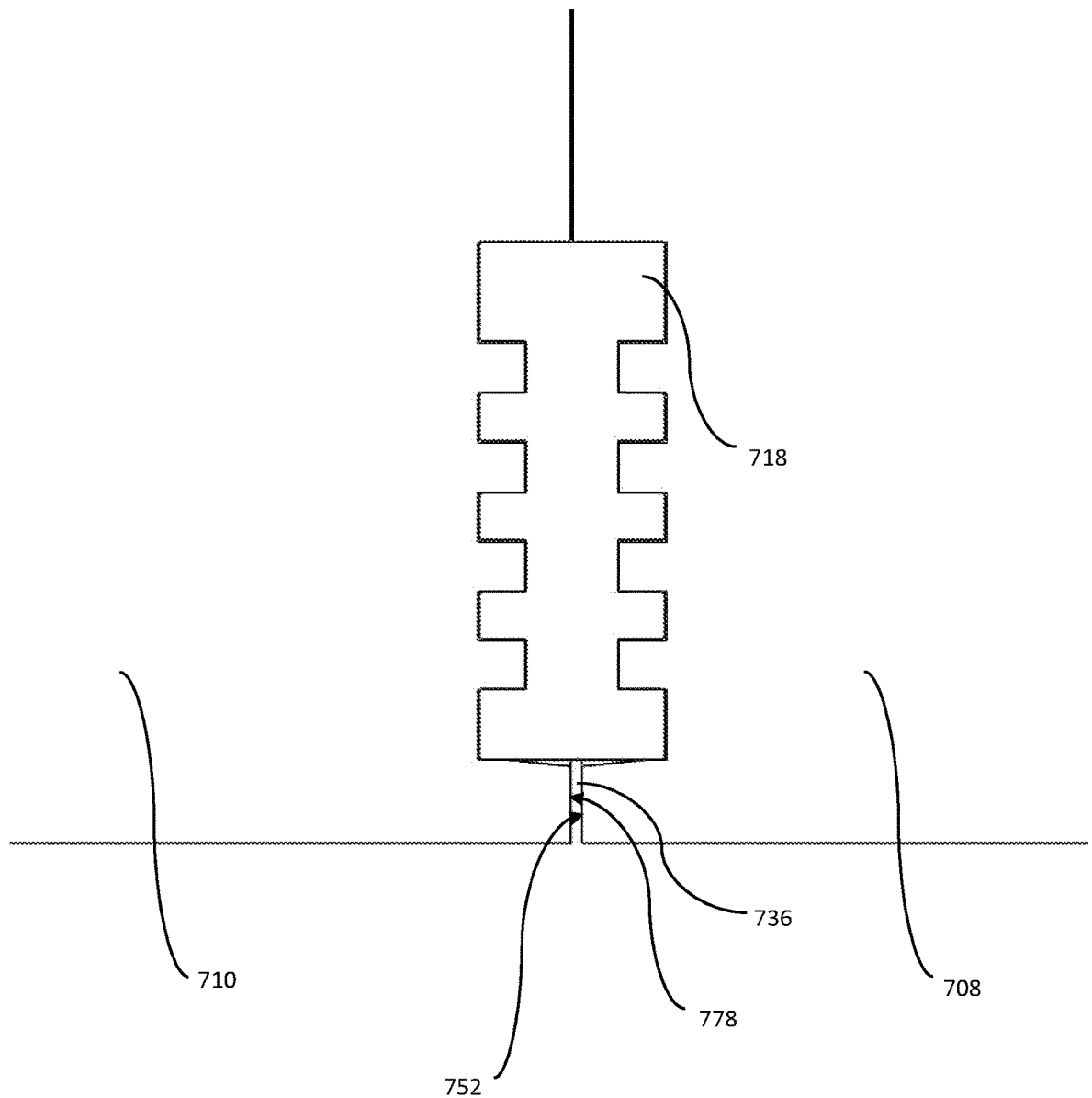
FIG. 39 is a circumferential cross-section view through heel components of the inner rotor of FIG. 31.

FIG. 39 is a cross-section view of the rotor and seal 718 viewed along a tangent to the OD of the inner rotor, shows a slot (Circumferential Radial Space 736) between the rotor heel components 708 and 710 (the portions of the rotors radially outward from the seal). The fluid pressure from compression, compressed air intake, combustion, or other sources in the chamber on the OD of the inner rotor is able to act on the axially facing surfaces 752 and 758 on either side of this slot 736 to push the axially movable rotor components, rotor heel components 708 and 710 away from each other. The force on First Inner Axially-facing Surface 752 of the first rotor heel component 708 pushes First Rotor Heel Component 708 to create a seal between the axially outward most surfaces 740 of the rotor heel component 708 against the axially inwardly facing surfaces of the cylinder walls. It is understood that a pressure gradient will exist from the radially outward most surface of the seal to the radially inward most surface of the seal. Much of this pressure gradient will also contribute to the axially outward force created between axially movable rotor components as a result of fluid pressure in the variable volume chamber.

For each of the seals shown between inner rotor components, the seals could be separate from the rotor components that they form a seal between the components, as shown, or could be formed in one piece with one of the rotor components. In the former case, each seal can have one or more seal ridges or one or more seal grooves arranged to mesh with one or more corresponding grooves or one or more corresponding ridges for each of the segments; and in the latter case, each seal can have one or more seal ridges or one or more seal grooves arranged to mesh with one or more corresponding grooves or one or more corresponding ridges of the component it is not in one piece with. In either case, the seal as a whole can extend into an overall groove in at least one component, with meshing ridges and grooves on the seal and within this overall groove.

Second rotor heel component 710 would experience a similar force on the second rotor heel component 710's Inner Axially Facing Surface 778. Second Inner Axially Facing Surface 778 is also visible in FIG. 34 and FIG. 37.

The leading and trailing surfaces of the cylinder define the relative angular position of the toe and heel components (so the foot entering a cylinder is at the correct circumferential width to enter the cylinder because of the circumferential width of the foot ahead of it that is already in a cylinder). In a similar way, the axial width of a foot that is in a cylinder will set the axial width of the next foot which is about to enter a cylinder.

Seal Preloading

Figure 40:
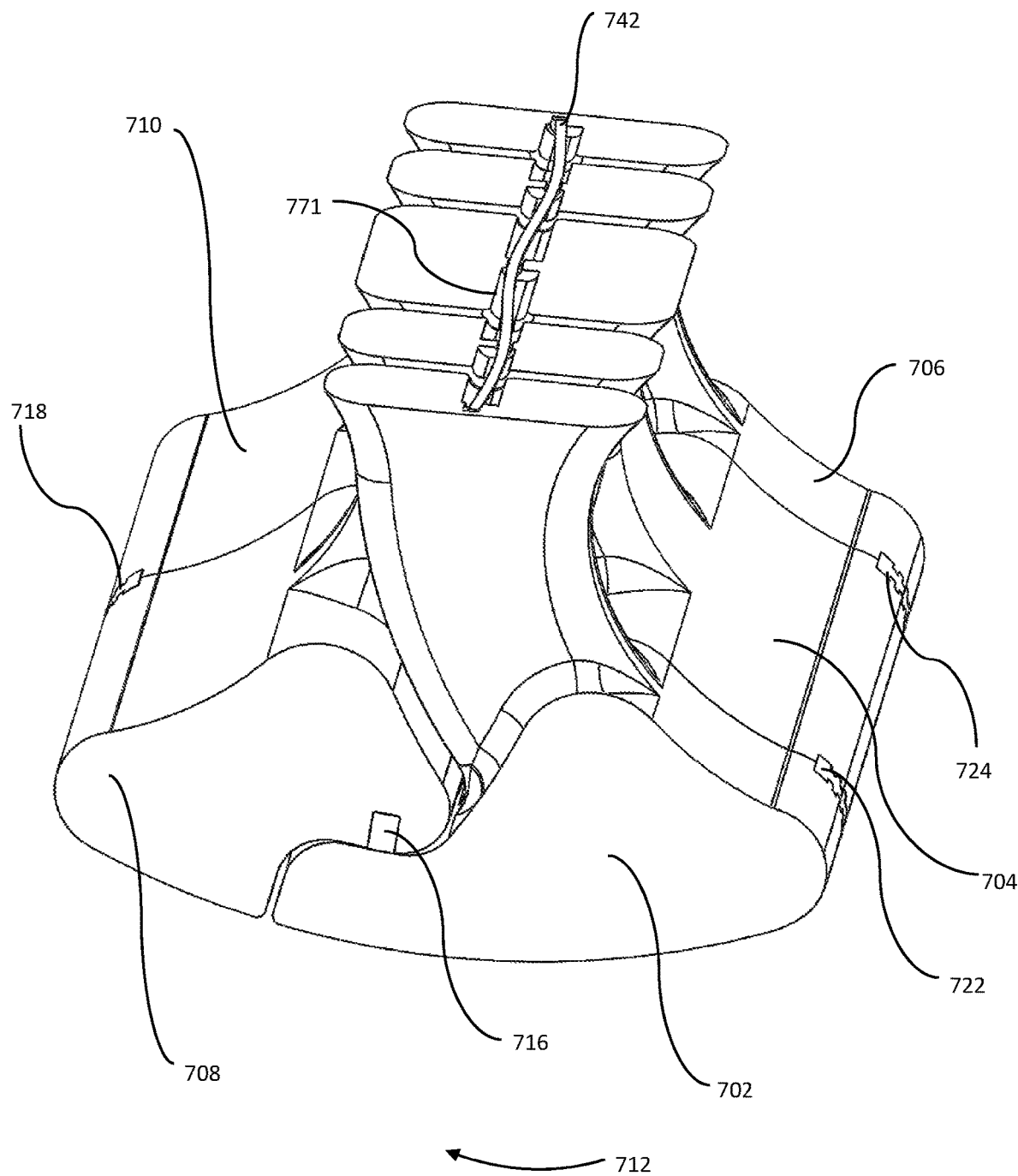
FIG. 40 is an isometric cutaway view of the inner rotor of FIG. 31 showing a series of axial holes accepting a flexible pin or spring wire.

In FIG. 40, one of many possible ways to preload or pre-energize the seals is shown. A cross-section plane reveals a series of axial holes which allow a flexible pin or spring wire 742, such as a spring steel or nitinol or titanium wire to be inserted into the rotors without bending during assembly when the toe and heel sections are splayed apart at a greater angle than when they will be inserted into the outer rotor chambers. When the toe and heel are brought together to a working position, the spring wire is elastically deformed and will therefore create a circumferential force outward between the toe and the heel to create the initial seal contact between the toe and heel of the inner rotor and the leading and trailing edges of the chamber on the outer rotor. Similar strategies could be used to preload the sides of the inner rotor against the inward axial surfaces of the outer rotor cylinder. The flexible pin 742 shown here will have a component of axial force which it exerts on the outermost inner rotor members so it may accomplish part or all of the axial energizing as well.

For each rotor that seals against a cylinder wall(s), it is desirable that the torque or force induced by the fluid or gas pressure forcing the rotor toward the wall it is sealing against slightly exceeds or exceeds the torque or forced induced by the fluid or gas pressure forcing the rotor away from the wall it is sealing against. This ensures that enough sealing occurs while minimizing undue wear, friction, and heat generation.

For a region of constant fluid pressure, the net force a fluid exerts on a surface along a given axis of measurement is proportional to the surface's surface area projected onto the plane to which the axis of measurement is normal. As a general statement including regions of varying fluid pressure like over seals, the net force along a given axis of measurement is equal to the integral of the local fluid pressure multiplied by the projection of the surface onto the plane to which the axis of measurement is normal to, over all points on the surface in question. The net torque is equal to the integral of the local fluid pressure multiplied by the projection of the surface onto the plane containing the axis of rotation and the point in question multiplied by the moment arm about the axis of rotation over all points on the surface in question.

Thus, the surfaces on the rotors that experience fluid forces pushing them to expand or contract circumferentially or axially can be designed with different geometries while ensuring that the net forces or torques result in effective sealing.

For instance, Heel Leading-edge Surface 744 is designed with geometry similar to Inner Heel Surface 748 in Axial Radial Space 734, but designed such that the product of the projected surface area of the curved surface 744 of the heel leading edge on the high pressure side of the seal between the heel and the cylinder wall and its respective moment arm is less than the product of the projected surface area of the curved inner surface of the circumferentially facing inner heel surface 748 on the high pressure side of Heel Axial Seal 716 and its respective moment arm, thus providing a net non-zero torque in the direction away from the toe and toward the heel and providing a sealing force against the cylinder wall.

Toe Trailing-Edge Surface 746 is designed with geometry similar to Inner Toe Surface 750 in Axial Radial Space 734, but designed such that the product of the projected surface area of the curved surface 746 of the toe trailing edge on the high pressure side of the seal between the toe and the cylinder wall and its respective moment arm is less than the product of the projected surface area of the curved inner surface of the inner toe 750 on the high pressure side of Heel Axial Seal 716 and its respective moment arm, thus providing a net non-zero torque in the direction away from the heel and toward the toe and providing a sealing force against the cylinder wall.

Figure 41:
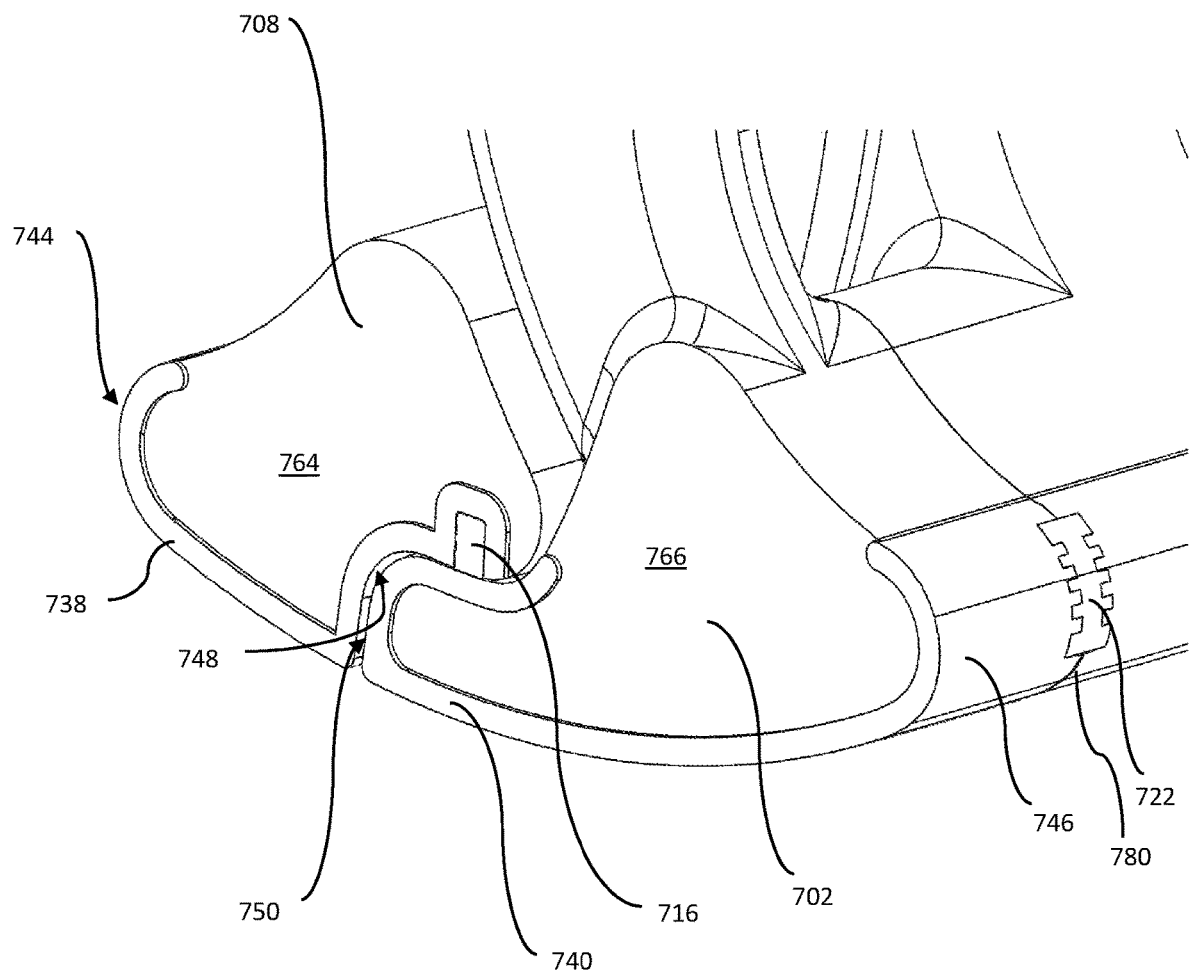
FIG. 41 is an isometric view of a variant of the embodiment of an inner rotor of FIGS. 31-40 showing an axial lip.
Figure 42:
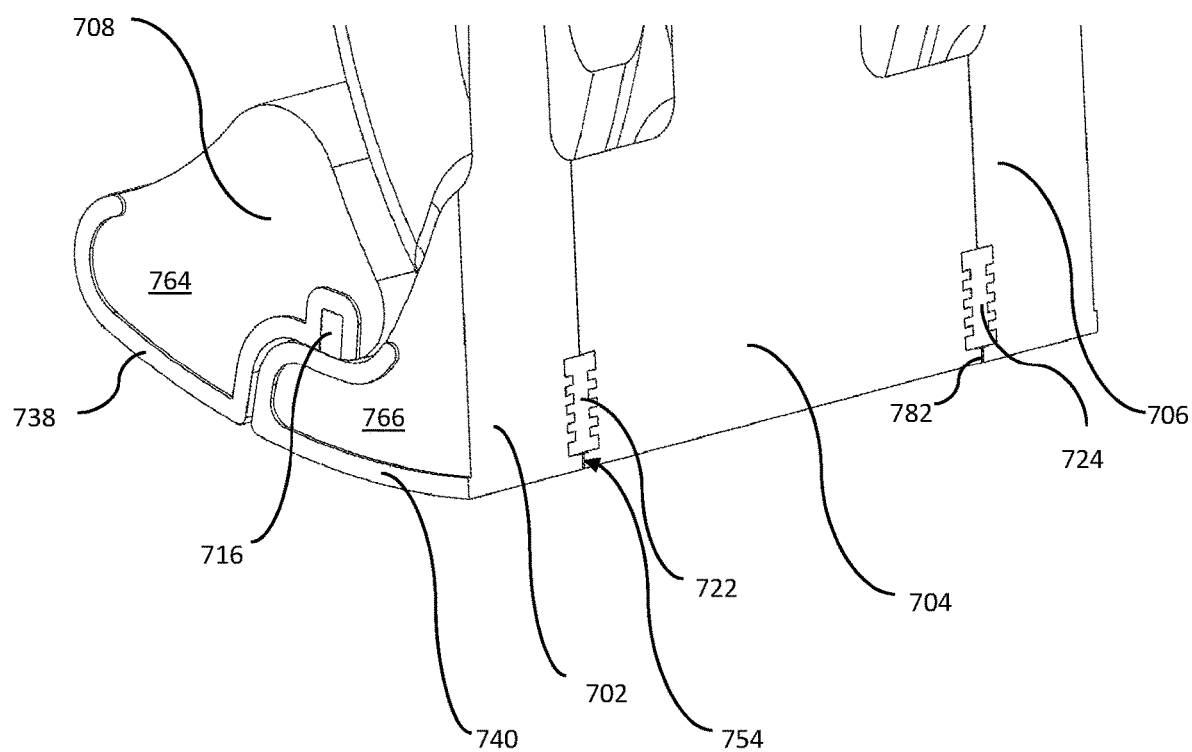
FIG. 42 is a cutaway isometric view of the embodiment of FIG. 41 showing a cut through toe components of the inner rotor.

In the embodiment shown in FIG. 41 and FIG. 42, a heel segment axial end face 764 has a lip 738 at a radially outward edge of the heel axial end face and a toe axial end face 766 has a lip 740 at a radially outward edge of the toe axial and face. These lips may be repeated at axial end faces on the opposite axial side of the rotor. These lips form sealing surfaces with axial walls of the annular housing defining the cylinders. The position of these lips at radially outward edges of the heel axial end face, further outward radially than the slots (e.g. Circumferential Radial Space 736) between heel segments and between toe segments extend radially inward, helps pressure in these slots push segments apart to press the lips against the axial walls. The axial end faces need not be parallel to the axial walls, and for example portions away from the radially outward edges can slant away from the axial walls. Also, there need not be a lip; the radially outward edges of the heel and toe end faces can be axially facing sealing surfaces contacting the axial walls even without a raised lip.

Toe Lip 740 may be designed with small radial length and with a relatively small surface area forming the seal. A pressure gradient will form over this seal with the highest pressure towards the OD and the lowest pressure towards the axis. The pressure on First Toe Component 702, more specifically acting on First Inner Axially-facing Toe Component Surface 754, and the pressure gradient over First Toe Circumferential Seal 722 forcing first rotor toe component 702 outward will generate a force greater than the force created by the pressure on Toe Lip 740, forcing the rotor outwards. The exact balance of forces can be adjusted for an optimal sealing force.

The balance of axial forces on Third Rotor Toe Component 706 and on heel components 708 and 710 can be analyzed similarly.

FIGS. 41 and 42 also show toe circumferential slots 780 and 782 between toe members outward from First and Second Toe Circumferential Seals 722 and 724 respectively.

Although illustrated in the context of an inner rotor, the principles used here could be used in other forms of pistons. A "foot" as shown here can act as a piston regardless if it is part of an inner rotor or not. An inner rotor component is also a piston component and descriptions of inner rotor components, where they apply to any single foot of the inner rotor considered separate from the rest of the inner rotor, also apply to piston components generally. For example, the piston may expand in a first direction and a second direction transverse to a longitudinal direction of the cylinder. Components of the feet in the rotor embodiments can correspond to components of the piston in this non-rotor embodiment, with the first direction corresponding to the circumferential direction for the rotor embodiments, the second direction corresponding to the axial direction for the rotor embodiments, and the longitudinal direction corresponding to the radial direction for the rotor embodiments.

In the examples shown here, a rectangular foot (piston) is shown. In other examples, the foot need not be rectangular. For example, it could be another four sided non-round shape in a cylinder of corresponding shape.

For the purpose of this document, a cylinder is a cavity in which a piston travels to define a variable volume chamber and is not limited to a geometric shape having a circular cross section.

In one embodiment, several energy transfer machines as described may have their outputs coupled together for increased power.

Figure 43:
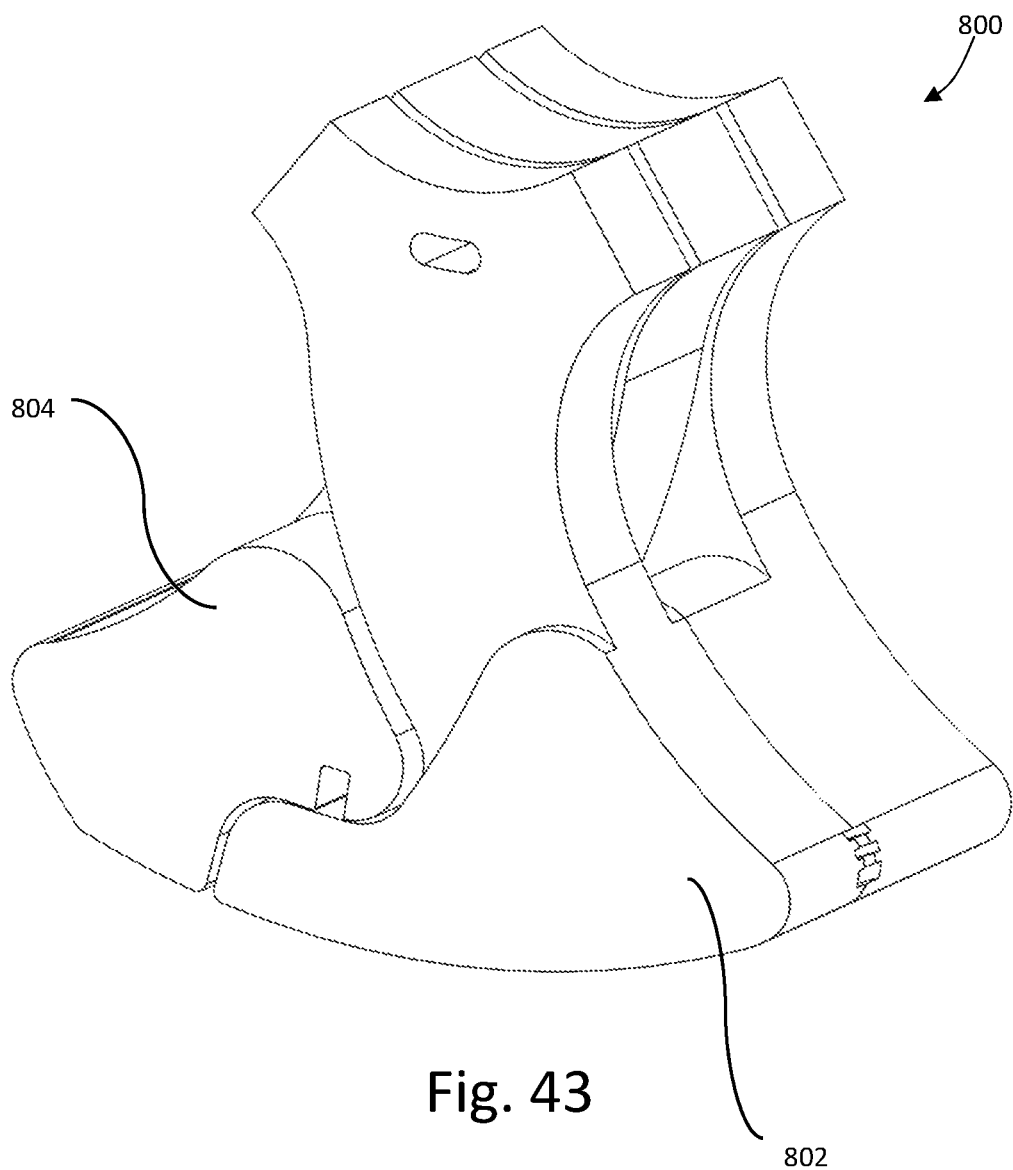
FIG. 43 is an isometric view of a rotor foot of a rotor suitable for a multi-rotor embodiment.
Figure 44:
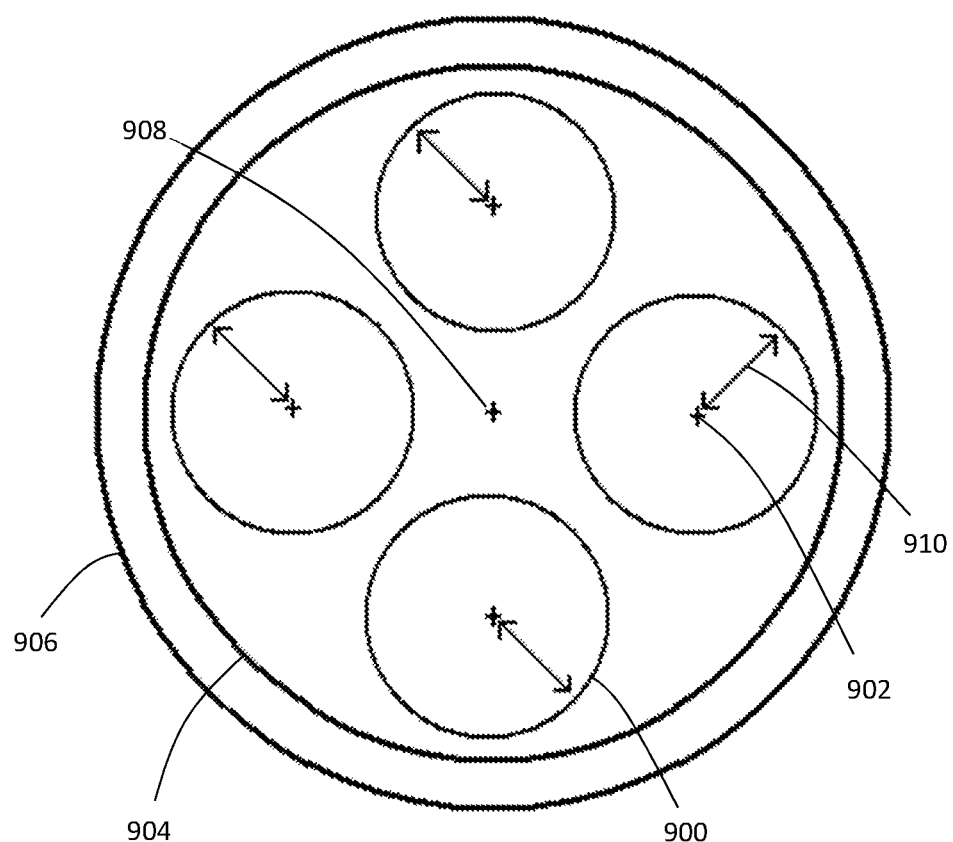
FIG. 44 is a schematic illustration showing the operation of a multi-rotor embodiment.

The embodiments described and claimed can be used in devices with single inner rotors, as shown, or multiple inner rotors, as shown for example in U.S. Pat. No. 7,111,606. FIG. 43 shows an exemplary rotor foot 800 of a rotor suitable for a multi-rotor embodiment. Seals are not shown but would be present in use. The circumferential expansion provided between toe 802 and heel 804 allows sealing contact to be maintained between the leading and trailing edges and the cylinder walls even if the motion of the foot 800 relative to the annular housing has non-radial components. The particular embodiment shown in FIG. 43 allows circumferential expansion but does not allow substantial axial expansion of the heel 804 as there is only one heel component shown. Versions that have circumferential expandability and also have both the heel and toe axially expandable, as shown in FIGS. 25-42, may also be used in multi-rotor embodiments. FIG. 44 schematically shows the operation of a multi-rotor embodiment. In the version shown there are 4 rotors 900, shown as circles representing the circular motion of the rotor feet and with effective radii indicated by arrows 910. The rotors 900 each rotate around respective axes 902, the axes 902 each being fixed relative to carrier 904. The carrier 904 rotates relative to an annular housing 906 via axis 908. The rotor-carrier relative rotation and carrier-annular housing relative rotation may be synchronized by the meshing of the rotor feet with the annular housing. FIG. 44 shows the annular housing 906 as rotating and the carrier as fixed; the housing can also be fixed and the carrier rotating, or both could be rotating relative to a separate fixed element such as an additional housing (not shown).

The word "continuous" as used above in relation to FIGS. 13-14 and 16-17 is not intended to imply that the seals are in sealing engagement 100% of the time. The feet are in the cylinders only part of the time and are in sealing engagement at most only when in the cylinders. The word "continuous" is used to mean that the leading and trailing edges are in sealing engagement with the inward projections for a non-zero portion of the rotor's cycle. With conventional seals, like on a cylindrical piston, the seals are in continuous contact and can therefore be between the piston and cylinder. If the inner rotors described above used a movable seal between the rotary piston and cylinder, the seals would hang up on the edge of the cylinder when the rotor foot entered the cylinder. The fact that the foot which is in the cylinder sets the circumferential length as well as the axial width, with this invention, is what allows the piston foot to exit and enter the cylinder. This use of the outer piston foot surfaces is also enabled as a result of using a variable gap interface between the axially movable foot components, and also between the circumferential movable foot components. These seals between components of the inner rotor are able to be always in sealing engagement, although they are only required to seal when pressurized.

The cylinder-contacting sealing surfaces of an inner rotor component, referring to one of the left or right toe sections or left or right heel sections, are rigidly connected to similar surfaces on adjacent inner rotor feet so the axial and circumferential position of the sealing surfaces of a foot entering a cylinder is set, relative to the cylinder it is entering, by a foot that is already inside a cylinder (because the position of sealing surfaces of the foot inside the cylinder are set by contact with the cylinder walls). In this way, the incoming rotor foot sealing surfaces can be precisely located relative to the cylinder walls to allow contact or a small enough gap for effective sealing, and without undue contact or interference such that the sealing surfaces of the incoming piston foot would "catch" or "hang up" on the edge of the cylinder.

This is made possible with this invention by all the right side leading seal surfaces being constructed of one rigid component, and all the right side trailing sealing surfaces being constructed of one rigid component. The same is true of the left side and a variable gap is provided between left side components and right side components, as well as between leading and trailing components. The larger these gaps, the smaller the gaps between the sealing surfaces of the foot and the cylinder walls. A combination of seals and grooves or protruding features and grooves is provided between the left and right and leading and trailing components to provide a variable gap seal between these components. Furthermore, a percentage of these variable gap surfaces is large enough in cross section to allow pressurized fluid into these gaps to push the inner rotor components against the cylinder walls with a force that is proportional to the fluid pressure.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An energy transfer machine, comprising:
   a carrier secured within an annular housing, the annular housing having a radially inner surface defining cylinders, the annular housing and carrier rotating in relation to each other,
   at least one inner rotor secured for rotation about an inner rotor axis within the carrier, the inner rotor having outward projections;
   outward projections projecting outward to mesh with the cylinders and define variable volume chambers within the cylinders as the inner rotor rotates within the carrier during operation;
   the outward projections of the inner rotor being circumferentially and axially expandable under pressure within the variable volume chambers; and
   fluid transfer passages on at least one of the inner rotor, annular housing and carrier to permit flow of fluid into and out of the variable volume chambers.

2. The energy transfer machine of claim 1 in which the carrier is fixed and the annular housing is configured to rotate within an exterior housing during operation.

3. The energy transfer machine of claim 1 in which the annular housing is fixed and the carrier is configured to rotate within the annular housing during operation.

4. The energy transfer machine of claim 1 in which the outward projections each comprise a primary foot and a secondary foot arranged to slide circumferentially relative to each other under the pressure within the variable volume chambers for sealing contact with the cylinders as respective cylinders and outward projections mesh with each other during operation.

5. The energy transfer machine of claim 4 in which the primary foot and the secondary foot each comprise plural segments biased axially relative to each other by the pressure within the variable volume chambers for sealing contact with axial walls of the cylinders as respective cylinders and outward projections mesh with each other during operation.

6. The energy transfer machine of claim 5 in which the plural segments of the primary foot and the plural segments of the secondary foot are each connected to respective corresponding segments of other outward projections of the outward projections to rotate together with the respective corresponding segments about the inner rotor axis.

7. The energy transfer machine of claim 5 in which an axially endmost segment of the plural segments of the primary foot or the plural segments of the secondary foot comprises an axial end face for sealing contact with the axial walls of the cylinders.

8. The energy transfer machine of claim 7 in which the axial end face contacts the axial walls of the cylinders at a radially outer edge of the axial end face.

9. The energy transfer machine of claim 8 in which the axial end face comprises a lip at the radially outer edge of the axial end face.

10. The energy transfer machine of claim 5 in which the plural segments of the primary foot define one or more primary foot slots separating the plural segments of the primary foot and the plural segments of the secondary foot define one or more secondary foot slots separating the plural segments of the secondary foot, fluid under the pressure within the variable volume chambers entering the one or more primary foot slots and the one or more secondary foot slots to expand the one or more primary foot slots and the one or more secondary foot slots.

11. The energy transfer machine of claim 10 in which the one or more primary foot slots and the one or more secondary foot slots have respective inner boundaries defined by respective axially movable sealing interfaces.

12. The energy transfer machine of claim 11 in which each respective axially movable sealing interface is defined by a respective substantially circumferentially extending seal.

13. The energy transfer machine of claim 12 in which at least one seal of the respective seals includes a substantially radial portion.

14. The energy transfer machine of claim 12 in which the primary foot and secondary foot are arranged to slide relative to each other along a sealing interface provided with a circumferentially movable sliding seal comprising a radially extending portion in one of the primary foot and the secondary foot, and a contacting circumferential seal of the substantially circumferentially extending seals, the contacting circumferential seal being in the one of the primary foot and the secondary foot, is arranged to contact the radially extending portion.

15. The energy transfer machine of claim 12 in which each seal has one or more seal ridges or one or more seal grooves arranged to mesh with one or more corresponding grooves or one or more corresponding ridges of at least one of the segments separated by the respective slot, axial movement of each respective sealing interface being accommodated by greater or lesser meshing of the one or more seal ridges or one or more seal grooves with the one or more corresponding grooves or one or more corresponding ridges.

16. The energy transfer machine of claim 15 in which the one or more seal ridges or one or more seal grooves are aligned longitudinally along each seal.

17. The energy transfer machine of claim 15 in which each seal comprises at least one transverse ridge.

18. An energy transfer machine comprising:
a piston arranged to move within a cylinder in a longitudinal direction to define a variable volume chamber, the piston comprising a primary foot and a secondary foot arranged to slide relative to each other under pressure within the variable volume chamber in a first direction transverse to the longitudinal direction for sealing contact with walls of the cylinder in the first direction, and
the primary foot and the secondary foot each comprising plural segments biased relative to each other in a second direction transverse to the longitudinal direction by the pressure within the variable volume chamber for sealing contact with walls of the cylinder in the second direction.

19. The energy transfer machine of claim 18 in which the piston and cylinder each form a four-sided shape in cross section.

20. The energy transfer machine of claim 18 in which an endmost segment, in the second direction, of the plural segments of the primary foot or the plural segments of the secondary foot comprises an end face, in the second direction, for sealing contact with the walls of the cylinder in the second direction.

21. The energy transfer machine of claim 20 in which the end face contacts the walls at an outer edge, in the first direction, of the end face.

22. The energy transfer machine of claim 21 in which the end face comprises a lip at the outer edge of the end face.

23. The energy transfer machine of claim 18 in which the plural segments of the primary foot define one or more primary foot slots separating the plural segments of the primary foot and the plural segments of the secondary foot define one or more secondary foot slots separating the plural segments of the secondary foot, fluid under the pressure within the variable volume chambers entering the one or more primary foot slots and the one or more secondary foot slots to expand the one or more primary foot slots and the one or more secondary foot slots.

24. The energy transfer machine of claim 23 in which the one or more primary foot slots and the one or more secondary foot slots have respective inner boundaries defined by respective sealing interfaces movable in the second direction.

25. The energy transfer machine of claim 24 in which each respective movable sealing interface is defined by a respective seal substantially extending in the first direction.

26. The energy transfer machine of claim 25 in which at least one seal of the respective seals includes a portion extending substantially in the longitudinal direction.

27. The energy transfer machine of claim 25 in which the primary foot and secondary foot are arranged to slide relative to each other along a sealing interface provided in one of the primary foot and the secondary foot, the sealing interface comprising a sliding seal movable in the first direction and the sliding seal comprising a portion extending longitudinally, and the sliding seal contacting a sealing interface of the respective sealing interfaces movable in the second direction, the contacting sealing interface being in the one of the primary foot and the secondary foot, and arranged to contact the portion extending longitudinally.

28. The energy transfer machine of claim 25 in which each seal has one or more seal ridges or one or more seal grooves arranged to mesh with one or more corresponding grooves or one or more corresponding ridges of at least one of the segments separated by the respective slot, movement in the second direction of each respective sealing interface being accommodated by greater or lesser meshing of the one or more seal ridges or one or more seal grooves with the one or more corresponding grooves or one or more corresponding ridges.

29. The energy transfer machine of claim 28 in which the one or more seal ridges or one or more seal grooves are aligned along a lengthwise direction defined by each seal.

30. The energy transfer machine of claim 28 in which each seal comprises at least one ridge generally arranged generally perpendicularly to a lengthwise direction defined by the respective seal.

* * * * *